(12) United States Patent
Abotabl et al.

(10) Patent No.: US 12,507,231 B2
(45) Date of Patent: Dec. 23, 2025

(54) TECHNIQUES FOR INTERLEAVING IN FULL-DUPLEX SLOTS

(71) Applicant: QUALCOMM Incorporated, San Diego, CA (US)

(72) Inventors: Ahmed Attia Abotabl, San Diego, CA (US); Muhammad Sayed Khairy Abdelghaffar, San Jose, CA (US); Gabi Sarkis, San Diego, CA (US); Alexandros Manolakos, Escondido, CA (US); Seyedkianoush Hosseini, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 557 days.

(21) Appl. No.: 17/997,356

(22) PCT Filed: May 5, 2021

(86) PCT No.: PCT/US2021/030936
§ 371 (c)(1),
(2) Date: Oct. 27, 2022

(87) PCT Pub. No.: WO2021/226266
PCT Pub. Date: Nov. 11, 2021

(65) Prior Publication Data
US 2023/0180213 A1      Jun. 8, 2023

(30) Foreign Application Priority Data

May 8, 2020     (GR) .............................. 20200100234

(51) Int. Cl.
*H04W 72/1263* (2023.01)
*H04L 1/00* (2006.01)
(Continued)

(52) U.S. Cl.
CPC ....... *H04W 72/1263* (2013.01); *H04L 1/0071* (2013.01); *H04L 5/14* (2013.01); *H04W 72/0446* (2013.01)

(58) Field of Classification Search
CPC ....... H04L 1/0071; H04L 5/0016; H04L 5/14; H04W 72/0446; H04W 72/0453; H04W 72/1263
See application file for complete search history.

(56) References Cited

U.S. PATENT DOCUMENTS

2018/0367202 A1* 12/2018 Yang .................. H04L 1/1812
2019/0229860 A1*  7/2019 Yoshimura ........... H04L 5/0007
(Continued)

FOREIGN PATENT DOCUMENTS

EP           3389212 A1    10/2018
WO     WO-2019142524 A1    7/2019

OTHER PUBLICATIONS

Ericsson: "Physical Layer Aspects of Short TTI for Downlink Transmissions", 3GPP Draft, 3GPP TSG RAN WG1 Meeting #84, [LATRED] R1-160934 Physical_Layer_Aspects_of_Short_TTI_For_Downlink_Transmissions, 3rd Generation Partnership Project (3GPP), Mobile Competence Centre, 650, Route Des Lucioles, F-06921, Sophia-Antipolis Cedex, France, vol. RAN WG1, No. Malta, Feb. 15, 2016-Feb. 19, 2016, Feb. 6, 2016 (Feb. 6, 2016), XP051064063, 4 pages, section 2.1.1.
(Continued)

*Primary Examiner* — Awet Haile
(74) *Attorney, Agent, or Firm* — Holland & Hart LLP

(57) ABSTRACT

Methods, systems, and devices for wireless communications are described. The techniques described herein may enable frequency domain interleaving for a transmission direction depending on a codeblock mapping configuration, a transport block size, or both. For example, a device (e.g., a user equipment (UE) or a base station) may use an existence of
(Continued)

self-interference (e.g., existence of communications in a different transmission direction), a frequency domain allocation, a codeblock size, a number of codeblocks mapped per symbol, or a combination thereof for determining the interleaving. Additionally, the device may determine the frequency domain interleaving based on a transport block size configured for a transmission direction in a full-duplex slot. For example, a table with different ranges of transport block size along with interleaver depth or different interleaver patterns may be configured, and the device can determine the interleaver design based on the table.

23 Claims, 26 Drawing Sheets

(51) Int. Cl.
*H04L 5/14* (2006.01)
*H04W 72/0446* (2023.01)

(56) References Cited

U.S. PATENT DOCUMENTS

| | | | | |
|---|---|---|---|---|
| 2019/0334585 | A1* | 10/2019 | Lee | H04L 5/0023 |
| 2021/0058219 | A1 | 2/2021 | Kimura et al. | |
| 2022/0264599 | A1* | 8/2022 | Karaki | H04W 72/0446 |
| 2022/0393793 | A1* | 12/2022 | Mu | H04B 1/7136 |
| 2023/0139311 | A1* | 5/2023 | Hu | H04W 72/1273 370/329 |

OTHER PUBLICATIONS

International Search Report and Written Opinion—PCT/US2021/030936—ISA/EPO—Nov. 9, 2021.

Lenovo, et al., "On Codeword to RE Mapping Scheme", 3GPP Draft, 3GPP TSG RAN WG1 Meeting #90, R1-1712670_CW_Mapping, 3rd Generation Partnership Project (3GPP), Mobile Competence Centre, 650, Route Des Lucioles, F-06921 Sophia-Antipolis Cedex, France, vol. RAN WG1, No. Prague, P.R. Czech, Aug. 21, 2017-Aug. 25, 2017, Aug. 20, 2017 (Aug. 20, 2017), XP051315483, 11 Pages, section 2.2.

Nokia Siemens Networks, et al., "Interleaving for LTE Shared Channels", 3GPP Draft, 3GPP TSG-RAN Working Group 1 #50, R1-073669_Interleaving, 3rd Generation Partnership Project (3GPP), Mobile Competence Centre, 650, Route Des Lucioles, F-06921, Sophia-Antipolis Cedex, France, vol. RAN WG1, No. Athens, Greece; Aug. 20, 2007-Aug. 24, 2007, Aug. 15, 2007 (Aug. 15, 2007), XP050107265, 11 pages, [retrieved on Aug. 15, 2007], Annex B.

Partial International Search Report—PCT/US2021/030936—ISA/EPO—Aug. 4, 2021.

* cited by examiner

TECHNIQUES FOR INTERLEAVING IN FULL-DUPLEX SLOTS

CROSS REFERENCE

The present application is a 371 national stage filing of International PCT Application No. PCT/US2021/030936 by ABOTABL et al. entitled "TECHNIQUES FOR INTERLEAVING IN FULL-DUPLEX SLOTS," filed May 5, 2021; and claims priority to Greece Provisional Patent Application No. 20200100234 by ABOTABL et al., entitled "TECHNIQUES FOR INTERLEAVING IN FULL-DUPLEX SLOTS," filed May 8, 2020, each of which is assigned to the assignee hereof, and each of which is expressly incorporated by reference in its entirety herein.

INTRODUCTION

The following relates generally to wireless communications and more specifically to techniques for full-duplex communications.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

A method for wireless communications at a device is described. The method may include transmitting, to a UE, an indication of a codeblock mapping configuration for communications in a first transmission direction in a slot with the UE, the codeblock mapping configuration including a mapping of a set of multiple codeblocks for the communications in the first transmission direction to a set of multiple virtual resource blocks; and communicating with the UE during the slot based on an interleaving configuration for the communications in the first transmission direction based on the indication of the codeblock mapping configuration.

An apparatus for wireless communications at a device is described. The apparatus may include a processor and memory coupled to the processor. The processor and memory may be configured to transmit, to a UE, an indication of a codeblock mapping configuration for communications in a first transmission direction in a slot with the UE, the codeblock mapping configuration including a mapping of a set of multiple codeblocks for the communications in the first transmission direction to a set of multiple virtual resource blocks; and to communicate with the UE during the slot based on an interleaving configuration for the communications in the first transmission direction based on the indication of the codeblock mapping configuration.

Another apparatus for wireless communications at a device is described. The apparatus may include means for transmitting, to a UE, an indication of a codeblock mapping configuration for communications in a first transmission direction in a slot with the UE, the codeblock mapping configuration including a mapping of a set of multiple codeblocks for the communications in the first transmission direction to a set of multiple virtual resource blocks; and means for communicating with the UE during the slot based on an interleaving configuration for the communications in the first transmission direction based on the indication of the codeblock mapping configuration.

A non-transitory computer-readable medium storing code for wireless communications at a device is described. The code may include instructions executable by a processor to transmit, to a UE, an indication of a codeblock mapping configuration for communications in a first transmission direction in a slot with the UE, the codeblock mapping configuration including a mapping of a set of multiple codeblocks for the communications in the first transmission direction to a set of multiple virtual resource blocks; and to communicate with the UE during the slot based on an interleaving configuration for the communications in the first transmission direction based on the indication of the codeblock mapping configuration.

In some examples of the method, apparatuses, and non-transitory computer-readable medium described herein, transmitting the indication of the codeblock mapping configuration may include operations, features, means, or instructions for transmitting the indication of the codeblock mapping configuration for full-duplex communications during the slot in the first transmission direction, the first transmission direction occurring within the slot at a same time as a second transmission direction within the slot, the first transmission direction being different from the second transmission direction.

In some examples of the method, apparatuses, and non-transitory computer-readable medium described herein, the first transmission direction may include uplink communications, downlink communications, or sidelink communications, and the second transmission direction may include uplink communications, downlink communications, or sidelink communications that is different than the first transmission direction.

Some examples of the method, apparatuses, and non-transitory computer-readable medium described herein may further include operations, features, means, or instructions for transmitting, to the UE, an indication of a set of multiple interleaving configurations for the communications in the first transmission direction with the UE, each interleaving configuration of the set of multiple interleaving configurations corresponding to a different transport block size range; and for determining the interleaving configuration from the set of multiple interleaving configurations for the communications in the first transmission direction based on a transport block size configured for the first transmission direction in the slot falling within a transport block size range for the interleaving configuration, where the interleaving configuration is determined based on the transport block size configured for the first transmission direction and the indication of the codeblock mapping configuration.

In some examples of the method, apparatuses, and non-transitory computer-readable medium described herein, transmitting the indication of the set of multiple interleaving configuration may include operations, features, means, or instructions for transmitting, to the UE, the indication of the set of multiple interleaving configurations via radio resource control (RRC) signaling.

Some examples of the method, apparatuses, and non-transitory computer-readable medium described herein may further include operations, features, means, or instructions for measuring a set of multiple levels of self-interference for the set of multiple codeblocks for the communications in the first transmission direction, the self-interference for the communications in the first transmission direction caused by communications in a second transmission direction occurring at a same time as the communications in the first transmission direction; and for determining the interleaving configuration for the communications in the first transmission direction based on a difference between a first level of the set of multiple levels of self-interference and a second level of the set of multiple levels of self-interference satisfying a threshold value.

In some examples of the method, apparatuses, and non-transitory computer-readable medium described herein, the first level of the set of multiple levels of self-interference may be different than the second level of the set of multiple levels of self-interference based on the codeblock mapping configuration.

Some examples of the method, apparatuses, and non-transitory computer-readable medium described herein may further include operations, features, means, or instructions for determining one or more transmission characteristics for the communications in the first transmission direction, where the interleaving configuration is determined based on the one or more transmission characteristics.

In some examples of the method, apparatuses, and non-transitory computer-readable medium described herein, the one or more transmission characteristics may include a presence of communications in a second transmission direction causing self-interference on the communications in the first transmission direction, a frequency and time domain allocation for the communications in the first transmission direction, a codeblock size for the set of multiple codeblocks, a codeblock length for the set of multiple codeblocks, or any combination thereof.

Some examples of the method, apparatuses, and non-transitory computer-readable medium described herein may further include operations, features, means, or instructions for determining a number of codeblocks mapped per symbol of the slot, where the interleaving configuration is determined based on the number of codeblocks mapped per symbol satisfying a threshold value.

In some examples of the method, apparatuses, and non-transitory computer-readable medium described herein, the interleaving configuration may include a frequency domain interleaving configuration, a virtual resource block-to-physical resource block mapping configuration, or a combination thereof for the communications in the first transmission direction.

In some examples of the method, apparatuses, and non-transitory computer-readable medium described herein, the device may include a UE, a base station, or an additional wireless device, or a combination thereof.

A method for wireless communication at a UE is described. The method may include receiving, from the device, an indication of a codeblock mapping configuration for communications in a first transmission direction in a slot with the device, the codeblock mapping configuration including a mapping of a set of multiple codeblocks for the communications in the first transmission direction to a set of multiple virtual resource blocks; and communicating with the device during the slot based on an interleaving configuration for the communications in the first transmission direction based on the indication of the codeblock mapping configuration.

An apparatus for wireless communications at a device is described. The apparatus may include a processor and memory coupled to the processor. The processor and memory may be configured to receive, from the device, an indication of a codeblock mapping configuration for communications in a first transmission direction in a slot with the device, the codeblock mapping configuration including a mapping of a set of multiple codeblocks for the communications in the first transmission direction to a set of multiple virtual resource blocks; and to communicate with the device during the slot based on an interleaving configuration for the communications in the first transmission direction based on the indication of the codeblock mapping configuration.

Another apparatus for wireless communication at a UE is described. The apparatus may include means for receiving, from the device, an indication of a codeblock mapping configuration for communications in a first transmission direction in a slot with the device, the codeblock mapping configuration including a mapping of a set of multiple codeblocks for the communications in the first transmission direction to a set of multiple virtual resource blocks; and means for communicating with the device during the slot based on an interleaving configuration for the communications in the first transmission direction based on the indication of the codeblock mapping configuration.

A non-transitory computer-readable medium storing code for wireless communication at a UE is described. The code may include instructions executable by a processor to receive, from the device, an indication of a codeblock mapping configuration for communications in a first transmission direction in a slot with the device, the codeblock mapping configuration including a mapping of a set of multiple codeblocks for the communications in the first transmission direction to a set of multiple virtual resource blocks; and to communicate with the device during the slot based on an interleaving configuration for the communications in the first transmission direction based on the indication of the codeblock mapping configuration.

In some examples of the method, apparatuses, and non-transitory computer-readable medium described herein, receiving the indication of the codeblock mapping configuration may include operations, features, means, or instructions for receiving the indication of the codeblock mapping configuration for full-duplex communications during the slot in the first transmission direction, the first transmission direction occurring within the slot at a same time as a second transmission direction within the slot, the first transmission direction being different from the second transmission direction.

In some examples of the method, apparatuses, and non-transitory computer-readable medium described herein, the first transmission direction may include uplink communications, downlink communications, or sidelink communications, and the second transmission direction may include uplink communications, downlink communications, or sidelink communications that may be different than the first transmission direction.

Some examples of the method, apparatuses, and non-transitory computer-readable medium described herein may further include operations, features, means, or instructions for receiving, from the device, an indication of a set of multiple interleaving configurations for the communications in the first transmission direction with the device, each interleaving configuration of the set of multiple interleaving configurations corresponding to a different transport block size range; and for selecting the interleaving configuration from the set of multiple interleaving configurations for the communications in the first transmission direction based on a transport block size configured for the first transmission direction in the slot falling within a transport block size range for the interleaving configuration, where the interleaving configuration is determined based on the transport block size configured for the first transmission direction and the indication of the codeblock mapping configuration.

In some examples of the method, apparatuses, and non-transitory computer-readable medium described herein, receiving the indication of the set of multiple interleaving configurations may include operations, features, means, or instructions for receiving, from the device, the indication of the set of multiple interleaving configurations via RRC signaling.

Some examples of the method, apparatuses, and non-transitory computer-readable medium described herein may further include operations, features, means, or instructions for measuring a set of multiple levels of self-interference for the set of multiple codeblocks for the communications in the first transmission direction, the self-interference for the communications in the first transmission direction caused by communications in a second transmission direction occurring at a same time as the communications in the first transmission direction; and for determining the interleaving configuration for the communications in the first transmission direction based on a difference between a first level of the set of multiple levels of self-interference and a second level of the set of multiple levels of self-interference satisfying a threshold value.

In some examples of the method, apparatuses, and non-transitory computer-readable medium described herein, the first level of the set of multiple levels of self-interference may be different than the second level of the set of multiple levels of self-interference based on the codeblock mapping configuration.

Some examples of the method, apparatuses, and non-transitory computer-readable medium described herein may further include operations, features, means, or instructions for determining one or more transmission characteristics for the communications in the first transmission direction, where the interleaving configuration is determined based on the one or more transmission characteristics.

In some examples of the method, apparatuses, and non-transitory computer-readable medium described herein, the one or more transmission characteristics may include a presence of communications in a second transmission direction causing self-interference on the communications in the first transmission direction, a frequency and time domain allocation for the communications in the first transmission direction, a codeblock size for the set of multiple codeblocks, a codeblock length for the set of multiple codeblocks, or any combination thereof.

Some examples of the method, apparatuses, and non-transitory computer-readable medium described herein may further include operations, features, means, or instructions for determining a number of codeblocks mapped per symbol of the slot, where the interleaving configuration is determined based on the number of codeblocks mapped per symbol satisfying a threshold value.

A method for wireless communications at a device is described. The method may include transmitting, to a UE, an indication of a set of multiple interleaving configurations for communications in a first transmission direction in a slot with the UE, each interleaving configuration of the set of multiple interleaving configurations corresponding to a different transport block size range; and communicating with the UE based on an interleaving configuration from the set of multiple interleaving configurations for the communications in the first transmission direction, the interleaving configuration based on a transport block size configured for the first transmission direction in the slot falling within a transport block size range for the interleaving configuration.

An apparatus for wireless communications at a device is described. The apparatus may include a processor and memory coupled to the processor. The processor and memory may be configured to transmit, to a UE, an indication of a set of multiple interleaving configurations for communications in a first transmission direction in a slot with the UE, each interleaving configuration of the set of multiple interleaving configurations corresponding to a different transport block size range; and to communicate with the UE based on an interleaving configuration from the set of multiple interleaving configurations for the communications in the first transmission direction, the interleaving configuration based on a transport block size configured for the first transmission direction in the slot falling within a transport block size range for the interleaving configuration.

Another apparatus for wireless communications at a device is described. The apparatus may include means for transmitting, to a UE, an indication of a set of multiple interleaving configurations for communications in a first transmission direction in a slot with the UE, each interleaving configuration of the set of multiple interleaving configurations corresponding to a different transport block size range; and means for communicating with the UE based on an interleaving configuration from the set of multiple interleaving configurations for the communications in the first transmission direction, the interleaving configuration based on a transport block size configured for the first transmission direction in the slot falling within a transport block size range for the interleaving configuration.

A non-transitory computer-readable medium storing code for wireless communications at a device is described. The code may include instructions executable by a processor to transmit, to a UE, an indication of a set of multiple interleaving configurations for communications in a first transmission direction in a slot with the UE, each interleaving configuration of the set of multiple interleaving configurations corresponding to a different transport block size range; and to communicate with the UE based on an interleaving configuration from the set of multiple interleaving configurations for the communications in the first transmission direction, the interleaving configuration based on a transport block size configured for the first transmission direction in the slot falling within a transport block size range for the interleaving configuration.

In some examples of the method, apparatuses, and non-transitory computer-readable medium described herein, transmitting the indication of the set of multiple interleaving configurations may include operations, features, means, or instructions for transmitting the indication of the set of multiple interleaving configurations for full-duplex communications during the slot in the first transmission direction, the first transmission direction occurring within the slot at a same time as a second transmission direction within the slot, the first transmission direction being different from the second transmission direction.

Some examples of the method, apparatuses, and non-transitory computer-readable medium described herein may further include operations, features, means, or instructions for transmitting, to the UE, an indication of a codeblock mapping configuration for the communications in the first transmission direction, the codeblock mapping configuration including a mapping of a set of multiple codeblocks for the communications in the first transmission direction to a set of multiple virtual resource blocks; and for determining the interleaving configuration for the communications in the first transmission direction based on the indication of the codeblock mapping configuration and the transport block size configured for the first transmission direction.

Some examples of the method, apparatuses, and non-transitory computer-readable medium described herein may further include operations, features, means, or instructions for measuring a set of multiple levels of self-interference for a set of multiple codeblocks for communications in the first transmission direction, the self-interference for the communications in the first transmission direction caused by communications in a second transmission direction occurring at a same time as the communications in the first transmission direction; and for determining the interleaving configuration for the communications in the first transmission direction based on a difference between a first level of the set of multiple levels of self-interference and a second level of the set of multiple levels of self-interference satisfying a threshold value.

Some examples of the method, apparatuses, and non-transitory computer-readable medium described herein may further include operations, features, means, or instructions for determining one or more transmission characteristics for the communications in the first transmission direction, where the interleaving configuration is determined based on the one or more transmission characteristics.

Some examples of the method, apparatuses, and non-transitory computer-readable medium described herein may further include operations, features, means, or instructions for determining a number of codeblocks mapped per symbol of the slot, where the interleaving configuration is determined based on the number of codeblocks mapped per symbol satisfying a threshold value.

In some examples of the method, apparatuses, and non-transitory computer-readable medium described herein, transmitting the indication of the set of multiple interleaving configuration may include operations, features, means, or instructions for transmitting, to the UE, the indication of the set of multiple interleaving configurations via RRC signaling.

A method for wireless communication at a UE is described. The method may include receiving, from the device, an indication of a set of multiple interleaving configurations for communications in a first transmission direction in a slot with the device, each interleaving configuration of the set of multiple interleaving configurations corresponding to a different transport block size range; and communicating with the device based on an interleaving configuration from the set of multiple interleaving configurations for the communications in the first transmission direction, the interleaving configuration based on a transport block size configured for the first transmission direction in the slot falling within a transport block size range for the interleaving configuration.

An apparatus for wireless communications at a device is described. The apparatus may include a processor and memory coupled to the processor. The processor and memory may be configured to receive, from the device, an indication of a set of multiple interleaving configurations for communications in a first transmission direction in a slot with the device, each interleaving configuration of the set of multiple interleaving configurations corresponding to a different transport block size range; and to communicate with the device based on an interleaving configuration from the set of multiple interleaving configurations for the communications in the first transmission direction, the interleaving configuration based on a transport block size configured for the first transmission direction in the slot falling within a transport block size range for the interleaving configuration.

Another apparatus for wireless communication at a UE is described. The apparatus may include means for receiving, from the device, an indication of a set of multiple interleaving configurations for communications in a first transmission direction in a slot with the device, each interleaving configuration of the set of multiple interleaving configurations corresponding to a different transport block size range; and means for communicating with the device based on an interleaving configuration from the set of multiple interleaving configurations for the communications in the first transmission direction, the interleaving configuration based on a transport block size configured for the first transmission direction in the slot falling within a transport block size range for the interleaving configuration.

A non-transitory computer-readable medium storing code for wireless communication at a UE is described. The code may include instructions executable by a processor to receive, from the device, an indication of a set of multiple interleaving configurations for communications in a first transmission direction in a slot with the device, each interleaving configuration of the set of multiple interleaving configurations corresponding to a different transport block size range; and to communicate with the device based on an interleaving configuration from the set of multiple interleaving configurations for the communications in the first transmission direction, the interleaving configuration based on a transport block size configured for the first transmission direction in the slot falling within a transport block size range for the interleaving configuration.

A method of wireless communication at a UE is described. The method may include determining a slot for full-duplex communications with a device including a first transmission direction occurring at a same time as a second transmission direction within the slot, the first transmission direction being different from the second transmission direction; receiving, from the device, an indication of a codeblock mapping configuration for communications in the first transmission direction, the codeblock mapping configuration including a mapping of a set of codeblocks for the communications in the first transmission direction to a set of virtual resource blocks; determining an interleaving configuration for the communications in the first transmissions direction based on the indication of the codeblock mapping configuration; and communicating with the device based on the interleaving configuration.

An apparatus for wireless communication at a UE is described. The apparatus may include a processor and memory coupled to the processor, the processor and memory configured to determine a slot for full-duplex communications with a device including a first transmission direction occurring at a same time as a second transmission direction within the slot, the first transmission direction being different from the second transmission direction; to receive, from the device, an indication of a codeblock mapping configuration for communications in the first transmission direction, the codeblock mapping configuration including a mapping of a set of codeblocks for the communications in the first transmission direction to a set of virtual resource blocks; to determine an interleaving configuration for the communications in the first transmissions direction based on the indication of the codeblock mapping configuration; and to communicate with the device based on the interleaving configuration.

Another apparatus for wireless communication at a UE is described. The apparatus may include means for determining a slot for full-duplex communications with a device including a first transmission direction occurring at a same time as a second transmission direction within the slot, the first transmission direction being different from the second transmission direction; means for receiving, from the device, an indication of a codeblock mapping configuration for communications in the first transmission direction, the codeblock mapping configuration including a mapping of a set of codeblocks for the communications in the first transmission direction to a set of virtual resource blocks; means for determining an interleaving configuration for the communications in the first transmissions direction based on the indication of the codeblock mapping configuration; and means for communicating with the device based on the interleaving configuration.

A non-transitory computer-readable medium storing code for wireless communication at a UE is described. The code may include instructions executable by a processor to determine a slot for full-duplex communications with a device including a first transmission direction occurring at a same time as a second transmission direction within the slot, the first transmission direction being different from the second transmission direction; to receive, from the device, an indication of a codeblock mapping configuration for communications in the first transmission direction, the codeblock mapping configuration including a mapping of a set of codeblocks for the communications in the first transmission direction to a set of virtual resource blocks; to determine an interleaving configuration for the communications in the first transmissions direction based on the indication of the codeblock mapping configuration; and to communicate with the device based on the interleaving configuration.

In some examples of the method, apparatuses, and non-transitory computer-readable medium described herein, determining the interleaving configuration further may include operations, features, means, or instructions for receiving, from the device, an indication of a set of interleaving configurations for the communications in the first transmission direction with the device, each interleaving configuration of the set of interleaving configurations corresponding to a different transport block size range, and selecting the interleaving configuration from the set of interleaving configurations for the communications in the first transmission direction based on a transport block size configured for the first transmission direction in the slot falling within a transport block size range for the interleaving configuration, where the interleaving configuration may be determined based on the transport block size configured for the first transmission direction and the indication of the codeblock mapping configuration.

In some examples of the method, apparatuses, and non-transitory computer-readable medium described herein, receiving the indication of the set of interleaving configurations may include operations, features, means, or instructions for receiving, from the device, the indication of the set of interleaving configurations via RRC signaling.

In some examples of the method, apparatuses, and non-transitory computer-readable medium described herein, determining the interleaving configuration further may include operations, features, means, or instructions for measuring a set of levels of self-interference for the set of codeblocks for communications in the first transmission direction, the self-interference for the communications in the first transmission direction caused by communications in the second transmission direction; and for determining the interleaving configuration for the communications in the first transmissions direction based on a difference between a first level of the set of levels of self-interference and a second level of the set of levels of self-interference satisfying a threshold value.

In some examples of the method, apparatuses, and non-transitory computer-readable medium described herein, the first level of the set of levels of self-interference may be different than the second level of the set of levels of self-interference based on the codeblock mapping configuration.

In some examples of the method, apparatuses, and non-transitory computer-readable medium described herein, determining the interleaving configuration further may include operations, features, means, or instructions for determining one or more transmission characteristics for the communications in the first transmission direction, where the interleaving configuration may be determined based on the one or more transmission characteristics.

In some examples of the method, apparatuses, and non-transitory computer-readable medium described herein, the one or more transmission characteristics include a presence of communications in the second transmission direction causing self-interference on the communications in the first transmission direction, a frequency and time domain allocation for the communications in the first transmission direction, a codeblock size for the set of the codeblocks, a codeblock length for the set of the codeblocks, or any combination thereof.

In some examples of the method, apparatuses, and non-transitory computer-readable medium described herein, determining the interleaving configuration further may include operations, features, means, or instructions for determining a number of codeblocks mapped per symbol of the slot, where the interleaving configuration may be determined based on the number of codeblocks mapped per symbol satisfying a threshold value.

In some examples of the method, apparatuses, and non-transitory computer-readable medium described herein, the interleaving configuration includes a frequency domain interleaving configuration, a virtual resource block-to-physical resource block mapping configuration, or a combination thereof for the communications in the first direction.

In some examples of the method, apparatuses, and non-transitory computer-readable medium described herein, the first transmission direction includes uplink communications, downlink communications, or sidelink communications, and the second transmission direction includes uplink communications, downlink communications, or sidelink communications that may be different than the first transmission direction.

In some examples of the method, apparatuses, and non-transitory computer-readable medium described herein, the device includes a UE, a base station, or an additional wireless device, or a combination thereof.

A method of wireless communication at a UE is described. The method may include determining a slot for full-duplex communications with at least a device including a first transmission direction occurring at a same time as a second transmission direction within the slot, the first transmission direction being different than the second transmission direction; receiving, from the device, an indication of a set of interleaving configurations for communications in the first transmission direction with the device, each interleaving configuration of the set of interleaving configurations corresponding to a different transport block size range; selecting an interleaving configuration from the set of interleaving configurations for the communications in the first transmission direction based on a transport block size configured for the first transmission direction in the slot falling within a transport block size range for the interleaving configuration; and communicating with the device based on the interleaving configuration.

An apparatus for wireless communication at a UE is described. The apparatus may include a processor and memory coupled to the processor, the processor and memory configured to determine a slot for full-duplex communications with at least a device including a first transmission direction occurring at a same time as a second transmission direction within the slot, the first transmission direction being different than the second transmission direction; to receive, from the device, an indication of a set of interleaving configurations for communications in the first transmission direction with the device, each interleaving configuration of the set of interleaving configurations corresponding to a different transport block size range; to select an interleaving configuration from the set of interleaving configurations for the communications in the first transmission direction based on a transport block size configured for the first transmission direction in the slot falling within a transport block size range for the interleaving configuration; and to communicate with the device based on the interleaving configuration.

Another apparatus for wireless communication at a UE is described. The apparatus may include means for determining a slot for full-duplex communications with at least a device including a first transmission direction occurring at a same time as a second transmission direction within the slot, the first transmission direction being different than the second transmission direction; means for receiving, from the device, an indication of a set of interleaving configurations for communications in the first transmission direction with the device, each interleaving configuration of the set of interleaving configurations corresponding to a different transport block size range; means for selecting an interleaving configuration from the set of interleaving configurations for the communications in the first transmission direction based on a transport block size configured for the first transmission direction in the slot falling within a transport block size range for the interleaving configuration; and means for communicating with the device based on the interleaving configuration.

A non-transitory computer-readable medium storing code for wireless communication at a UE is described. The code may include instructions executable by a processor to determine a slot for full-duplex communications with at least a device including a first transmission direction occurring at a same time as a second transmission direction within the slot, the first transmission direction being different than the second transmission direction; to receive, from the device, an indication of a set of interleaving configurations for communications in the first transmission direction with the device, each interleaving configuration of the set of interleaving configurations corresponding to a different transport block size range; to select an interleaving configuration from the set of interleaving configurations for the communications in the first transmission direction based on a transport block size configured for the first transmission direction in the slot falling within a transport block size range for the interleaving configuration; and to communicate with the device based on the interleaving configuration.

Some examples of the method, apparatuses, and non-transitory computer-readable medium described herein may further include operations, features, means, or instructions for receiving, from the device, an indication of a codeblock mapping configuration for the communications in the first transmission direction, the codeblock mapping configuration including a mapping of a set of codeblocks for the communications in the first transmission direction to a set of virtual resource blocks, and determining the interleaving configuration for the communications in the first transmissions direction based on the indication of the codeblock mapping configuration and the transport block size configured for the first transmission direction.

In some examples of the method, apparatuses, and non-transitory computer-readable medium described herein, determining the interleaving configuration further may include operations, features, means, or instructions for measuring a set of levels of self-interference for a set of codeblocks for communications in the first transmission direction, the self-interference for the communications in the first transmission direction caused by communications in the second transmission direction; and for determining the interleaving configuration for the communications in the first transmissions direction based on a difference between a first level of the set of levels of self-interference and a second level of the set of levels of self-interference satisfying a threshold value.

In some examples of the method, apparatuses, and non-transitory computer-readable medium described herein, the first level of the set of levels of self-interference may be different than the second level of the set of levels of self-interference based on the codeblock mapping configuration.

In some examples of the method, apparatuses, and non-transitory computer-readable medium described herein, determining the interleaving configuration further may include operations, features, means, or instructions for determining one or more transmission characteristics for the communications in the first transmission direction, where the interleaving configuration may be determined based on the one or more transmission characteristics.

In some examples of the method, apparatuses, and non-transitory computer-readable medium described herein, the one or more transmission characteristics include a presence of communications in the second transmission direction causing self-interference on the communications in the first transmission direction, a frequency and time domain allocation for the communications in the first transmission direction, a codeblock size for the set of the codeblocks, a codeblock length for the set of the codeblocks, or any combination thereof.

In some examples of the method, apparatuses, and non-transitory computer-readable medium described herein, determining the interleaving configuration further may include operations, features, means, or instructions for determining a number of codeblocks mapped per symbol of the slot, where the interleaving configuration may be determined based on the number of codeblocks mapped per symbol satisfying a threshold value.

In some examples of the method, apparatuses, and non-transitory computer-readable medium described herein, receiving the indication of the set of interleaving configurations may include operations, features, means, or instructions for receiving, from the device, the indication of the set of interleaving configurations via radio resource control signaling.

In some examples of the method, apparatuses, and non-transitory computer-readable medium described herein, the interleaving configuration includes a frequency domain interleaving configuration, a virtual resource block-to-physical resource block mapping configuration, or a combination thereof for the communications in the first direction.

In some examples of the method, apparatuses, and non-transitory computer-readable medium described herein, the first transmission direction includes uplink communications, downlink communications, or sidelink communications, and the second transmission direction includes uplink communications, downlink communications, or sidelink communications that may be different than the first transmission direction.

In some examples of the method, apparatuses, and non-transitory computer-readable medium described herein, the device includes a UE, a base station, or an additional wireless device, or a combination thereof.

A method of wireless communications at a device is described. The method may include determining a slot for full-duplex communications with at least a UE including a first transmission direction occurring at a same time as a second transmission direction within the slot, the first transmission direction being different than the second transmission direction; transmitting, to the UE, an indication of a codeblock mapping configuration for communications in the first transmission direction, the codeblock mapping configuration including a mapping of a set of codeblocks for the communications in the first transmission direction to a set of virtual resource blocks; determining an interleaving configuration for the communications in the first transmissions direction based on the indication of the codeblock mapping configuration; and communicating with the UE based on the interleaving configuration.

An apparatus for wireless communications at a device is described. The apparatus may include a processor and memory coupled to the processor, the processor and memory configured to determine a slot for full-duplex communications with at least a UE including a first transmission direction occurring at a same time as a second transmission direction within the slot, the first transmission direction being different than the second transmission direction; to transmit, to the UE, an indication of a codeblock mapping configuration for communications in the first transmission direction, the codeblock mapping configuration including a mapping of a set of codeblocks for the communications in the first transmission direction to a set of virtual resource blocks; to determine an interleaving configuration for the communications in the first transmissions direction based on the indication of the codeblock mapping configuration; and to communicate with the UE based on the interleaving configuration.

Another apparatus for wireless communications at a device is described. The apparatus may include means for determining a slot for full-duplex communications with at least a UE including a first transmission direction occurring at a same time as a second transmission direction within the slot, the first transmission direction being different than the second transmission direction; means for transmitting, to the UE, an indication of a codeblock mapping configuration for communications in the first transmission direction, the codeblock mapping configuration including a mapping of a set of codeblocks for the communications in the first transmission direction to a set of virtual resource blocks; means for determining an interleaving configuration for the communications in the first transmissions direction based on the indication of the codeblock mapping configuration; and means for communicating with the UE based on the interleaving configuration.

A non-transitory computer-readable medium storing code for wireless communications at a device is described. The code may include instructions executable by a processor to determine a slot for full-duplex communications with at least a UE including a first transmission direction occurring at a same time as a second transmission direction within the slot, the first transmission direction being different than the second transmission direction; to transmit, to the UE, an indication of a codeblock mapping configuration for communications in the first transmission direction, the codeblock mapping configuration including a mapping of a set of codeblocks for the communications in the first transmission direction to a set of virtual resource blocks; to determine an interleaving configuration for the communications in the first transmissions direction based on the indication of the codeblock mapping configuration; and to communicate with the UE based on the interleaving configuration.

In some examples of the method, apparatuses, and non-transitory computer-readable medium described herein, determining the interleaving configuration further may include operations, features, means, or instructions for transmitting, to the UE, an indication of a set of interleaving configurations for the communications in the first transmission direction with the UE, each interleaving configuration of the set of interleaving configurations corresponding to a different transport block size range, and determining the interleaving configuration from the set of interleaving configurations for the communications in the first transmission direction based on a transport block size configured for the first transmission direction in the slot falling within a transport block size range for the interleaving configuration, where the interleaving configuration may be determined based on the transport block size configured for the first transmission direction and the indication of the codeblock mapping configuration.

In some examples of the method, apparatuses, and non-transitory computer-readable medium described herein, transmitting the indication of the set of interleaving configurations may include operations, features, means, or instructions for transmitting, to the UE, the indication of the set of interleaving configurations via radio resource control signaling.

In some examples of the method, apparatuses, and non-transitory computer-readable medium described herein, determining the interleaving configuration further may include operations, features, means, or instructions for measuring a set of levels of self-interference for the set of codeblocks for communications in the first transmission direction, the self-interference for the communications in the first transmission direction caused by communications in the second transmission direction; and for determining the interleaving configuration for the communications in the first transmissions direction based on a difference between a first level of the set of levels of self-interference and a second level of the set of levels of self-interference satisfying a threshold value.

In some examples of the method, apparatuses, and non-transitory computer-readable medium described herein, the first level of the set of levels of self-interference may be different than the second level of the set of levels of self-interference based on the codeblock mapping configuration.

In some examples of the method, apparatuses, and non-transitory computer-readable medium described herein, determining the interleaving configuration further may include operations, features, means, or instructions for determining one or more transmission characteristics for the communications in the first transmission direction, where the interleaving configuration may be determined based on the one or more transmission characteristics.

In some examples of the method, apparatuses, and non-transitory computer-readable medium described herein, the one or more transmission characteristics include a presence of communications in the second transmission direction causing self-interference on the communications in the first transmission direction, a frequency and time domain allocation for the communications in the first transmission direction, a codeblock size for the set of the codeblocks, a codeblock length for the set of the codeblocks, or any combination thereof.

In some examples of the method, apparatuses, and non-transitory computer-readable medium described herein, determining the interleaving configuration further may include operations, features, means, or instructions for determining a number of codeblocks mapped per symbol of the slot, where the interleaving configuration may be determined based on the number of codeblocks mapped per symbol satisfying a threshold value.

In some examples of the method, apparatuses, and non-transitory computer-readable medium described herein, the interleaving configuration includes a frequency domain interleaving configuration, a virtual resource block-to-physical resource block mapping configuration, or a combination thereof for the communications in the first direction.

In some examples of the method, apparatuses, and non-transitory computer-readable medium described herein, the first transmission direction includes uplink communications, downlink communications, or sidelink communications, and the second transmission direction includes uplink communications, downlink communications, or sidelink communications that may be different than the first transmission direction.

In some examples of the method, apparatuses, and non-transitory computer-readable medium described herein, the device includes a UE, a base station, or an additional wireless device, or a combination thereof.

A method of wireless communications at a device is described. The method may include determining a slot for full-duplex communications with at least a UE including a first transmission direction occurring at a same time as a second transmission direction within the slot, the first transmission direction being different than the second transmission direction; transmitting, to the UE, an indication of a set of interleaving configurations for communications in the first transmission direction with the UE, each interleaving configuration of the set of interleaving configurations corresponding to a different transport block size range; determining an interleaving configuration from the set of interleaving configurations for the communications in the first transmission direction based on a transport block size configured for the first transmission direction in the slot falling within a transport block size range for the interleaving configuration; and communicating with the UE based on the interleaving configuration.

An apparatus for wireless communications at a device is described. The apparatus may include a processor and memory coupled to the processor, the processor and memory configured to determine a slot for full-duplex communications with at least a UE including a first transmission direction occurring at a same time as a second transmission direction within the slot, the first transmission direction being different than the second transmission direction; to transmit, to the UE, an indication of a set of interleaving configurations for communications in the first transmission direction with the UE, each interleaving configuration of the set of interleaving configurations corresponding to a different transport block size range; to determine an interleaving configuration from the set of interleaving configurations for the communications in the first transmission direction based on a transport block size configured for the first transmission direction in the slot falling within a transport block size range for the interleaving configuration; and to communicate with the UE based on the interleaving configuration.

Another apparatus for wireless communications at a device is described. The apparatus may include means for determining a slot for full-duplex communications with at least a UE including a first transmission direction occurring at a same time as a second transmission direction within the slot, the first transmission direction being different than the second transmission direction; means for transmitting, to the UE, an indication of a set of interleaving configurations for communications in the first transmission direction with the UE, each interleaving configuration of the set of interleaving configurations corresponding to a different transport block size range; means for determining an interleaving configuration from the set of interleaving configurations for the communications in the first transmission direction based on a transport block size configured for the first transmission direction in the slot falling within a transport block size range for the interleaving configuration; and means for communicating with the UE based on the interleaving configuration.

A non-transitory computer-readable medium storing code for wireless communications at a device is described. The code may include instructions executable by a processor to determine a slot for full-duplex communications with at least a UE including a first transmission direction occurring at a same time as a second transmission direction within the slot, the first transmission direction being different than the second transmission direction; to transmit, to the UE, an indication of a set of interleaving configurations for communications in the first transmission direction with the UE, each interleaving configuration of the set of interleaving configurations corresponding to a different transport block size range; to determine an interleaving configuration from the set of interleaving configurations for the communications in the first transmission direction based on a transport block size configured for the first transmission direction in the slot falling within a transport block size range for the interleaving configuration; and to communicate with the UE based on the interleaving configuration.

Some examples of the method, apparatuses, and non-transitory computer-readable medium described herein may further include operations, features, means, or instructions for transmitting, to the UE, an indication of a codeblock mapping configuration for the communications in the first transmission direction, the codeblock mapping configuration including a mapping of a set of codeblocks for the communications in the first transmission direction to a set of virtual resource blocks, and determining the interleaving configuration for the communications in the first transmissions direction based on the indication of the codeblock mapping configuration and the transport block size configured for the first transmission direction.

In some examples of the method, apparatuses, and non-transitory computer-readable medium described herein, determining the interleaving configuration further may include operations, features, means, or instructions for measuring a set of levels of self-interference for a set of codeblocks for communications in the first transmission direction, the self-interference for the communications in the first transmission direction caused by communications in the second transmission direction; and for determining the interleaving configuration for the communications in the first transmissions direction based on a difference between a first level of the set of levels of self-interference and a second level of the set of levels of self-interference satisfying a threshold value.

In some examples of the method, apparatuses, and non-transitory computer-readable medium described herein, the first level of the set of levels of self-interference may be different than the second level of the set of levels of self-interference based on the codeblock mapping configuration.

In some examples of the method, apparatuses, and non-transitory computer-readable medium described herein, determining the interleaving configuration further may include operations, features, means, or instructions for determining one or more transmission characteristics for the communications in the first transmission direction, where the interleaving configuration may be determined based on the one or more transmission characteristics.

In some examples of the method, apparatuses, and non-transitory computer-readable medium described herein, the one or more transmission characteristics include a presence of communications in the second transmission direction causing self-interference on the communications in the first transmission direction, a frequency and time domain allocation for the communications in the first transmission direction, a codeblock size for the set of the codeblocks, a codeblock length for the set of the codeblocks, or any combination thereof.

In some examples of the method, apparatuses, and non-transitory computer-readable medium described herein, determining the interleaving configuration further may include operations, features, means, or instructions for determining a number of codeblocks mapped per symbol of the slot, where the interleaving configuration may be determined based on the number of codeblocks mapped per symbol satisfying a threshold value.

In some examples of the method, apparatuses, and non-transitory computer-readable medium described herein, transmitting the indication of the set of interleaving configurations may include operations, features, means, or instructions for transmitting, to the UE, the indication of the set of interleaving configurations via radio resource control signaling.

In some examples of the method, apparatuses, and non-transitory computer-readable medium described herein, the interleaving configuration includes a frequency domain interleaving configuration, a virtual resource block-to-physical resource block mapping configuration, or a combination thereof for the communications in the first direction.

In some examples of the method, apparatuses, and non-transitory computer-readable medium described herein, the first transmission direction includes uplink communications, downlink communications, or sidelink communications, and the second transmission direction includes uplink communications, downlink communications, or sidelink communications that may be different than the first transmission direction.

In some examples of the method, apparatuses, and non-transitory computer-readable medium described herein, the device includes a UE, a base station, or an additional wireless device, or a combination thereof.

DETAILED DESCRIPTION

Figure 1:
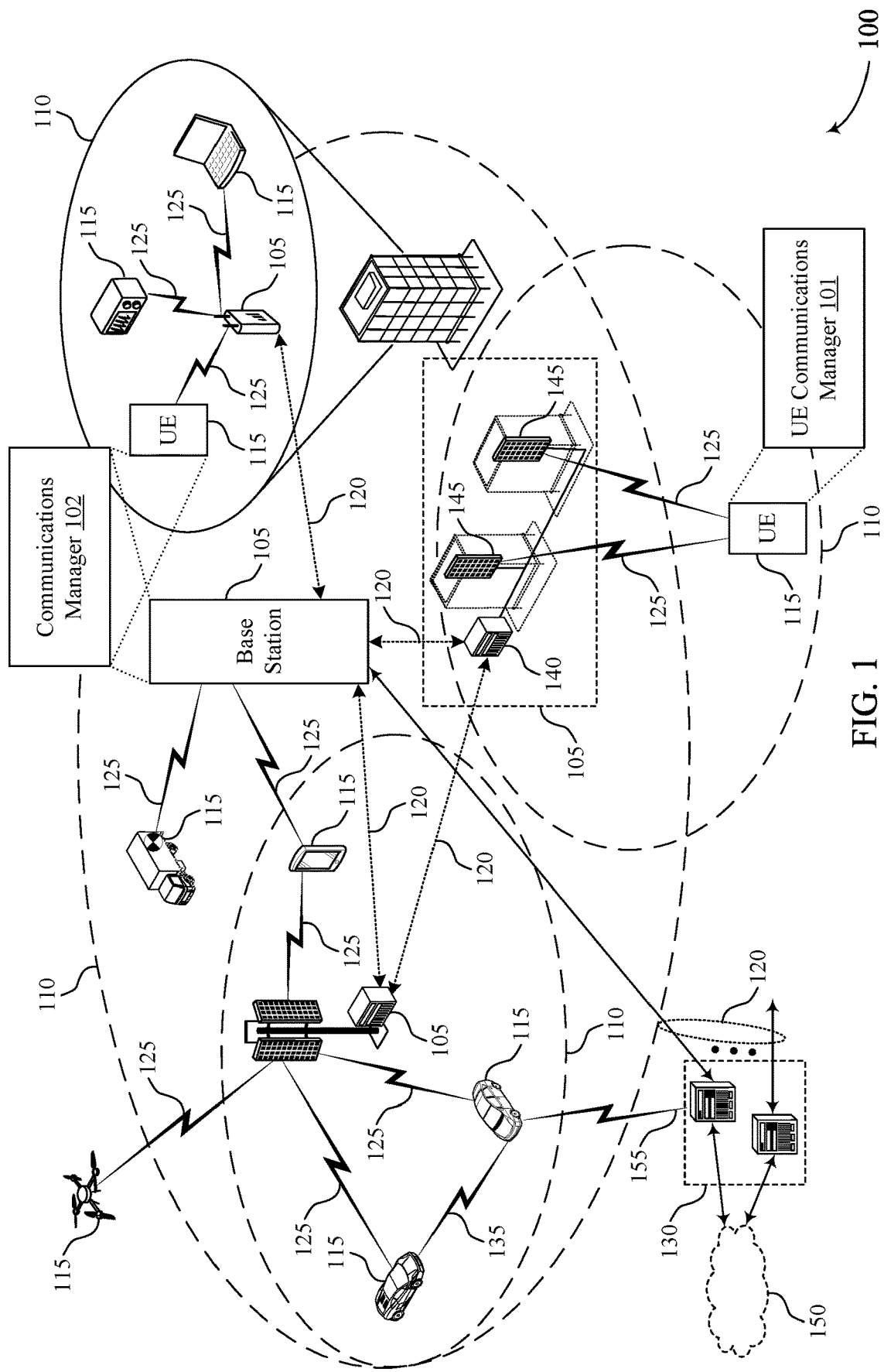
FIG. 1 illustrates an example of a system for wireless communications that supports techniques for interleaving in full-duplex slots in accordance with one or more aspects of the present disclosure.

In a full-duplex slot (e.g., communications in two different directions at a given time), self-interference may be predictable. For example, resource blocks for a first transmission direction that are directly adjacent to resource blocks for a second transmission direction may experience a high interference. As the gap between a given resource block for communications in a transmission direction and the other transmission direction increases in frequency, the self-interference decreases. Accordingly, frequency domain interleaving (e.g., virtual resource block-to-physical resource block mapping) may be redesigned to mitigate this predictable interference.

The techniques described herein may enable frequency domain interleaving for a transmission direction depending on a codeblock mapping configuration, a transport block size, or both. For example, the codeblocks mapping to virtual resource blocks (e.g., the codeblock mapping configuration) may determine the frequency domain interleaving. That is, a device (e.g., a UE, a base station, etc.) may use an existence of self-interference (e.g., existence of communications in a different transmission direction), a frequency domain allocation, a codeblock size, a number of codeblocks mapped per symbol, or a combination thereof for determining the frequency domain interleaving. Additionally, the device may determine the frequency domain interleaving based on a transport block size configured for a transmission direction in a full-duplex slot. For example, a table with different ranges of transport block size along with interleaver depth or different interleaver patterns may be RRC configured, and the device can determine the interleaver design based on the table. These techniques may be used together for determining the frequency domain interleaving (e.g., frequency domain interleaving is a function of both the codeblock mapping as well as the transport block size).

Using the techniques described herein, a device may determine or select an interleaving configuration that reduces or mitigates self-interference at the device that results from communications (e.g., full-duplex communications). As such, by reducing or mitigating the self-interference, the device may reduce signaling overhead by preempting retransmissions as a result of initial transmissions being successfully transmitted/received according to the interleaving configuration. This reduction in signaling overhead may also result in more efficient battery power for the device by preventing retransmissions and processing less signaling.

Aspects of the disclosure are initially described in the context of wireless communications systems. Additionally, aspects of the disclosure are illustrated through an additional wireless communications system, a slot (e.g., a full-duplex slot), and examples of process flows. Aspects of the disclosure are further illustrated by and described with reference to apparatus diagrams, system diagrams, and flowcharts that relate to techniques for interleaving in full-duplex slots.

FIG. 1 illustrates an example of a wireless communications system 100 that supports techniques for interleaving in full-duplex slots in accordance with one or more aspects of the present disclosure. The wireless communications system 100 may include one or more base stations 105, one or more UEs 115, and a core network 130. In some examples, the wireless communications system 100 may be an LTE network, an LTE-A network, an LTE-A Pro network, or an NR network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links. A UE 115 may communicate with the core network 130 through a communication link 155.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or DFT-S-OFDM). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some cases, a UE 115 in the wireless communications system 100 may communicate with an additional device (e.g., a base station 105, an additional UE 115, etc.) according to a full-duplex configuration, where a first transmission direction occurs at a same time as a second transmission direction within a slot configured for the full-duplex configuration, the first transmission direction being different than the second transmission direction. Based on the two transmission directions occurring at the same time, the UE 115 (e.g., or additional devices using a full-duplex configuration) may experience a self-interference. For example, the second transmission direction (e.g., downlink communications, uplink communications, etc.) may impact the first transmission direction (e.g., uplink communications, downlink communications, etc.), thereby reducing the ability of the UE 115 to successfully communicate in both transmission directions at the same time.

The UE 115 may implement a UE communications manager 101 to determine or select an interleaver configuration for communications in a transmission direction with the additional device to mitigate or lessen the impact of self-interference arising from the full-duplex configuration. The interleaving configuration may include a frequency domain interleaving configuration, a virtual resource block-to-physical resource block mapping configuration, or a combination thereof for the communications in the transmission direction. In some examples, the UE communications manager 101 may receive an indication of a codeblock mapping configuration for mapping one or more codeblocks for the communications in the transmission direction to one or more virtual resource blocks and may determine the interleaver configuration based on the codeblock mapping configuration. Additionally or alternatively, the UE communications manager 101 may receive an indication of a set of interleaving configurations for communications in the transmission direction with the additional device, where each interleaving configuration of the set of interleaving configurations corresponds to a different transport block size range, and may select an interleaving configuration from the set of interleaving configurations based on a transport block size configured for the transmission direction falling within a transport block size range for the interleaving configuration. In some cases, the UE communications manager 101 may determine the interleaver configuration based on the codeblock mapping configuration and the transport block size.

Additionally, a UE 115, a base station 105, or both may implement a communications manager 102 to determine an interleaver configuration for communications in a transmission direction with the UE 115 to mitigate or lessen the impact of self-interference arising from the full-duplex configuration. In some examples, the communications manager 102 may transmit an indication of a codeblock mapping configuration and may determine the interleaver configuration based on the codeblock mapping configuration. Additionally or alternatively, the communications manager 102 may transmit an indication of a set of interleaving configurations corresponding to different transport block size ranges and may determine an interleaving configuration from the set of interleaving configurations based on a transport block size configured for the transmission direction falling within a transport block size range for the interleaving configuration. In some cases, the communications manager 102 may determine the interleaver configuration based on the codeblock mapping configuration and the transport block size.

Figure 2:
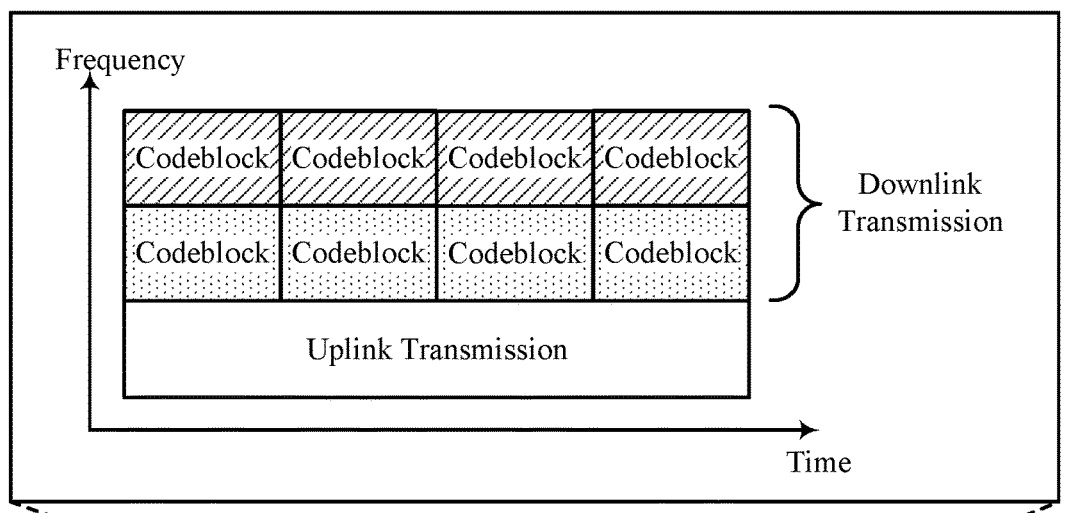
FIG. 2 illustrates an example of a wireless communications system that supports techniques for interleaving in full-duplex slots in accordance with one or more aspects of the present disclosure.
Figure 2:
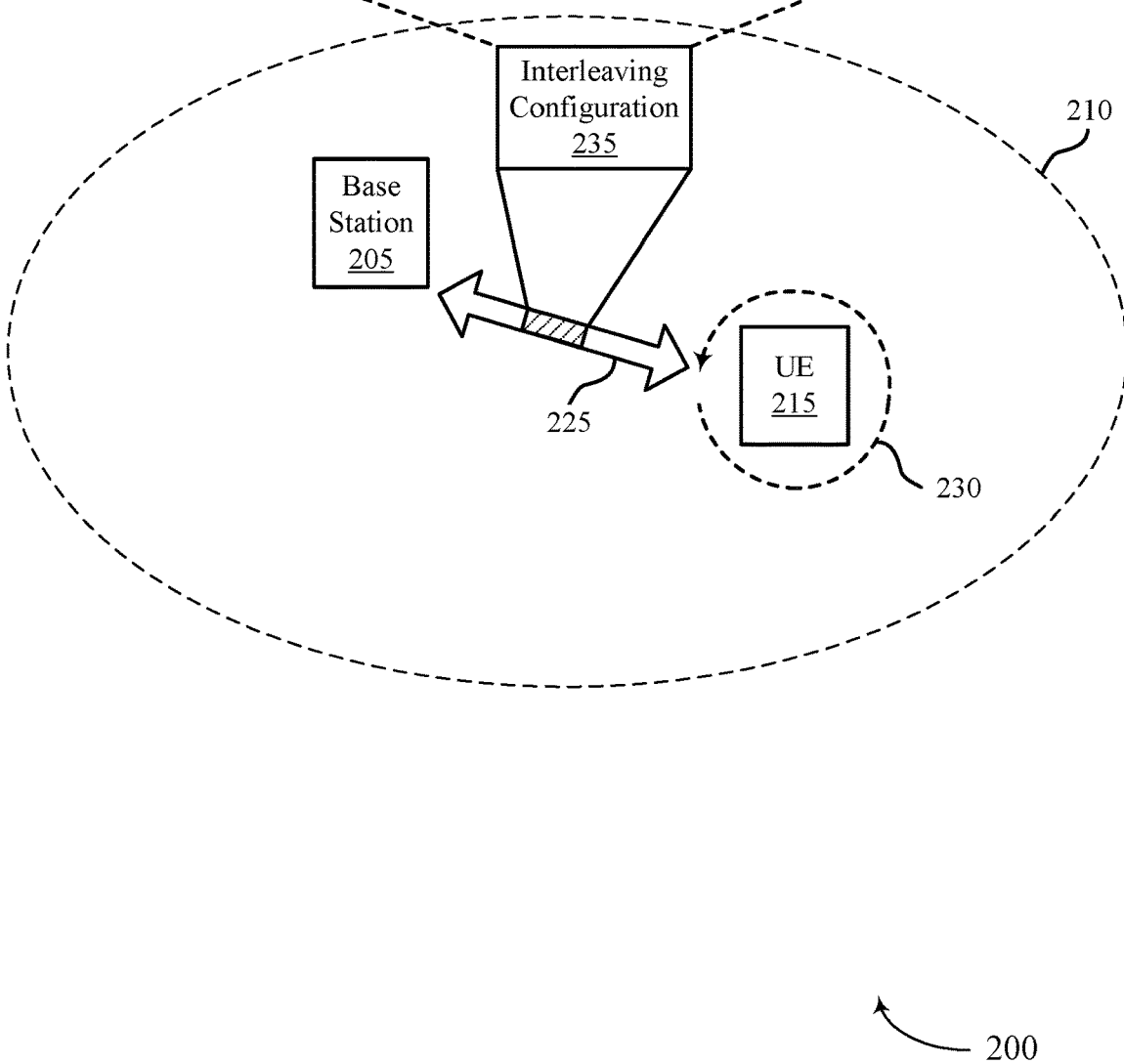

FIG. 2 illustrates an example of a wireless communications system 200 that supports techniques for interleaving in full-duplex slots in accordance with one or more aspects of the present disclosure. In some examples, wireless communications system 200 may implement aspects of or may be implemented by aspects of wireless communications system 100 and may include a UE 215, a base station 205 with a coverage area 210, and a communication link 225, which may be examples of a UE 115, base station 105, coverage area 110, and communication link 125, respectively, as described with reference to FIG. 1. For example, UE 215 may communicate according to a full-duplex mode in which UE 215 receives a downlink message from base station 205 via communication link 225 while concurrently transmitting an uplink message to base station 205 via communication link 225. However, the downlink message and uplink message may cause a self-interference 230 at UE 215. In some cases, UE 215 may apply an interleaving configuration 235 to the uplink message or the downlink message, which may reduce self-interference 230 at UE 215.

In some cases, one or more wireless devices (e.g., base station 205 or UEs 215) may communicate with one or more other wireless devices according to a full-duplex mode. For example, a base station 205 may transmit a downlink signal to one or more UEs 215 while receiving an uplink signal (e.g., from at least one of the one or more UEs 215 or receiving an additional signal from an additional device), which may result in downlink-to-uplink self-interference at the base station 205 (e.g., due to a proximity of reception and transmission antennas). Additionally or alternatively, a UE 215 may receive a downlink signal from a base station 205 while transmitting an uplink signal to a base station 205 (e.g., or the UE 215 may receive/transmit additional types of signals, such as sidelink signals, that impact other signaling at the UE 215), which may result in uplink-to-downlink self-interference at the UE 215 (e.g., as illustrated in FIG. 2 with self-interference 230). While downlink-to-uplink self-interference and uplink-to-downlink self-interference are described, different types of signaling in a first transmission direction for a device (e.g., UE 215, base station 205, etc.) may cause or be affected by self-interference from signaling in a second transmission direction occurring at a same time that is different than the first transmission direction.

In some examples, the UE 215 and the base station 205 may operate according to a full-duplex type. For example, the UE 215 and the base station 205 may communicate using in-band full-duplex (IBFD) in which the time and frequency resources for an uplink message and a downlink message may fully or partially overlap. For example, UE 215 and base station 205 may transmit and receive messages with same time and frequency resources. In some other examples, the UE 215 and the base station 205 may operate using sub-band frequency-division duplexing (FDD) in which the UE 215 and the base station 205 may transmit and receive messages at the same time, but with different frequency resources. Thus, the downlink resources may be separated from the uplink resource in the frequency domain. However, in IBFD and sub-band FDD, the uplink message and downlink message may interfere, for example due to the overlapping resources in IBFD or leakage between uplink and downlink in sub-band FDD, which may result in self-interference 230 at the UE 215 or a self-interference at the base station 205.

In some cases, techniques may be used for interference mitigation at the UE 215 or the base station 205 to reduce the effects of self-interference from full-duplex operations. For example, one or more different antenna panels may be used for transmission and reception operations. A communication band may have a number of slots (e.g., four slots), each slot including any number of time-frequency resources. A first antenna panel may be used for transmission in a first direction (e.g., transmitting downlink communications, transmitting uplink communications, etc.) at the edges of the band (e.g., the first and last slot). A second antenna panel may be used for reception in a second direction (e.g., receiving uplink communications, receiving downlink communications, etc.) in the middle of the band (e.g., the second and third slot). Using a first and second antenna panel (e.g., different antenna panels) may improve isolation (e.g., for communication with isolation greater than 50 decibels (dB)). In some examples, such as sub-band full-duplex operation (e.g., for isolation greater than 40 dB), downlink and uplink transmissions (e.g., or transmissions in other directions) may occur during different slots of the communication band. There may be leakage between the uplink and downlink transmissions. To mitigate the leakage, a receive windowed overlap-and-add (WOLA) may be introduced to reduce the dynamic range of the adjacent channel leakage ratio (ACLR). Additionally or alternatively, an analog low-pass filter may be introduced to improve the dynamic range of the analog to digital converter. In some cases, improving the receive automatic gain control (AGC) states may improve the noise figure. For interference mitigation (e.g., for isolation greater than 20 dB), a digital integrated circuit of the ACLR leakage may include a non-linear model for each reception and transmission pair.

In some examples, the self-interference may be predictable in a full-duplex slot. For example, the downlink resource blocks on an edge of an uplink communication band may experience relatively high interference, or the uplink resource blocks on an edge of a downlink communication band may experience relatively high interference. As the gap between a resource block and a communication band, or a slot, with an opposite communication direction increases (e.g., in frequency), the interference level may decrease. However, frequency domain interleaving, virtual resource block to physical resource block mapping, or both may not account for the predictability of self-interference, in some cases resulting in system inefficiencies, high signaling overhead (e.g., due to retransmissions), or both.

As described herein, wireless communications system 200 may support the use of techniques that enable UE 215 to determine an interleaving configuration 235, which may account for predictability of self-interference for full-duplex communications with base station 205. In some cases, the interleaving configuration 235 may correspond to a codeblock mapping configuration, which is shown and described with reference to FIG. 3. For example, UE 215, base station 205, or both (e.g., or an additional device) may determine the interleaving configuration 235 based on a codeblock mapping configured for communications between UE 215 and base station 205.

The codeblock mapping configuration may correspond to a mapping between codeblocks to virtual resource blocks, where the interleaving configuration 235 then corresponds to a frequency domain interleaving of the virtual resource blocks or a virtual resource block-to-physical resource block mapping (e.g., codeblocks are mapped to virtual resource blocks, which are then mapped to physical resource blocks). For example, the interleaving configuration 235 may include mapping data or information to codeblocks of a downlink transmission that experience lesser levels of self-interference, such as to which codeblocks that have been mapped to physical resource blocks (e.g., via the virtual resource blocks) that are further from an uplink transmission in the frequency domain. As such, based on how the codeblocks are mapped, UE 215, base station 205, or both may then determine the interleaving configuration 235. In some examples, base station 205 may determine the interleaving configuration 235 and then may transmit an indication of the interleaving configuration 235 to UE 215.

Additionally or alternatively, the interleaving configuration 235 may correspond to a transport block size. In some examples, such as in a half-duplex downlink transmission (e.g., a physical downlink shared channel (PDSCH) transmission), having the same depth interleaving configuration (e.g., bundle size) for different transport block sizes may result in inefficiencies. Similar inefficiencies may occur for full-duplex communication. Thus, depending on the transport block size in a full-duplex channel, UE 215 may assume a virtual resource block to physical resource block mapping, a frequency domain interleaving configuration (e.g., the interleaving configuration 235), or both to achieve a relatively high gain. In some cases, base station 205 may configure UE 215 with an interleaving configuration 235 using RRC signaling via communication link 225. In some examples, the interleaving configuration 235 may include a table with different ranges of transport block size, interleaving depth, interleaving patterns, or a combination thereof. Accordingly, UE 215 may receive an indication of the table with different ranges of transport block size, interleaving depth, interleaving patterns, or a combination thereof for one or more corresponding interleaving configurations (e.g., via the RRC signaling), and UE 215 may then select the interleaving configuration 235 from the table (e.g., based on a transport block size configured for communication link 225).

Figure 3:
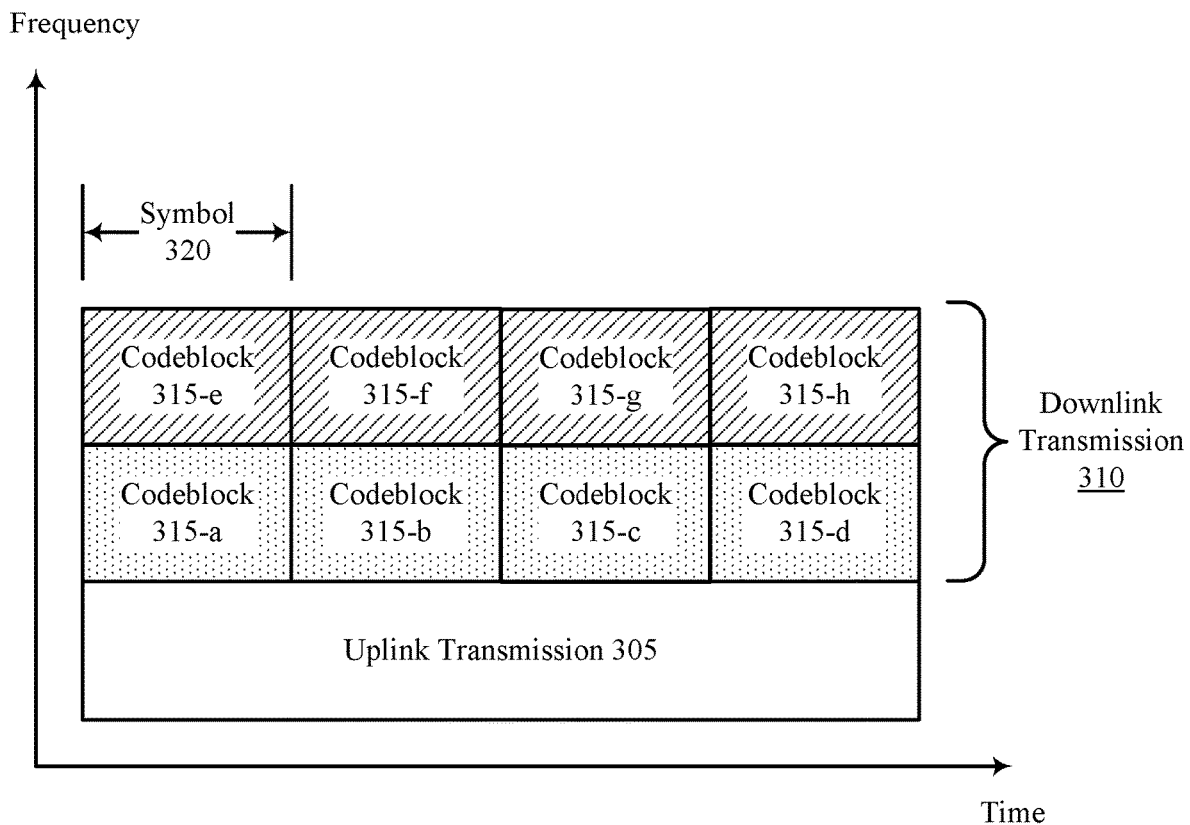
FIG. 3 illustrates an example of a slot that supports techniques for interleaving in full-duplex slots in accordance with one or more aspects of the present disclosure.

FIG. 3 illustrates an example of a diagram of a slot 300 that supports techniques for interleaving in full-duplex slots, in accordance with one or more aspects of the present disclosure. In some examples, the slot 300 may implement aspects of or may be implemented by aspects of wireless communications system 100, wireless communications system 200, or both. For example, a UE (e.g., a UE 115 or a UE 215 as described with reference to FIG. 1 and FIG. 2 respectively) may determine a slot 300 for full-duplex communications with a base station (e.g., a base station 105 or a base station 205 as described with reference to FIG. 1 and FIG. 2 respectively) or another UE. The slot 300 may represent a configured time for communication between the UE and the base station or between the UE and another UE. For example, the slot 300 may be considered a TTI, one or more consecutive symbols (e.g., OFDM symbols), or a different length duration of time.

In some cases, the slot 300 may include an uplink transmission 305 and a downlink transmission 310, which may share time-frequency resources. In some examples, the downlink transmission may include a number of codeblocks 315. Although eight codeblocks 315 are shown in the slot 300, downlink transmission 310 may include any number of codeblocks 315. In some cases, one or more codeblocks 315 of downlink transmission 310 may be allocated resources (e.g., time-frequency resources) adjacent to uplink transmission 305, which may result in self-interference at a transmitting and receiving device (e.g., the UE or a base station). For example, codeblock 315-a, codeblock 315-b, codeblock 315-c, and codeblock 315-d may use resources adjacent to uplink transmission 305. While downlink transmission 310 and uplink transmission 305 are shown in the example of FIG. 3, the techniques described herein may be used for mitigating self-interference caused by two differing transmission directions occurring at a same time for a device (e.g., UE, base station, etc.).

In some examples, frequency domain interleaving for downlink transmission 310 (e.g., a PDSCH) or uplink transmission 305 (e.g., a physical uplink shared channel (PUSCH)) may be applied based on the codeblock mapping to reduce self-interference at the transmitting and receiving device. In some examples, codeblock 315-a through codeblock 315-d may experience a similar level of self-interference based on resource allocation (e.g., using an adjacent resource to uplink transmission 305). Thus, interleaving between codeblocks 315-a through codeblock 315-d may not improve self-interference. However, when a codeblock 315-e, a codeblock 315-f, a codeblock 315-g, and a codeblock 315-h are introduced, the level of self-interference may vary from codeblock 315-a through codeblock 315-d and codeblock 315-e through codeblock 315-h. For example, the level of self-interference for codeblock 315-a through codeblock 315-d may be relatively high when compared with codeblock 315-e through codeblock 315-h (e.g., due to resource allocation proximity to uplink transmission 305). Therefore, it may be beneficial to introduce an interleaving configuration for codeblock 315-a through codeblock 315-h to balance out the interference level (e.g., such that the interference level for codeblock 315-a through codeblock 315-h are similar).

In some examples, the interleaving configuration may correspond to frequency domain interleaving of codeblocks 315. For example, the mapping of the codeblocks 315 to a virtual resource block may determine the frequency domain interleaving, the virtual resource block-to-physical resource block mapping, or both. That is, the codeblocks 315 may be mapped to virtual resource blocks (e.g., virtual resource blocks include resource blocks that are not used for actual transmission but are used to arrange the codeblocks 315), and then the virtual resource blocks may be mapped to physical resource blocks for actual transmission of downlink transmission 310. In some cases, the interleaving configuration may account for the self-interference in a slot or a symbol (e.g., based on uplink transmission 305 being active) and may include a frequency domain allocation, a codeblock size, or both. For example, if the codeblocks 315 experience a similar level of self-interference, the receiving and transmitting device may refrain from interleaving the codeblocks based on the interleaving configuration. If the codeblocks 315 experience a different level of self-interference (e.g., the level of self-interference at codeblock 315-a through codeblock 315-d may differ from the level of self-interference at codeblock 315-e through codeblock 315-h), the interleaving configuration may balance out the level of self-interference such that the level of self-interference for codeblock 315-a through codeblock 315-h may be similar.

In some examples, the interleaving configuration may be a function of multiple codeblock mappings. For example, the interleaving configuration may be a function of the number of codeblocks mapped to one symbol 320. If one codeblock 315 is mapped per symbol 320, the receiving and transmitting device may refrain from interleaving the codeblocks 315 based on the interleaving configuration. If more than one codeblock 315 is mapped per symbol 320 (e.g., as shown), an interlaced interleaving configuration may be applied to the codeblocks 315. For example, a base station may transmit downlink transmission 310 including each of the codeblocks 315 but may transmit the information or data for downlink transmission via codeblock 315-e through codeblock 315-h (e.g., those codeblocks 315 that are further in the frequency domain from uplink transmission 305). In some examples, the interleaving configuration (e.g., for frequency domain interleaving) may be a function of the codeblock mapping, the transport block size, or both.

Figure 4:
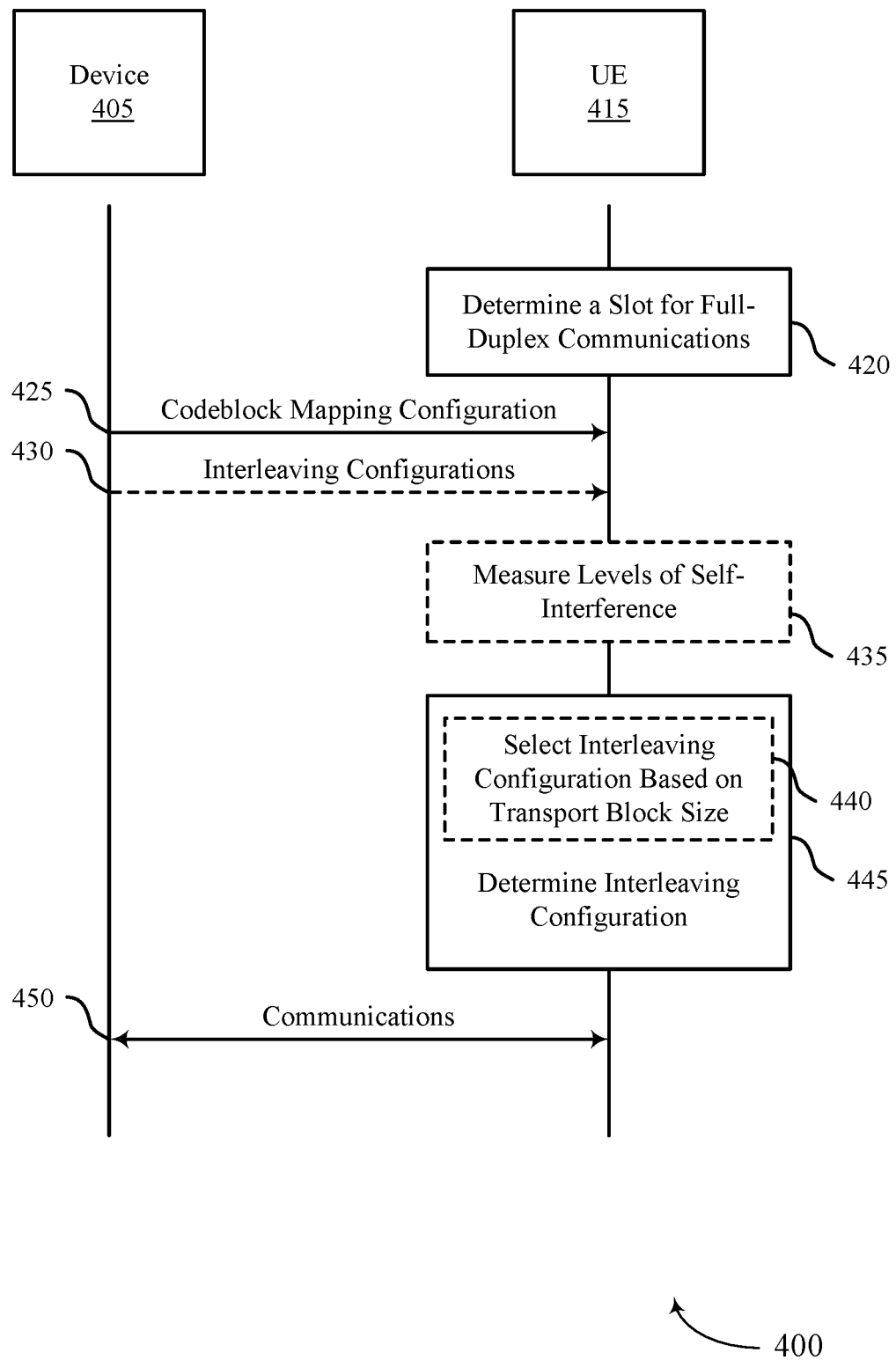
FIGS. 4 and 5 illustrate examples of process flows that support techniques for interleaving in full-duplex slots in accordance with one or more aspects of the present disclosure.

FIG. 4 illustrates an example of a process flow 400 that supports techniques for interleaving in full-duplex slots in accordance with one or more aspects of the present disclosure. In some examples, process flow 400 may implement aspects of or may be implemented by aspects of wireless communications system 100, wireless communications system 200, or both. For example, process flow 400 may include a device 405, which may be an example of a base station, a UE, or an additional wireless device described with reference to FIGS. 1-3. Additionally, process flow 400 may include a UE 415 which may be an example of a UE as described with reference to FIGS. 1-3.

In the following description of the process flow 400, the operations between UE 415 and device 405 may be transmitted in a different order than the order shown, or the operations performed by UE 415 and device 405 may be performed in different orders or at different times. Certain operations may also be left out of the process flow 400, or other operations may be added to the process flow 400. It is to be understood that while UE 415 and device 405 are shown performing a number of the operations of process flow 400, any wireless device may perform the operations shown.

At 420, UE 415 may determine a slot (e.g., a configured transmission duration) for full-duplex communications with device 405 that includes a first transmission direction occurring at a same time as a second transmission direction within the slot, the first transmission direction being different from the second transmission direction. In some cases, device 405 may also determine the slot for the full-duplex communications with UE 415. For example, the first transmission direction may include uplink communications, downlink communications, or sidelink communications, and the second transmission direction may include uplink communications, downlink communications, or sidelink communications that is different than the first transmission direction. Additionally, device 405 may be a UE, a base station, or an additional wireless device, or a combination thereof.

At 425, UE 415 may receive, from device 405, an indication of a codeblock mapping configuration for communications in the first transmission direction, the codeblock mapping configuration including a mapping of a set of codeblocks for the communications in the first transmission direction to a set of virtual resource blocks.

At 430, UE 415 may receive, from device 405, an indication of a set of interleaving configurations for the communications in the first transmission direction with device 405, each interleaving configuration of the set of interleaving configurations corresponding to a different transport block size range. In some cases, UE 415 may receive, from device 405, the indication of the set of interleaving configurations via RRC signaling.

At 435, UE 415 (e.g., and device 405) may measure a first level of self-interference for a first codeblock of the set of codeblocks for communications in the first transmission direction and a second level of self-interference for a second codeblock of the set of codeblocks (e.g., a set of levels of self-interferences for each codeblock of the set of codeblocks), the self-interference for the communications in the first transmission direction caused by communications in the second transmission direction (e.g., based on the full-duplex communications). In some cases, the first level of self-interference may be different than the second level of self-interference based on the codeblock mapping configuration.

At 440, UE 415 may select an interleaving configuration from the set of interleaving configurations for the communications in the first transmission direction based on a transport block size configured for the first transmission direction in the slot falling within a transport block size range for the interleaving configuration.

At 445, UE 415 (e.g., and device 405) may determine an interleaving configuration for the communications in the first transmission direction based on the indication of the codeblock mapping configuration. For example, the interleaving configuration may include a frequency domain interleaving configuration, a virtual resource block-to-physical resource block mapping configuration, or a combination thereof for the communications in the first transmission direction. Accordingly, UE 415 may determine the interleaving configuration for the communications in the first transmission direction based on a difference between the first level of self-interference and the second level of self-interference satisfying a threshold value (e.g., between two levels of self-interference for the set of codeblocks). Additionally or alternatively, UE 415 (e.g., and device 405) may determine the interleaving configuration based on the transport block size configured for the first transmission direction and the indication of the codeblock mapping configuration.

In some cases, UE 415 (e.g., and device 405) may determine one or more transmission characteristics for the communications in the first transmission direction, where the interleaving configuration is determined based on the one or more transmission characteristics. For example, the one or more transmission characteristics may include a presence of communications in the second transmission direction causing self-interference on the communications in the first transmission direction, a frequency and time domain allocation for the communications in the first transmission direction, a codeblock size for the set of the codeblocks, a codeblock length for the set of the codeblocks, or any combination thereof. Additionally or alternatively, UE 415 (e.g., and device 405) may determine a number of codeblocks mapped per symbol of the slot, where the interleaving configuration is determined based on the number of codeblocks mapped per symbol satisfying a threshold value.

At 450, UE 415 may communicate with device 405 based on the interleaving configuration.

Figure 5:
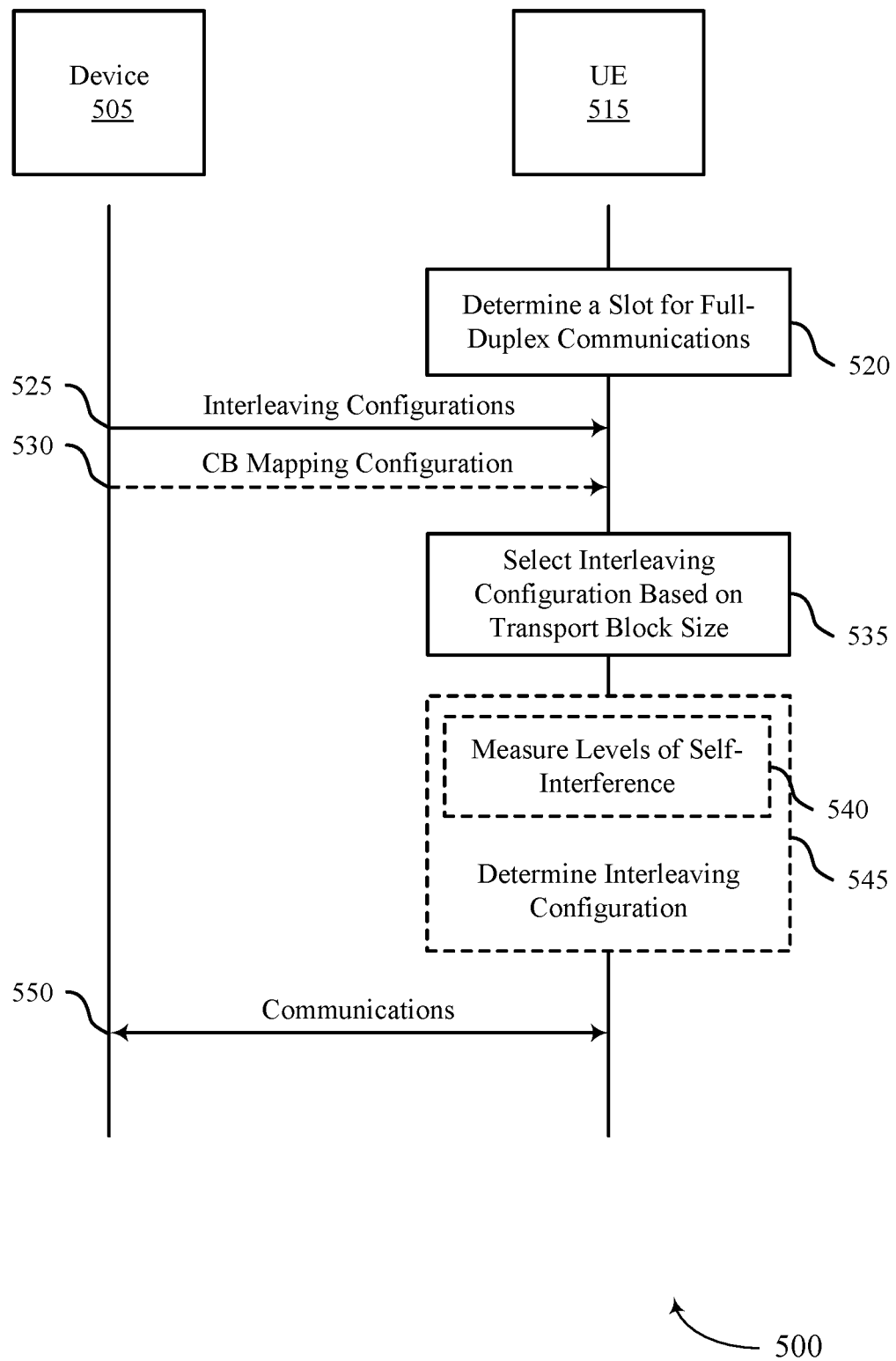

FIG. 5 illustrates an example of a process flow 500 that supports techniques for interleaving in full-duplex slots in accordance with one or more aspects of the present disclosure. In some examples, process flow 500 may implement aspects of or may be implemented by aspects of wireless communications system 100, wireless communications system 200, or both. For example, process flow 500 may include a device 505, which may be an example of a base station, a UE, or an additional wireless device described with reference to FIGS. 1-4. Additionally, process flow 500 may include a UE 515 which may be an example of a UE as described with reference to FIGS. 1-4.

In the following description of the process flow 500, the operations between UE 515 and device 505 may be transmitted in a different order than the order shown, or the operations performed by UE 515 and device 505 may be performed in different orders or at different times. Certain operations may also be left out of the process flow 500, or other operations may be added to the process flow 500. It is to be understood that while UE 515 and device 505 are shown performing a number of the operations of process flow 500, any wireless device may perform the operations shown.

At 520, UE 515 may determine a slot (e.g., a configured transmission duration) for full-duplex communications with device 505 that includes a first transmission direction occurring at a same time as a second transmission direction within the slot, the first transmission direction being different from the second transmission direction. In some cases, device 505 may also determine the slot for the full-duplex communications with UE 515. For example, the first transmission direction may include uplink communications, downlink communications, or sidelink communications, and the second transmission direction may include uplink communications, downlink communications, or sidelink communications that is different than the first transmission direction. Additionally, device 505 may be a UE, a base station, or an additional wireless device, or a combination thereof At 525, UE 515 may receive, from device 505, an indication of a set of interleaving configurations for communications in the first transmission direction with device 505, each interleaving configuration of the set of interleaving configurations corresponding to a different transport block size range. In some cases, UE 515 may receive, from device 505, the indication of the set of interleaving configurations via RRC signaling.

At 530, UE 515 may receive, from device 505, an indication of a codeblock mapping configuration for the communications in the first transmission direction, the codeblock mapping configuration including a mapping of a set of codeblocks for the communications in the first transmission direction to a set of virtual resource blocks.

At 535, UE 515 may select an interleaving configuration from the set of interleaving configurations for the communications in the first transmission direction based on a transport block size configured for the first transmission direction in the slot falling within a transport block size range for the interleaving configuration.

At 540, UE 515 (e.g., and device 505) may measure a first level of self-interference for a first codeblock of the set of codeblocks for communications in the first transmission direction and a second level of self-interference for a second codeblock of the set of codeblocks (e.g., a set of levels of self-interferences for each codeblock of the set of codeblocks), the self-interference for the communications in the first transmission direction caused by communications in the second transmission direction (e.g., based on the full-duplex communications). In some cases, the first level of self-interference may be different than the second level of self-interference based on the codeblock mapping configuration.

At 545, UE 515 may determine the interleaving configuration for the communications in the first transmission direction based on the indication of the codeblock mapping configuration and the transport block size configured for the first transmission direction. Additionally or alternatively, UE 515 may determine the interleaving configuration for the communications in the first transmission direction based on a difference between the first level of self-interference and the second level of self-interference satisfying a threshold value (e.g., between two levels of self-interference for the set of codeblocks).

In some cases, UE 515 (e.g., and device 505) may determine one or more transmission characteristics for the communications in the first transmission direction, where the interleaving configuration is determined based on the one or more transmission characteristics. For example, the one or more transmission characteristics may include a presence of communications in the second transmission direction causing self-interference on the communications in the first transmission direction, a frequency and time domain allocation for the communications in the first transmission direction, a codeblock size for the set of the codeblocks, a codeblock length for the set of the codeblocks, or any combination thereof. Additionally or alternatively, UE 515 (e.g., and device 505) may determine a number of codeblocks mapped per symbol of the slot, where the interleaving configuration is determined based on the number of codeblocks mapped per symbol satisfying a threshold value At 550, UE 515 may communicate with device 505 based on the interleaving configuration.

Figure 6:
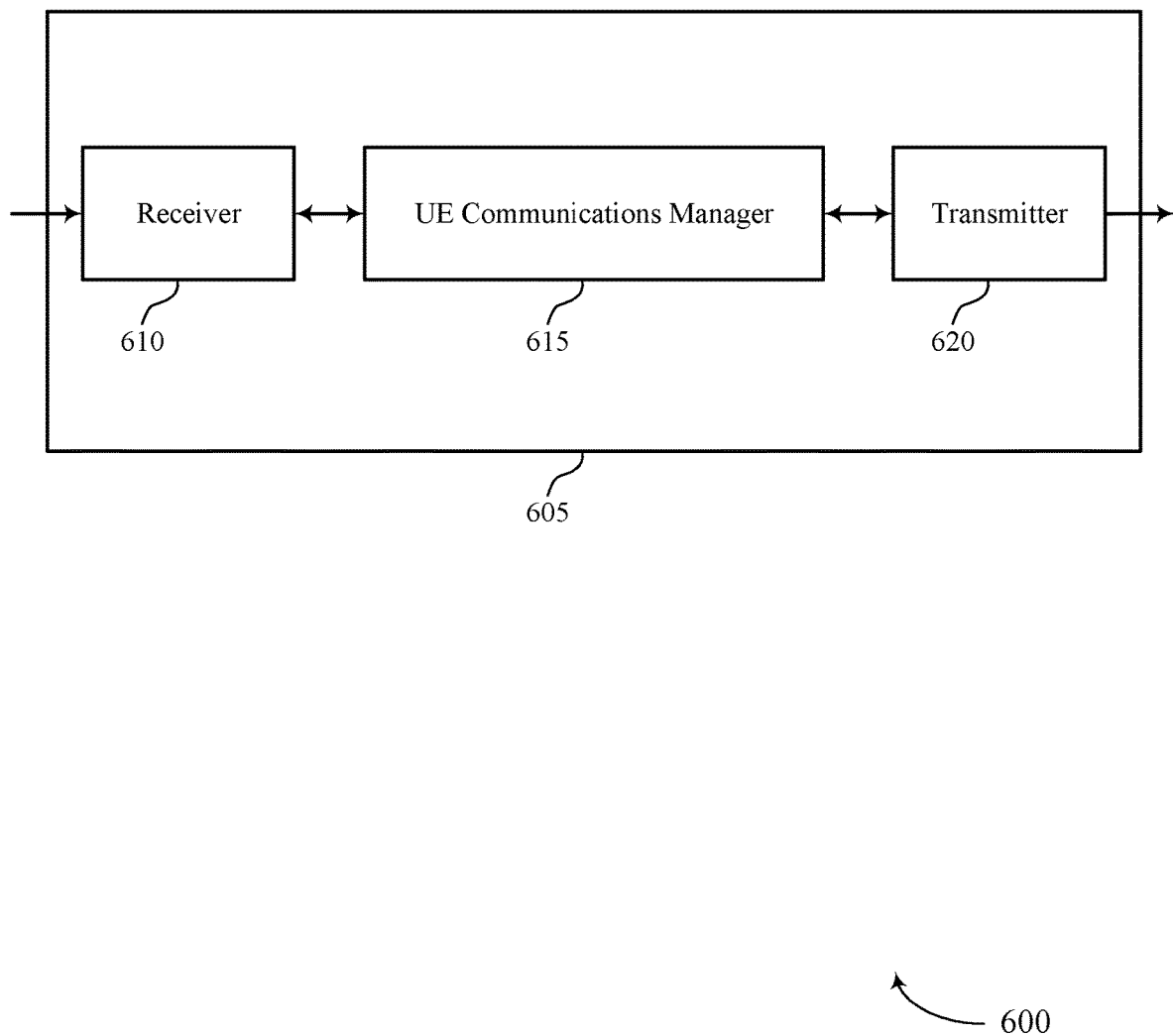
FIGS. 6 and 7 show block diagrams of devices that support techniques for interleaving in full-duplex slots in accordance with one or more aspects of the present disclosure.

FIG. 6 shows a block diagram 600 of a device 605 that supports techniques for interleaving in full-duplex slots in accordance with one or more aspects of the present disclosure. The device 605 may be an example of aspects of a UE 115 as described herein. The device 605 may include a receiver 610, a UE communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to techniques for interleaving in full-duplex slots, etc.). Information may be passed on to other components of the device 605. The receiver 610 may be an example of aspects of the transceiver 920 described with reference to FIG. 9. The receiver 610 may utilize a single antenna or a set of antennas.

The UE communications manager 615 may determine a slot for full-duplex communications with a device including a first transmission direction occurring at a same time as a second transmission direction within the slot, the first transmission direction being different from the second transmission direction. In some cases, the UE communications manager 615 may receive, from the device, an indication of a codeblock mapping configuration for communications in the first transmission direction, the codeblock mapping configuration including a mapping of a set of codeblocks for the communications in the first transmission direction to a set of virtual resource blocks. Additionally, the UE communications manager 615 may determine an interleaving configuration for the communications in the first transmission direction based on the indication of the codeblock mapping configuration. The UE communications manager 615 may then communicate with the device based on the interleaving configuration.

Additionally or alternatively, the UE communications manager 615 may determine a slot for full-duplex communications with at least a device including a first transmission direction occurring at a same time as a second transmission direction within the slot, the first transmission direction being different than the second transmission direction. In some cases, the UE communications manager 615 may receive, from the device, an indication of a set of interleaving configurations for communications in the first transmission direction with the device, each interleaving configuration of the set of interleaving configurations corresponding to a different transport block size range. Additionally, the UE communications manager 615 may select an interleaving configuration from the set of interleaving configurations for the communications in the first transmission direction based on a transport block size configured for the first transmission direction in the slot falling within a transport block size range for the interleaving configuration. The UE communications manager 615 may then communicate with the device based on the interleaving configuration. The UE communications manager 615 may be an example of aspects of the UE communications manager 910 described herein.

The actions performed by the UE communications manager 615 as described herein may support improvements in communications. In one or more aspects, the UE communications manager 615 may enable a UE to determine or select an interleaving configuration that reduces or mitigates self-interference at the UE that results from full-duplex communications. As such, by reducing or mitigating the self-interference, the UE communications manager 615 may enable the UE to reduce signaling overhead by preempting retransmissions as a result of initial transmissions being successfully transmitted/received according to the interleaving configuration. This reduction in signaling overhead may also result in more efficient battery power for the UE by preventing retransmissions and processing less signaling.

The UE communications manager 615, or its sub-components, may be implemented in hardware, code (e.g., software or firmware) executed by a processor, or any combination thereof. If implemented in code executed by a processor, the functions of the UE communications manager 615, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The UE communications manager 615, or its sub-components, may be physically located at various positions, including being distributed such that portions of functions are implemented at different physical locations by one or more physical components. In some examples, the UE communications manager 615, or its sub-components, may be a separate and distinct component in accordance with various aspects of the present disclosure. In some examples, the UE communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
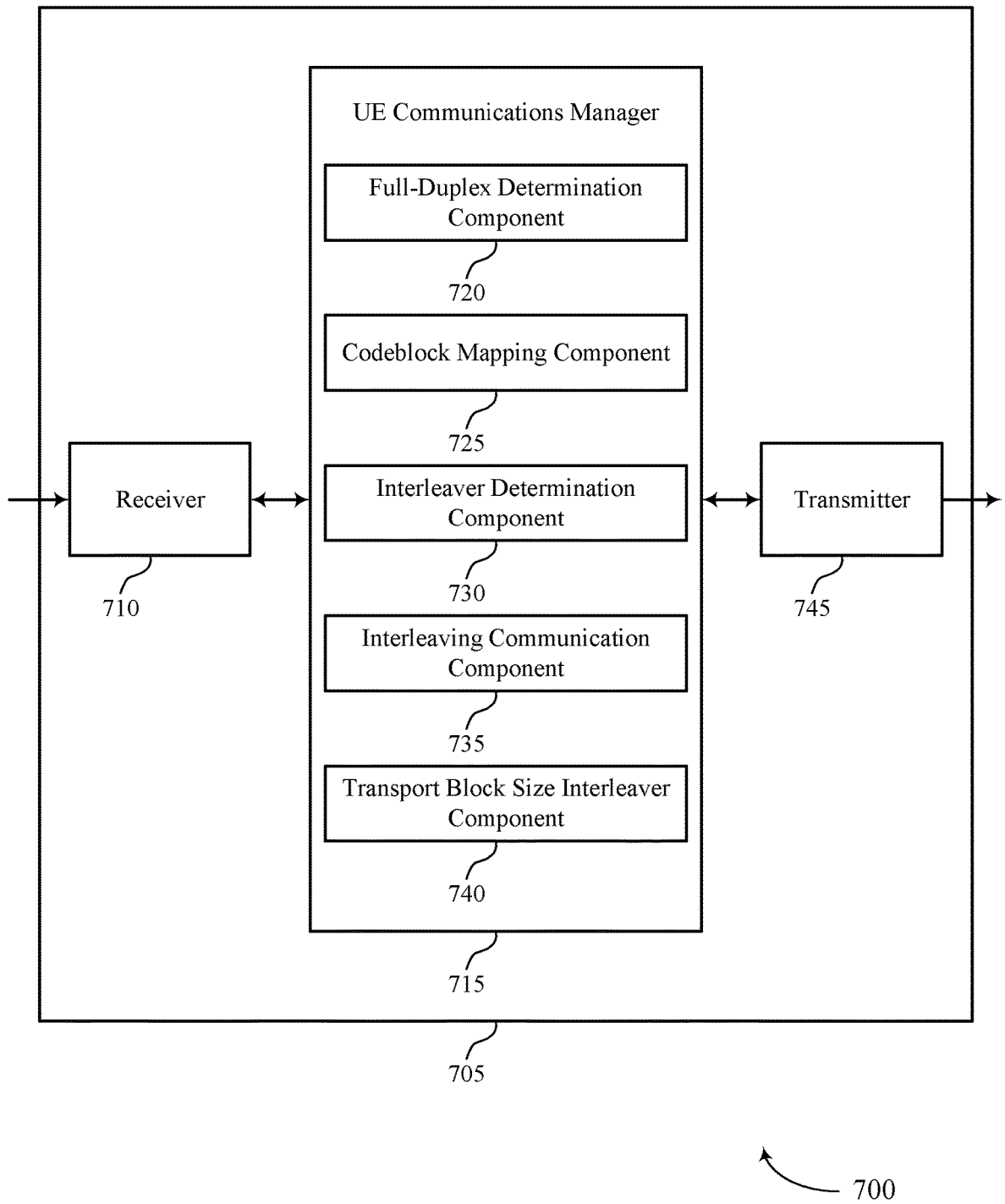

FIG. 7 shows a block diagram 700 of a device 705 that supports techniques for interleaving in full-duplex slots in accordance with one or more aspects of the present disclosure. The device 705 may be an example of aspects of a device 605, or a UE 115 as described herein. The device 705 may include a receiver 710, a UE communications manager 715, and a transmitter 745. The device 705 may also include a processor. Each of these components may be in communication with one another (e.g., via one or more buses).

The receiver 710 may receive information such as packets, user data, or control information associated with various information channels (e.g., control channels, data channels, and information related to techniques for interleaving in full-duplex slots, etc.). Information may be passed on to other components of the device 705. The receiver 710 may be an example of aspects of the transceiver 920 described with reference to FIG. 9. The receiver 710 may utilize a single antenna or a set of antennas.

The UE communications manager 715 may be an example of aspects of the UE communications manager 615 as described herein. The ULE communications manager 715 may include a full-duplex determination component 720, a codeblock mapping component 725, an interleaver determination component 730, an interleaving communication component 735, and a transport block size interleaver component 740. The UE communications manager 715 may be an example of aspects of the UE communications manager 910 described herein.

The full-duplex determination component 720 may determine a slot for full-duplex communications with a device including a first transmission direction occurring at a same time as a second transmission direction within the slot, the first transmission direction being different from the second transmission direction.

The codeblock mapping component 725 may receive, from the device, an indication of a codeblock mapping configuration for communications in the first transmission direction, the codeblock mapping configuration including a mapping of a set of codeblocks for the communications in the first transmission direction to a set of virtual resource blocks.

The interleaver determination component 730 may determine an interleaving configuration for the communications in the first transmission direction based on the indication of the codeblock mapping configuration.

The interleaving communication component 735 may communicate with the device based on the interleaving configuration.

Additionally or alternatively, the transport block size interleaver component 740 may receive, from the device, an indication of a set of interleaving configurations for communications in the first transmission direction with the device, each interleaving configuration of the set of interleaving configurations corresponding to a different transport block size range. Accordingly, the interleaver determination component 730 may select an interleaving configuration from the set of interleaving configurations for the communications in the first transmission direction based on a transport block size configured for the first transmission direction in the slot falling within a transport block size range for the interleaving configuration.

Based on determining or selecting an interleaver configuration for communications in a transmission direction, a processor of a UE (e.g., a processor controlling the receiver 710, the UE communications manager 715, the transmitter 745, a transceiver 920 described with reference to FIG. 9, or a combination thereof) may mitigate or lessen self-interference at the UE, thereby promoting more efficient communications. For example, by reducing an impact of self-interference arising from full-duplex communications, the processor of the UE may more successfully receive and transmit signaling at a same time, increasing efficiency of the communications by not processing signaling for a single transmission direction at a time, among other benefits.

The transmitter 745 may transmit signals generated by other components of the device 705. In some examples, the transmitter 745 may be collocated with a receiver 710 in a transceiver module. For example, the transmitter 745 may be an example of aspects of the transceiver 920 described with reference to FIG. 9. The transmitter 745 may utilize a single antenna or a set of antennas.

Figure 8:
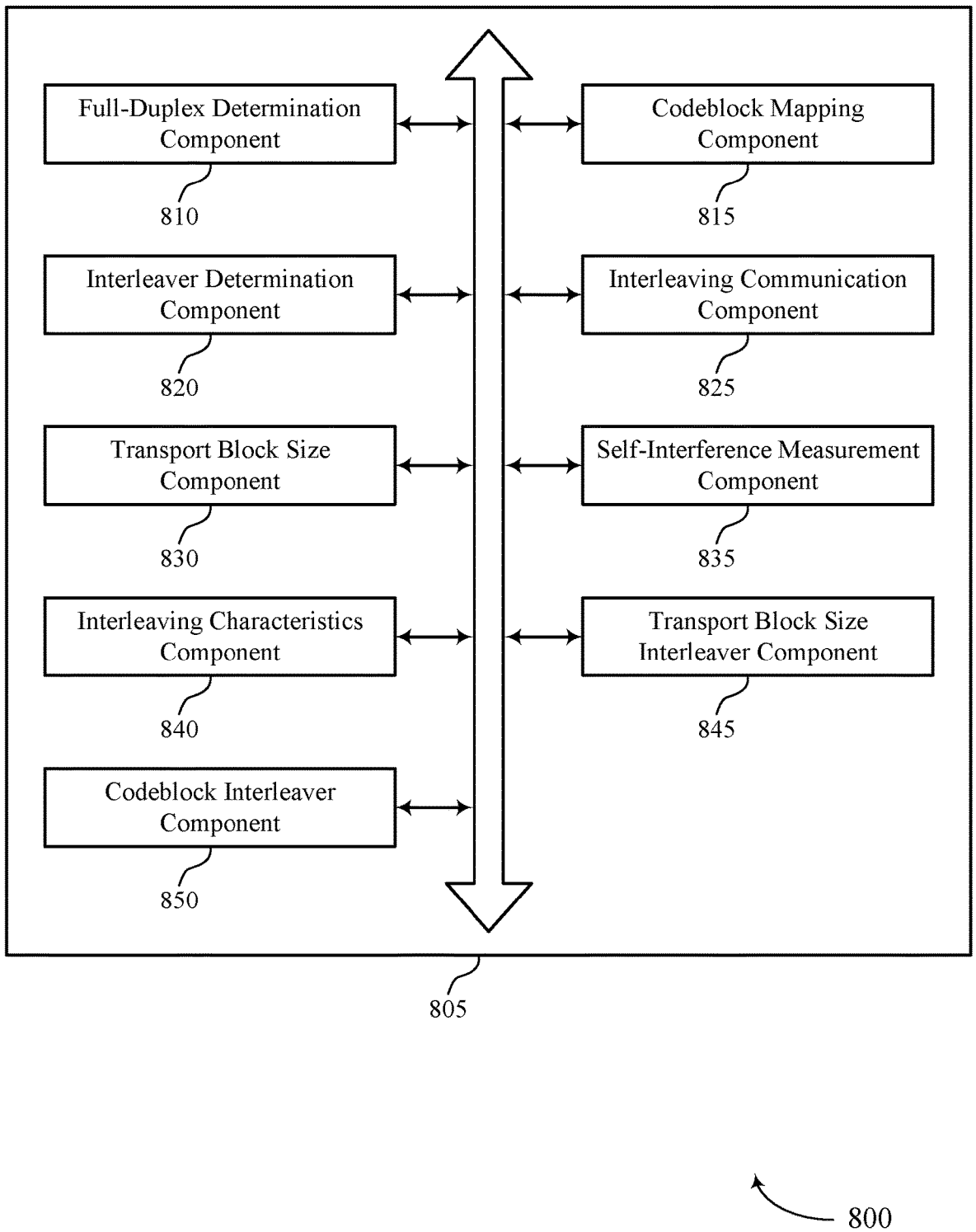
FIG. 8 shows a block diagram of a UE communications manager that supports techniques for interleaving in full-duplex slots in accordance with one or more aspects of the present disclosure.

FIG. 8 shows a block diagram 800 of a UE communications manager 805 that supports techniques for interleaving in full-duplex slots in accordance with one or more aspects of the present disclosure. The UE communications manager 805 may be an example of aspects of a UE communications manager 615, a UE communications manager 715, or a UE communications manager 910 described herein. The UE communications manager 805 may include a full-duplex determination component 810, a codeblock mapping component 815, an interleaver determination component 820, an interleaving communication component 825, a transport block size component 830, a self-interference measurement component 835, an interleaving characteristics component 840, a transport block size interleaver component 845, and a codeblock interleaver component 850. Each of these modules may communicate, directly or indirectly, with one another (e.g., via one or more buses).

The full-duplex determination component 810 may determine a slot for full-duplex communications with a device including a first transmission direction occurring at a same time as a second transmission direction within the slot, the first transmission direction being different from the second transmission direction. In some cases, the first transmission direction may include uplink communications, downlink communications, or sidelink communications, and the second transmission direction may include uplink communications, downlink communications, or sidelink communications that is different than the first transmission direction. Additionally, the device may be a UE, a base station, or an additional wireless device, or a combination thereof.

The codeblock mapping component 815 may receive, from the device, an indication of a codeblock mapping configuration for communications in the first transmission direction, the codeblock mapping configuration including a mapping of a set of codeblocks for the communications in the first transmission direction to a set of virtual resource blocks.

The interleaver determination component 820 may determine an interleaving configuration for the communications in the first transmission direction based on the indication of the codeblock mapping configuration. In some cases, the interleaving configuration may include a frequency domain interleaving configuration, a virtual resource block-to-physical resource block mapping configuration, or a combination thereof for the communications in the first transmission direction.

The transport block size interleaver component 845 may receive, from the device, an indication of a set of interleaving configurations for communications in the first transmission direction with the device, each interleaving configuration of the set of interleaving configurations corresponding to a different transport block size range. In some examples, the transport block size interleaver component 845 may receive, from the device, the indication of the set of interleaving configurations via radio resource control signaling. Accordingly, the interleaver determination component 820 may select an interleaving configuration from the set of interleaving configurations for the communications in the first transmission direction based on a transport block size configured for the first transmission direction in the slot falling within a transport block size range for the interleaving configuration.

The interleaving communication component 825 may communicate with the device based on the interleaving configuration.

The transport block size component 830 may receive, from the device, an indication of a set of interleaving configurations for the communications in the first transmission direction with the device, each interleaving configuration of the set of interleaving configurations corresponding to a different transport block size range and may select the interleaving configuration from the set of interleaving configurations for the communications in the first transmission direction based on a transport block size configured for the first transmission direction in the slot falling within a transport block size range for the interleaving configuration, where the interleaving configuration is determined based on the transport block size configured for the first transmission direction and the indication of the codeblock mapping configuration. In some examples, the transport block size component 830 may receive, from the device, the indication of the set of interleaving configurations via radio resource control signaling.

The self-interference measurement component 835 may measure a set of levels of self-interference for the set of codeblocks for communications in the first transmission direction, the self-interference for the communications in the first transmission direction caused by communications in the second transmission direction. In some examples, the self-interference measurement component 835 may then determine the interleaving configuration for the communications in the first transmission direction based on a difference between a first level of the set of levels of self-interference and a second level of the set of levels of self-interference satisfying a threshold value. In some cases, the first level of the set of levels of self-interference may be different than the second level of the set of levels of self-interference based on the codeblock mapping configuration.

The interleaving characteristics component 840 may determine one or more transmission characteristics for the communications in the first transmission direction, where the interleaving configuration is determined based on the one or more transmission characteristics. In some cases, the one or more transmission characteristics may include a presence of communications in the second transmission direction causing self-interference on the communications in the first transmission direction, a frequency and time domain allocation for the communications in the first transmission direction, a codeblock size for the set of the codeblocks, a codeblock length for the set of the codeblocks, or any combination thereof. In some examples, the interleaving characteristics component 840 may determine a number of codeblocks mapped per symbol of the slot, where the interleaving configuration is determined based on the number of codeblocks mapped per symbol satisfying a threshold value.

The codeblock interleaver component 850 may receive, from the device, an indication of a codeblock mapping configuration for the communications in the first transmission direction, the codeblock mapping configuration including a mapping of a set of codeblocks for the communications in the first transmission direction to a set of virtual resource blocks and may determine the interleaving configuration for the communications in the first transmission direction based on the indication of the codeblock mapping configuration and the transport block size configured for the first transmission direction.

Figure 9:
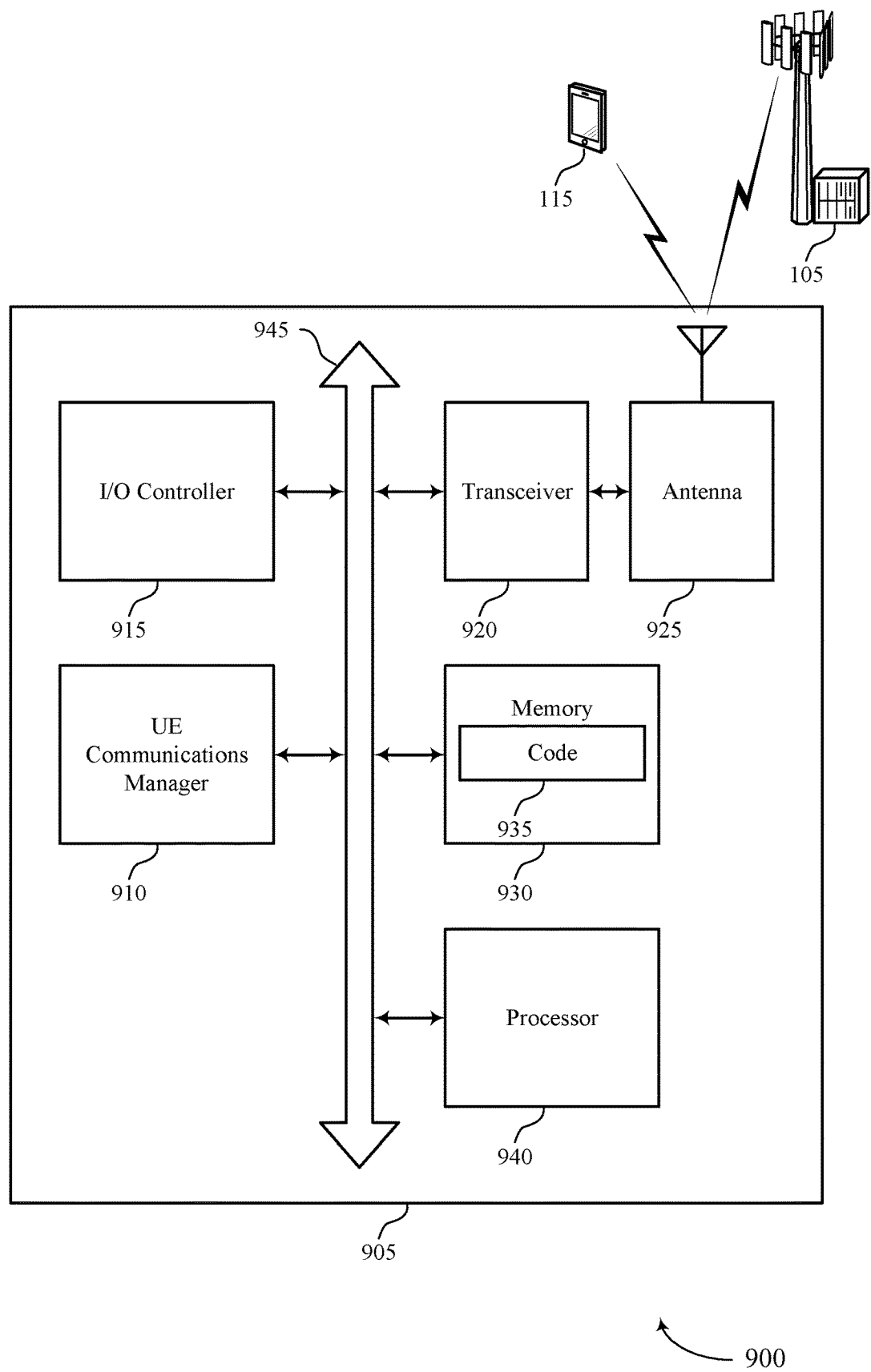
FIG. 9 shows a diagram of a system including a device that supports techniques for interleaving in full-duplex slots in accordance with one or more aspects of the present disclosure.

FIG. 9 shows a diagram of a system 900 including a device 905 that supports techniques for interleaving in full-duplex slots in accordance with one or more aspects of the present disclosure. The device 905 may be an example of or include the components of device 605, device 705, or a UE 115 as described herein. The device 905 may include components for bi-directional voice and data communications including components for transmitting and receiving communications, including a UE communications manager 910, an I/O controller 915, a transceiver 920, an antenna 925, memory 930, and a processor 940. These components may be in electronic communication via one or more buses (e.g., bus 945).

The UE communications manager 910 may determine a slot for full-duplex communications with a device including a first transmission direction occurring at a same time as a second transmission direction within the slot, the first transmission direction being different from the second transmission direction. In some cases, the UE communications manager 910 may receive, from the device, an indication of a codeblock mapping configuration for communications in the first transmission direction, the codeblock mapping configuration including a mapping of a set of codeblocks for the communications in the first transmission direction to a set of virtual resource blocks. Additionally, the UE communications manager 910 may determine an interleaving configuration for the communications in the first transmission direction based on the indication of the codeblock mapping configuration. The UE communications manager 910 may then communicate with the device based on the interleaving configuration.

Additionally or alternatively, the UE communications manager 910 may determine a slot for full-duplex communications with at least a device including a first transmission direction occurring at a same time as a second transmission direction within the slot, the first transmission direction being different than the second transmission direction. In some cases, the UE communications manager 910 may receive, from the device, an indication of a set of interleaving configurations for communications in the first transmission direction with the device, each interleaving configuration of the set of interleaving configurations corresponding to a different transport block size range. Additionally, the UE communications manager 910 may select an interleaving configuration from the set of interleaving configurations for the communications in the first transmission direction based on a transport block size configured for the first transmission direction in the slot falling within a transport block size range for the interleaving configuration. The UE communications manager 910 may then communicate with the device based on the interleaving configuration.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include random-access memory (RAM) and read-only memory (ROM). The memory 930 may store computer-readable, computer-executable code 935 including instructions that, when executed, cause the processor to perform various functions described herein. In some cases, the memory 930 may contain, among other things, a basic I/O system (BIOS) which may control basic hardware or software operation such as the interaction with peripheral components or devices.

The processor 940 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting techniques for interleaving in full-duplex slots).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
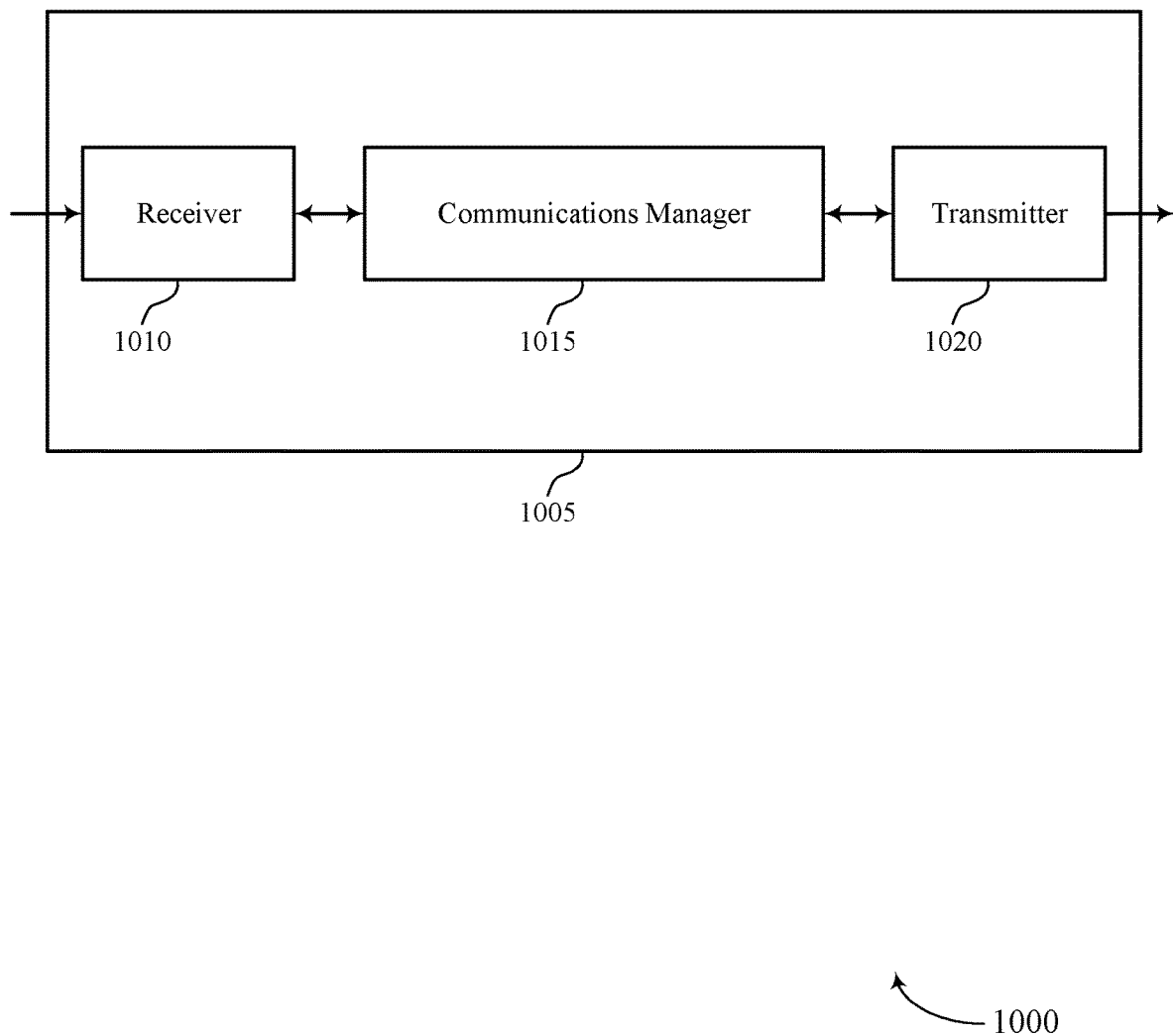
FIGS. 10 and 11 show block diagrams of devices that support techniques for interleaving in full-duplex slots in accordance with one or more aspects of the present disclosure.

FIG. 10 shows a block diagram 1000 of a device 1005 that supports techniques for interleaving in full-duplex slots in accordance with one or more aspects of the present disclosure. The device 1005 may be an example of aspects of a UE 115 or base station 105 as described herein. The device 1005 may include a receiver 1010, a communications manager 1015, and a transmitter 1020. The device 1005 may also include a processor. Each of these components may be in communication with one another (e.g., via one or more buses).

Receiver 1010 may receive information such as packets, user data, or control information associated with various information channels (e.g., control channels, data channels, and information related to techniques for interleaving in full-duplex slots, etc.). Information may be passed on to other components of the device 1005. The receiver 1010 may be an example of aspects of the transceiver 1320 or 1420 as described with reference to FIGS. 13 and 14. The receiver 1010 may utilize a single antenna or a set of antennas.

The communications manager 1015 may determine a slot for full-duplex communications with at least a UE including a first transmission direction occurring at a same time as a second transmission direction within the slot, the first transmission direction being different than the second transmission direction. In some cases, the communications manager 1015 may transmit, to the UE, an indication of a codeblock mapping configuration for communications in the first transmission direction, the codeblock mapping configuration including a mapping of a set of codeblocks for the communications in the first transmission direction to a set of virtual resource blocks. Additionally, the communications manager 1015 may determine an interleaving configuration for the communications in the first transmission direction based on the indication of the codeblock mapping configuration. The communications manager 1015 may then communicate with the UE based on the interleaving configuration.

Additionally or alternatively, the communications manager 1015 may determine a slot for full-duplex communications with at least a UE including a first transmission direction occurring at a same time as a second transmission direction within the slot, the first transmission direction being different than the second transmission direction. In some cases, the communications manager 1015 may transmit, to the UE, an indication of a set of interleaving configurations for communications in the first transmission direction with the UE, each interleaving configuration of the set of interleaving configurations corresponding to a different transport block size range. Additionally, the communications manager 1015 may determine an interleaving configuration from the set of interleaving configurations for the communications in the first transmission direction based on a transport block size configured for the first transmission direction in the slot falling within a transport block size range for the interleaving configuration. The communications manager 1015 may then communicate with the UE based on the interleaving configuration. The communications manager 1015 may be an example of aspects of the communications manager 1310 or 1410 as described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an I/O component, a transceiver, a network server, another computing device, one or more other components described in the present disclosure, or a combination thereof in accordance with various aspects of the present disclosure.

Transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 or 1420 as described with reference to FIGS. 13 and 14. The transmitter 1020 may utilize a single antenna or a set of antennas.

Figure 11:
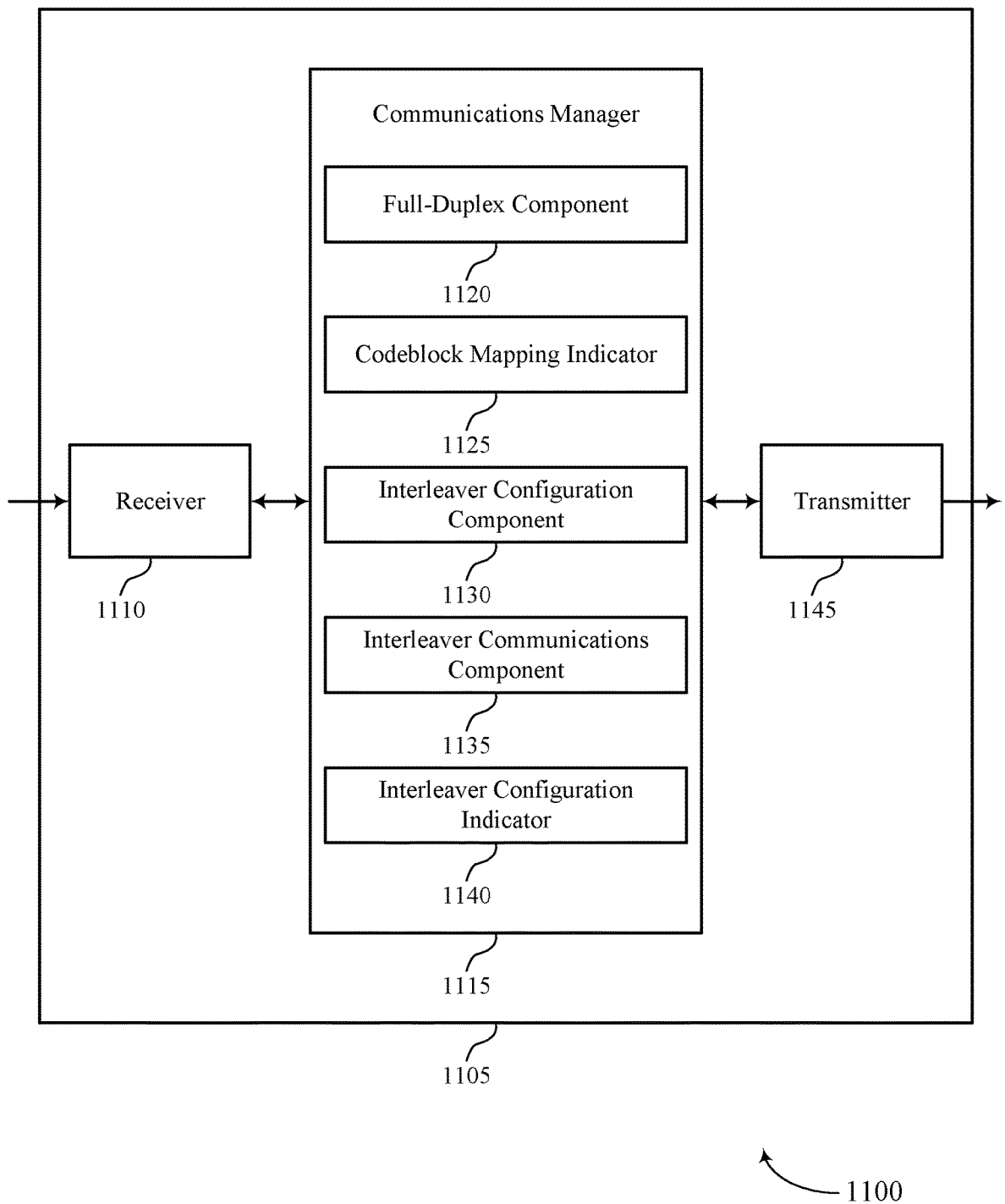

FIG. 11 shows a block diagram 1100 of a device 1105 that supports techniques for interleaving in full-duplex slots in accordance with one or more aspects of the present disclosure. The device 1105 may be an example of aspects of a device 1005, a UE 115, or a base station 105 as described herein. The device 1105 may include a receiver 1110, a communications manager 1115, and a transmitter 1145. The device 1105 may also include a processor. Each of these components may be in communication with one another (e.g., via one or more buses).

Receiver 1110 may receive information such as packets, user data, or control information associated with various information channels (e.g., control channels, data channels, and information related to techniques for interleaving in full-duplex slots, etc.). Information may be passed on to other components of the device 1105. The receiver 1110 may be an example of aspects of the transceiver 1320 or 1420 as described with reference to FIGS. 13 and 14. The receiver 1110 may utilize a single antenna or a set of antennas.

The communications manager 1115 may be an example of aspects of the communications manager 1015 as described herein. The communications manager 1115 may include a full-duplex component 1120, a codeblock mapping indicator 1125, an interleaver configuration component 1130, an interleaver communications component 1135, and an interleaver configuration indicator 1140. The communications manager 1115 may be an example of aspects of the communications manager 1310 or 1410 as described herein.

The full-duplex component 1120 may determine a slot for full-duplex communications with at least a UE including a first transmission direction occurring at a same time as a second transmission direction within the slot, the first transmission direction being different than the second transmission direction.

The codeblock mapping indicator 1125 may transmit, to the UE, an indication of a codeblock mapping configuration for communications in the first transmission direction, the codeblock mapping configuration including a mapping of a set of codeblocks for the communications in the first transmission direction to a set of virtual resource blocks.

The interleaver configuration component 1130 may determine an interleaving configuration for the communications in the first transmission direction based on the indication of the codeblock mapping configuration.

The interleaver communications component 1135 may communicate with the UE based on the interleaving configuration.

Additionally or alternatively, the interleaver configuration indicator 1140 may transmit, to the UE, an indication of a set of interleaving configurations for communications in the first transmission direction with the UE, each interleaving configuration of the set of interleaving configurations corresponding to a different transport block size range. Accordingly, the interleaver configuration component 1130 may determine an interleaving configuration from the set of interleaving configurations for the communications in the first transmission direction based on a transport block size configured for the first transmission direction in the slot falling within a transport block size range for the interleaving configuration.

Transmitter 1145 may transmit signals generated by other components of the device 1105. In some examples, the transmitter 1145 may be collocated with a receiver 1110 in a transceiver module. For example, the transmitter 1145 may be an example of aspects of the transceiver 1320 or 1420 as described with reference to FIGS. 13 and 14. The transmitter 1145 may utilize a single antenna or a set of antennas.

Figure 12:
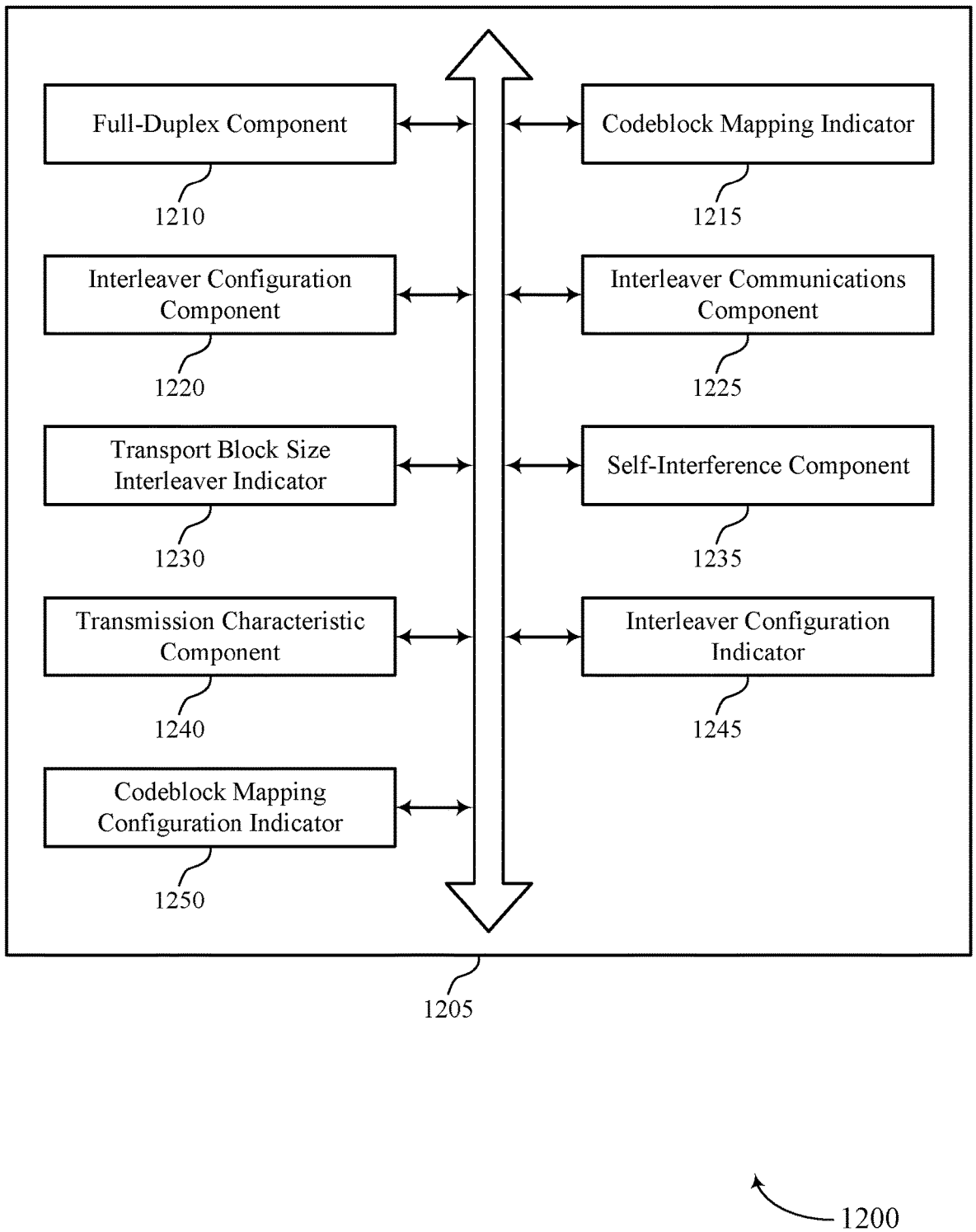
FIG. 12 shows a block diagram of a communications manager that supports techniques for interleaving in full-duplex slots in accordance with one or more aspects of the present disclosure.

FIG. 12 shows a block diagram 1200 of a communications manager 1205 that supports techniques for interleaving in full-duplex slots in accordance with one or more aspects of the present disclosure. The communications manager 1205 may be an example of aspects of a communications manager 1015, a communications manager 1115, or a communications manager 1310 described herein. The communications manager 1205 may include a full-duplex component 1210, a codeblock mapping indicator 1215, an interleaver configuration component 1220, an interleaver communications component 1225, a transport block size interleaver indicator 1230, a self-interference component 1235, a transmission characteristic component 1240, an interleaver configuration indicator 1245, and a codeblock mapping configuration indicator 1250. Each of these modules may communicate, directly or indirectly, with one another (e.g., via one or more buses).

The full-duplex component 1210 may determine a slot for full-duplex communications with at least a UE including a first transmission direction occurring at a same time as a second transmission direction within the slot, the first transmission direction being different than the second transmission direction. In some cases, the first transmission direction may include uplink communications, downlink communications, or sidelink communications, and the second transmission direction may include uplink communications, downlink communications, or sidelink communications that is different than the first transmission direction. Additionally, the device may be a UE, a base station, or an additional wireless device, or a combination thereof.

The codeblock mapping indicator 1215 may transmit, to the UE, an indication of a codeblock mapping configuration for communications in the first transmission direction, the codeblock mapping configuration including a mapping of a set of codeblocks for the communications in the first transmission direction to a set of virtual resource blocks.

The interleaver configuration component 1220 may determine an interleaving configuration for the communications in the first transmission direction based on the indication of the codeblock mapping configuration. In some cases, the interleaving configuration may include a frequency domain interleaving configuration, a virtual resource block-to-physical resource block mapping configuration, or a combination thereof for the communications in the first transmission direction.

The interleaver configuration indicator 1245 may transmit, to the UE, an indication of a set of interleaving configurations for communications in the first transmission direction with the UE, each interleaving configuration of the set of interleaving configurations corresponding to a different transport block size range. In some examples, the interleaver configuration indicator 1245 may transmit, to the UE, the indication of the set of interleaving configurations via radio resource control signaling. Accordingly, the interleaver configuration component 1220 may determine an interleaving configuration from the set of interleaving configurations for the communications in the first transmission direction based on a transport block size configured for the first transmission direction in the slot falling within a transport block size range for the interleaving configuration.

The interleaver communications component 1225 may communicate with the UE based on the interleaving configuration.

The transport block size interleaver indicator 1230 may transmit, to the UE, an indication of a set of interleaving configurations for the communications in the first transmission direction with the UE, each interleaving configuration of the set of interleaving configurations corresponding to a different transport block size range and may determine the interleaving configuration from the set of interleaving configurations for the communications in the first transmission direction based on a transport block size configured for the first transmission direction in the slot falling within a transport block size range for the interleaving configuration, where the interleaving configuration is determined based on the transport block size configured for the first transmission direction and the indication of the codeblock mapping configuration. In some examples, the transport block size interleaver indicator 1230 may transmit, to the UE, the indication of the set of interleaving configurations via radio resource control signaling.

The self-interference component 1235 may measure a set of levels of self-interference for the set of codeblocks for communications in the first transmission direction, the self-interference for the communications in the first transmission direction caused by communications in the second transmission direction. In some examples, the self-interference component 1235 may determine the interleaving configuration for the communications in the first transmission direction based on a difference between a first level of the set of levels of self-interference and a second level of the set of levels of self-interference satisfying a threshold value. In some cases, the first level of the set of levels of self-interference may be different than the second level of the set of levels of self-interference based on the codeblock mapping configuration.

The transmission characteristic component 1240 may determine one or more transmission characteristics for the communications in the first transmission direction, where the interleaving configuration is determined based on the one or more transmission characteristics. In some cases, the one or more transmission characteristics may include a presence of communications in the second transmission direction causing self-interference on the communications in the first transmission direction, a frequency and time domain allocation for the communications in the first transmission direction, a codeblock size for the set of the codeblocks, a codeblock length for the set of the codeblocks, or any combination thereof. In some examples, the transmission characteristic component 1240 may determine a number of codeblocks mapped per symbol of the slot, where the interleaving configuration is determined based on the number of codeblocks mapped per symbol satisfying a threshold value.

The codeblock mapping configuration indicator 1250 may transmit, to the UE, an indication of a codeblock mapping configuration for the communications in the first transmission direction, the codeblock mapping configuration including a mapping of a set of codeblocks for the communications in the first transmission direction to a set of virtual resource blocks and may determine the interleaving configuration for the communications in the first transmission direction based on the indication of the codeblock mapping configuration and the transport block size configured for the first transmission direction.

Figure 13:
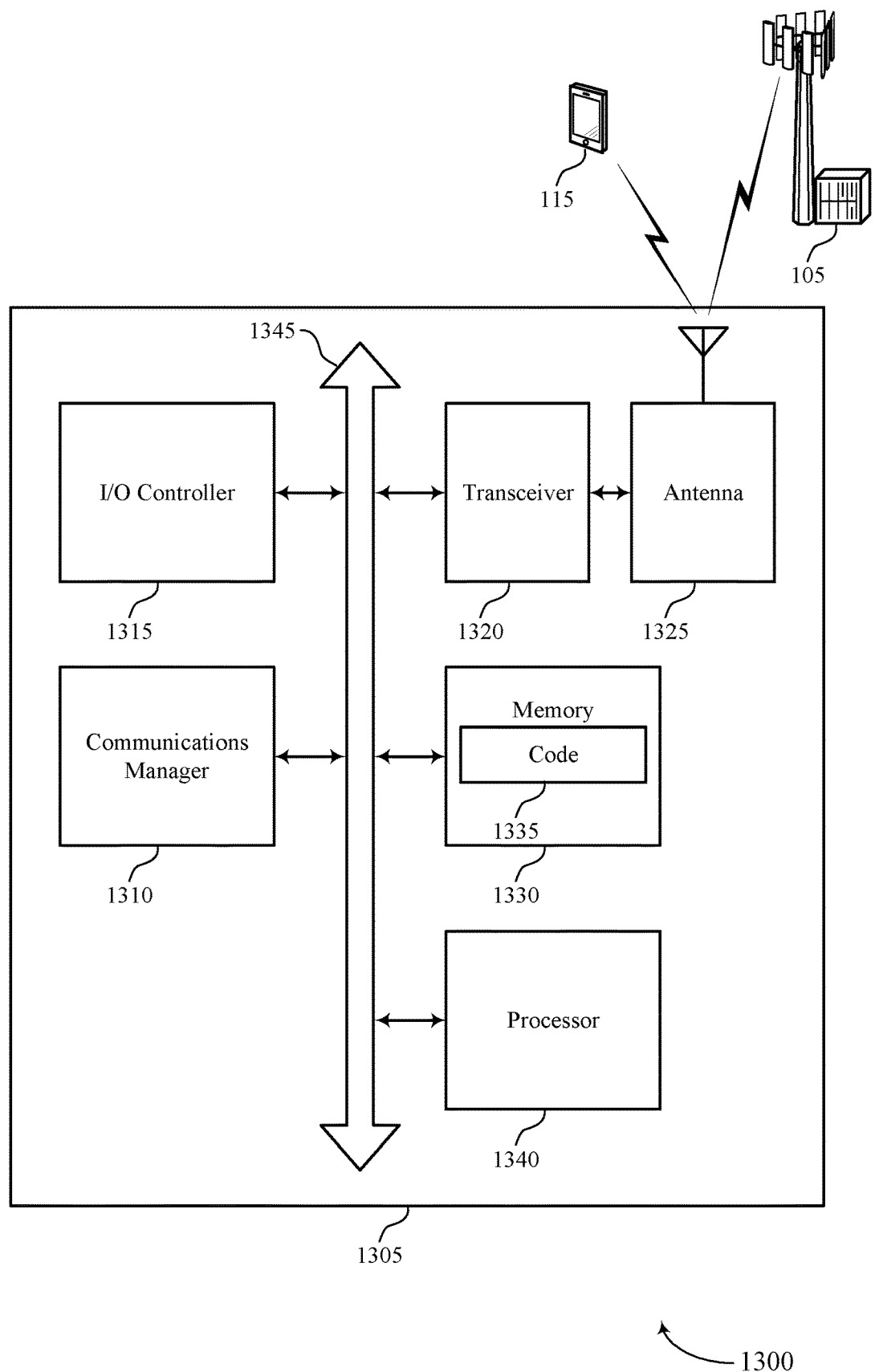
FIG. 13 shows a diagram of a system including a UE that supports techniques for interleaving in full-duplex slots in accordance with one or more aspects of the present disclosure.

FIG. 13 shows a diagram of a system 1300 including a device 1305 that supports techniques for interleaving in full-duplex slots in accordance with one or more aspects of the present disclosure. The device 1305 may be an example of or include the components of device 1005, device 1105, or a UE 115 as described herein. The device 1305 may include components for bi-directional voice and data communications including components for transmitting and receiving communications, including a communications manager 1310, a transceiver 1320, an antenna 1325, memory 1330, a processor 1340, and an I/O controller 1315. These components may be in electronic communication via one or more buses (e.g., bus 1345).

The communications manager 1310 may determine a slot for full-duplex communications with at least a UE including a first transmission direction occurring at a same time as a second transmission direction within the slot, the first transmission direction being different than the second transmission direction. In some cases, the communications manager 1310 may transmit, to the UE, an indication of a codeblock mapping configuration for communications in the first transmission direction, the codeblock mapping configuration including a mapping of a set of codeblocks for the communications in the first transmission direction to a set of virtual resource blocks. Additionally, the communications manager 1310 may determine an interleaving configuration for the communications in the first transmission direction based on the indication of the codeblock mapping configuration. The communications manager 1310 may then communicate with the UE based on the interleaving configuration.

Additionally or alternatively, the communications manager 1310 may determine a slot for full-duplex communications with at least a UE including a first transmission direction occurring at a same time as a second transmission direction within the slot, the first transmission direction being different than the second transmission direction. In some cases, the communications manager 1310 may transmit, to the UE, an indication of a set of interleaving configurations for communications in the first transmission direction with the UE, each interleaving configuration of the set of interleaving configurations corresponding to a different transport block size range. Additionally, the communications manager 1310 may determine an interleaving configuration from the set of interleaving configurations for the communications in the first transmission direction based on a transport block size configured for the first transmission direction in the slot falling within a transport block size range for the interleaving configuration. The communications manager 1310 may then communicate with the UE based on the interleaving configuration.

Transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting techniques for interleaving in full-duplex slots).

The I/O controller 1315 may manage input and output signals for the device 1305. The I/O controller 1315 may also manage peripherals not integrated into the device 1305. In some cases, the I/O controller 1315 may represent a physical connection or port to an external peripheral. In some cases, the I/O controller 1315 may utilize an operating system such as iOS®, ANDROID®, MS-DOS®, MS-WINDOWS®, OS/2®, UNIX®, LINUX®, or another known operating system. In other cases, the I/O controller 1315 may represent or interact with a modem, a keyboard, a mouse, a touchscreen, or a similar device. In some cases, the I/O controller 1315 may be implemented as part of a processor. In some cases, a user may interact with the device 1305 via the I/O controller 1315 or via hardware components controlled by the I/O controller 1315.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
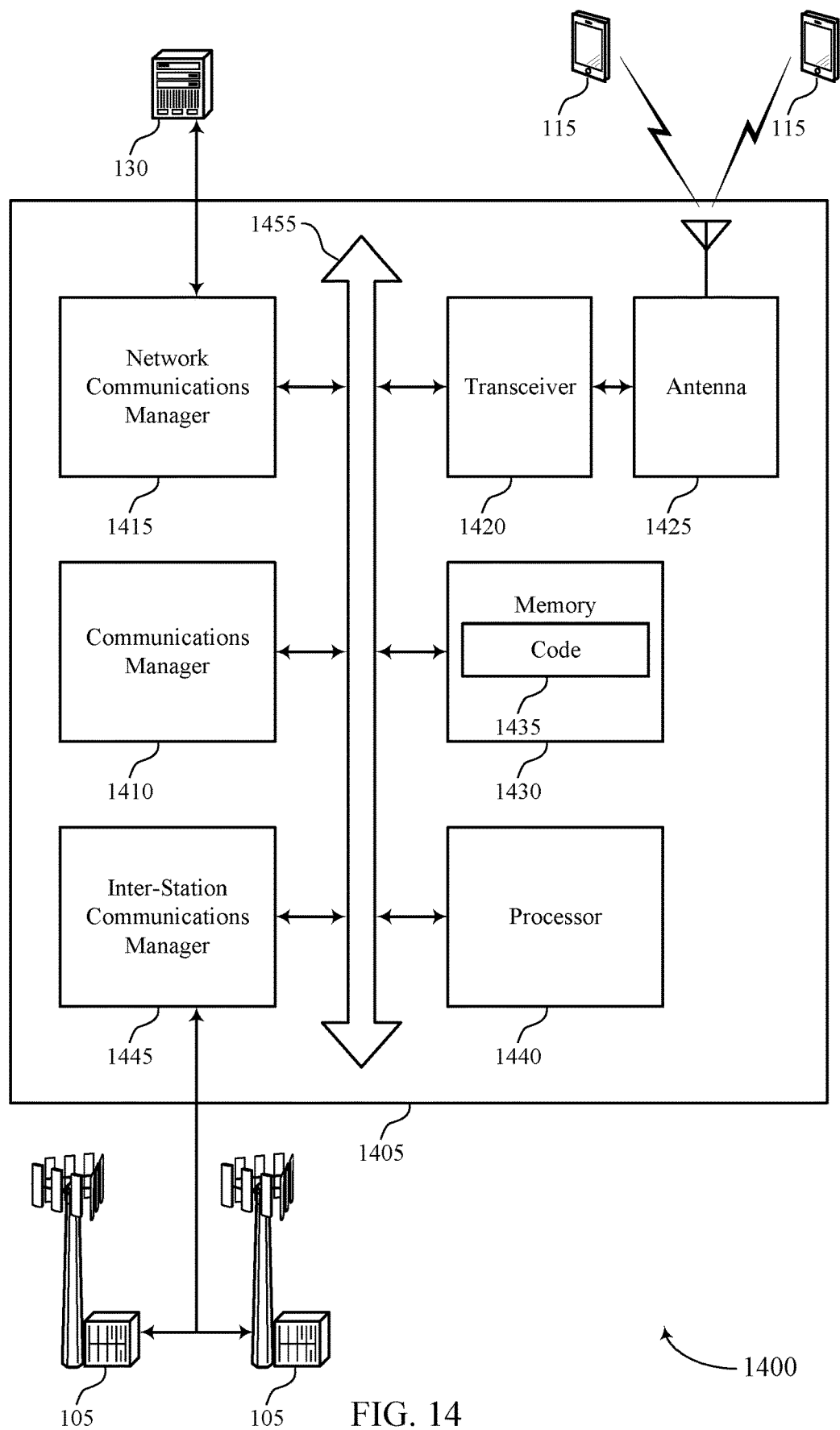
FIG. 14 shows a diagram of a system including a base station that supports techniques for interleaving in full-duplex slots in accordance with one or more aspects of the present disclosure.

FIG. 14 shows a diagram of a system 1400 including a device 1405 that supports techniques for interleaving in full-duplex slots in accordance with one or more aspects of the present disclosure. The device 1405 may be an example of or include the components of device 1005, device 1105, or a base station 105 as described herein. The device 1405 may include components for bi-directional voice and data communications including components for transmitting and receiving communications, including a communications manager 1410, a network communications manager 1450, a transceiver 1420, an antenna 1425, memory 1430, a processor 1440, and an inter-station communications manager 1455. These components may be in electronic communication via one or more buses (e.g., bus 1445).

The communications manager 1410 may determine a slot for full-duplex communications with at least a UE including a first transmission direction occurring at a same time as a second transmission direction within the slot, the first transmission direction being different than the second transmission direction. In some cases, the communications manager 1410 may transmit, to the UE, an indication of a codeblock mapping configuration for communications in the first transmission direction, the codeblock mapping configuration including a mapping of a set of codeblocks for the communications in the first transmission direction to a set of virtual resource blocks. Additionally, the communications manager 1410 may determine an interleaving configuration for the communications in the first transmission direction based on the indication of the codeblock mapping configuration. The communications manager 1410 may then communicate with the UE based on the interleaving configuration.

Additionally or alternatively, the communications manager 1410 may determine a slot for full-duplex communications with at least a UE including a first transmission direction occurring at a same time as a second transmission direction within the slot, the first transmission direction being different than the second transmission direction. In some cases, the communications manager 1410 may transmit, to the UE, an indication of a set of interleaving configurations for communications in the first transmission direction with the UE, each interleaving configuration of the set of interleaving configurations corresponding to a different transport block size range. Additionally, the communications manager 1410 may determine an interleaving configuration from the set of interleaving configurations for the communications in the first transmission direction based on a transport block size configured for the first transmission direction in the slot falling within a transport block size range for the interleaving configuration. The communications manager 1410 may then communicate with the UE based on the interleaving configuration.

Network communications manager 1450 may manage communications with the core network (e.g., via one or more wired backhaul links). For example, the network communications manager 1450 may manage the transfer of data communications for client devices, such as one or more UEs 115.

Transceiver 1420 may communicate bi-directionally, via one or more antennas, wired, or wireless links as described above. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas.

In some cases, the wireless device may include a single antenna 1425. However, in some cases the device may have more than one antenna 1425, which may be capable of concurrently transmitting or receiving multiple wireless transmissions.

The memory 1430 may include RAM, ROM, or a combination thereof. The memory 1430 may store computer-readable code 1435 including instructions that, when executed by a processor (e.g., the processor 1440) cause the device to perform various functions described herein. In some cases, the memory 1430 may contain, among other things, a BIOS which may control basic hardware or software operation such as the interaction with peripheral components or devices.

The processor 1440 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In other cases, a memory controller may be integrated into the processor 1440. The processor 1440 may be configured to execute computer-readable instructions stored in a memory (e.g., the memory 1430) to cause the device 1405 to perform various functions (e.g., functions or tasks supporting techniques for interleaving in full-duplex slots).

Inter-station communications manager 1455 may manage communications with other base station 105, and may include a controller or scheduler for controlling communications with UEs 115 in cooperation with other base stations 105. For example, the inter-station communications manager 1455 may coordinate scheduling for transmissions to UEs 115 for various interference mitigation techniques such as beamforming or joint transmission. In some examples, inter-station communications manager 1455 may provide an X2 interface within an LTE/LTE-A wireless communication network technology to provide communication between base stations 105.

The code 1435 may include instructions to implement aspects of the present disclosure, including instructions to support wireless communications. The code 1435 may be stored in a non-transitory computer-readable medium such as system memory or other type of memory. In some cases, the code 1435 may not be directly executable by the processor 1440 but may cause a computer (e.g., when compiled and executed) to perform functions described herein.

Figure 15:
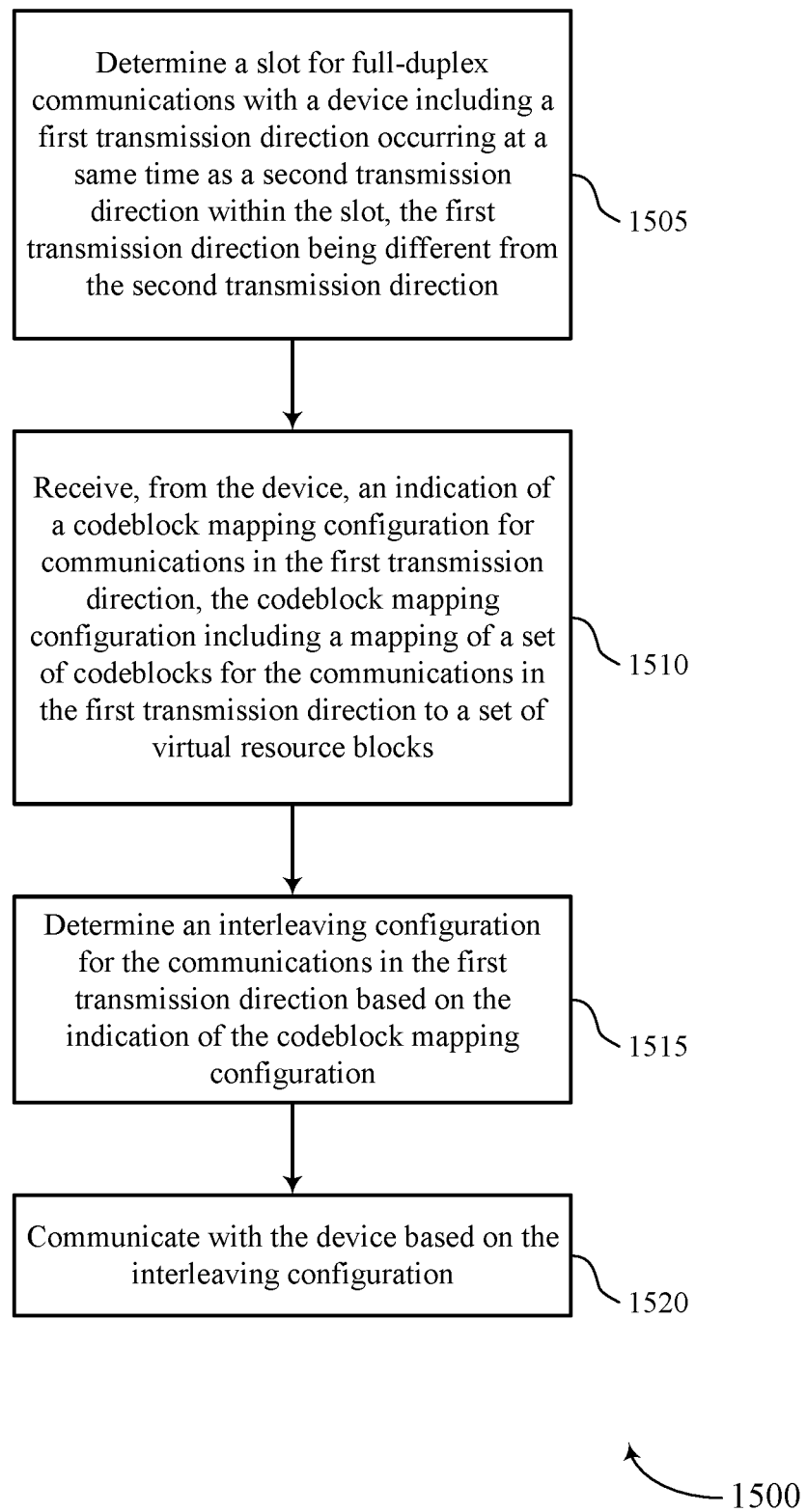
FIGS. 15 through 26 show flowcharts illustrating methods that support techniques for interleaving in full-duplex slots in accordance with one or more aspects of the present disclosure.

FIG. 15 shows a flowchart illustrating a method 1500 that supports techniques for interleaving in full-duplex slots in accordance with one or more aspects of the present disclosure. The operations of method 1500 may be implemented by a UE 115 or its components as described herein. For example, the operations of method 1500 may be performed by a UE communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1505, the UE may determine a slot for full-duplex communications with a device including a first transmission direction occurring at a same time as a second transmission direction within the slot, the first transmission direction being different from the second transmission direction. The operations of 1505 may be performed according to the methods described herein. In some examples, aspects of the operations of 1505 may be performed by a full-duplex determination component as described with reference to FIGS. 6 through 9.

At 1510, the UE may receive, from the device, an indication of a codeblock mapping configuration for communications in the first transmission direction, the codeblock mapping configuration including a mapping of a set of codeblocks for the communications in the first transmission direction to a set of virtual resource blocks. The operations of 1510 may be performed according to the methods described herein. In some examples, aspects of the operations of 1510 may be performed by a codeblock mapping component as described with reference to FIGS. 6 through 9.

At 1515, the UE may determine an interleaving configuration for the communications in the first transmission direction based on the indication of the codeblock mapping configuration. The operations of 1515 may be performed according to the methods described herein. In some examples, aspects of the operations of 1515 may be performed by an interleaver determination component as described with reference to FIGS. 6 through 9.

At 1520, the UE may communicate with the device based on the interleaving configuration. The operations of 1520 may be performed according to the methods described herein. In some examples, aspects of the operations of 1520 may be performed by an interleaving communication component as described with reference to FIGS. 6 through 9.

Figure 16:
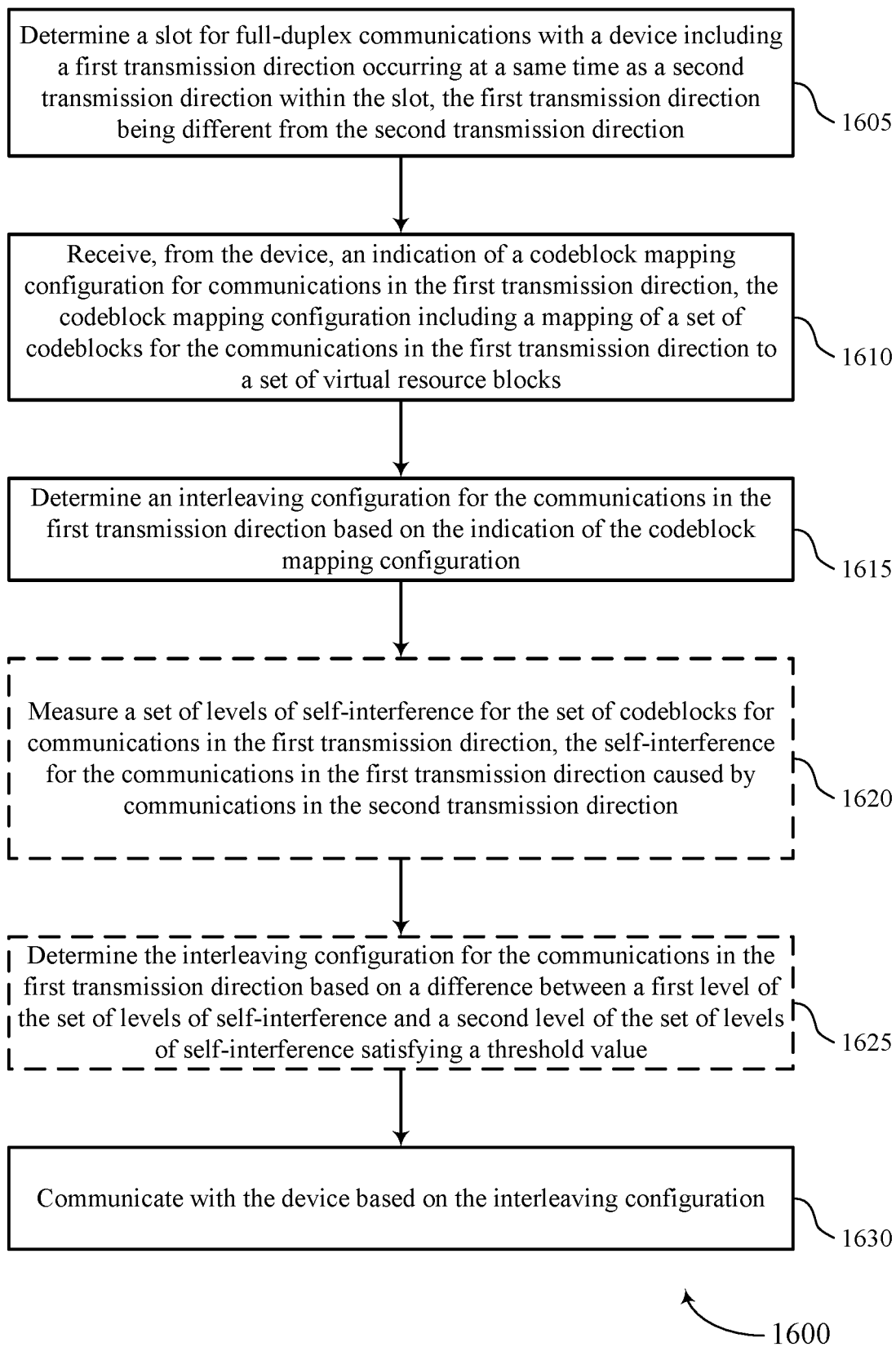

FIG. 16 shows a flowchart illustrating a method 1600 that supports techniques for interleaving in full-duplex slots in accordance with one or more aspects of the present disclosure. The operations of method 1600 may be implemented by a UE 115 or its components as described herein. For example, the operations of method 1600 may be performed by a UE communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1605, the UE may determine a slot for full-duplex communications with a device including a first transmission direction occurring at a same time as a second transmission direction within the slot, the first transmission direction being different from the second transmission direction. The operations of 1605 may be performed according to the methods described herein. In some examples, aspects of the operations of 1605 may be performed by a full-duplex determination component as described with reference to FIGS. 6 through 9.

At 1610, the UE may receive, from the device, an indication of a codeblock mapping configuration for communications in the first transmission direction, the codeblock mapping configuration including a mapping of a set of codeblocks for the communications in the first transmission direction to a set of virtual resource blocks. The operations of 1610 may be performed according to the methods described herein. In some examples, aspects of the operations of 1610 may be performed by a codeblock mapping component as described with reference to FIGS. 6 through 9.

At 1615, the UE may determine an interleaving configuration for the communications in the first transmission direction based on the indication of the codeblock mapping configuration. The operations of 1615 may be performed according to the methods described herein. In some examples, aspects of the operations of 1615 may be performed by an interleaver determination component as described with reference to FIGS. 6 through 9.

At 1620, the UE may measure a set of levels of self-interference for the set of codeblocks for communications in the first transmission direction, the self-interference for the communications in the first transmission direction caused by communications in the second transmission direction. The operations of 1620 may be performed according to the methods described herein. In some examples, aspects of the operations of 1620 may be performed by a self-interference measurement component as described with reference to FIGS. 6 through 9.

At 1625, the UE may determine the interleaving configuration for the communications in the first transmission direction based on a difference between a first level of the set of levels of self-interference and a second level of the set of levels of self-interference satisfying a threshold value. The operations of 1625 may be performed according to the methods described herein. In some examples, aspects of the operations of 1625 may be performed by a self-interference measurement component as described with reference to FIGS. 6 through 9.

At 1630, the UE may communicate with the device based on the interleaving configuration. The operations of 1630 may be performed according to the methods described herein. In some examples, aspects of the operations of 1630 may be performed by an interleaving communication component as described with reference to FIGS. 6 through 9.

Figure 17:
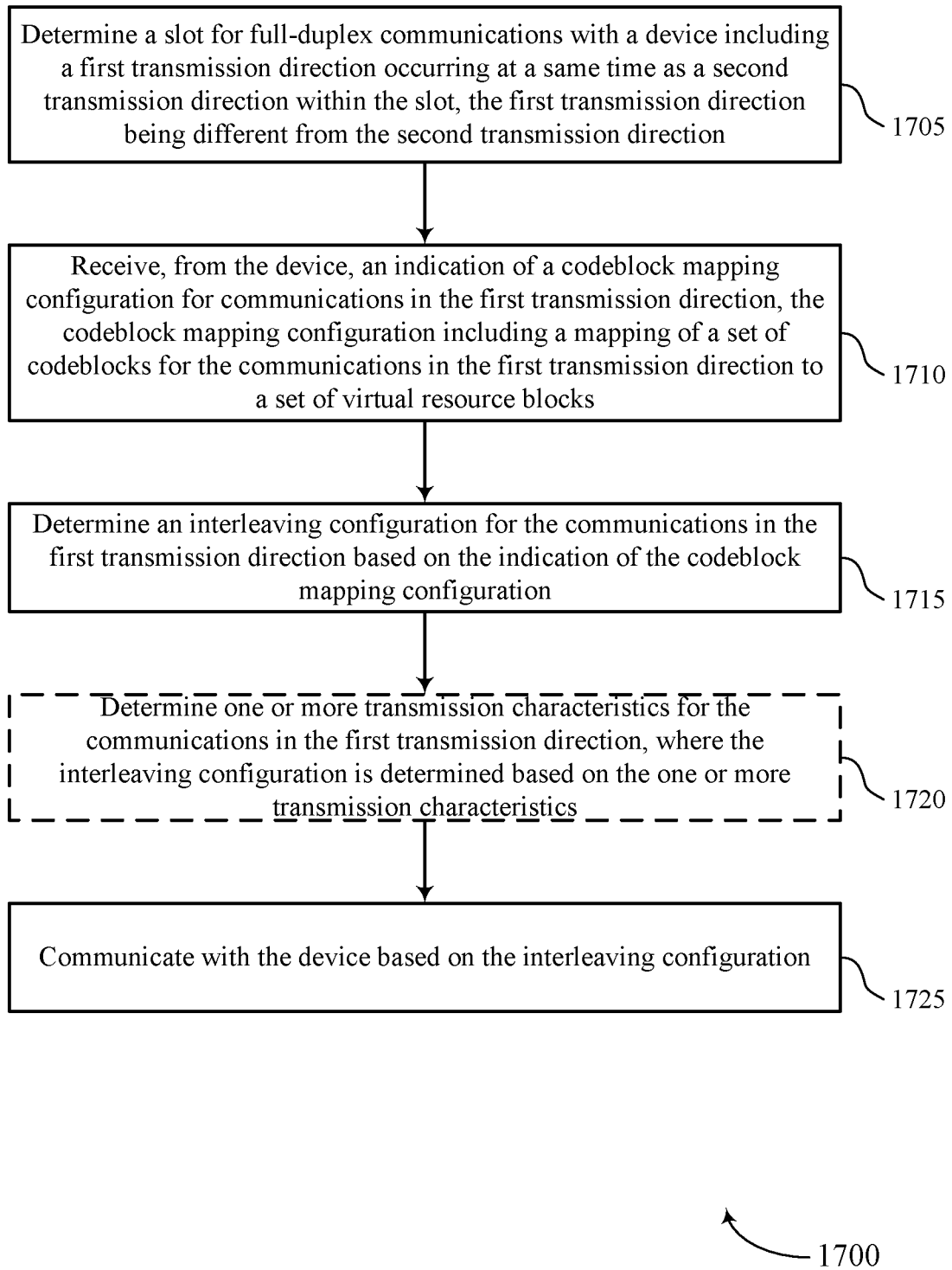

FIG. 17 shows a flowchart illustrating a method 1700 that supports techniques for interleaving in full-duplex slots in accordance with one or more aspects of the present disclosure. The operations of method 1700 may be implemented by a UE 115 or its components as described herein. For example, the operations of method 1700 may be performed by a UE communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1705, the UE may determine a slot for full-duplex communications with a device including a first transmission direction occurring at a same time as a second transmission direction within the slot, the first transmission direction being different from the second transmission direction. The operations of 1705 may be performed according to the methods described herein. In some examples, aspects of the operations of 1705 may be performed by a full-duplex determination component as described with reference to FIGS. 6 through 9.

At 1710, the UE may receive, from the device, an indication of a codeblock mapping configuration for communications in the first transmission direction, the codeblock mapping configuration including a mapping of a set of codeblocks for the communications in the first transmission direction to a set of virtual resource blocks. The operations of 1710 may be performed according to the methods described herein. In some examples, aspects of the operations of 1710 may be performed by a codeblock mapping component as described with reference to FIGS. 6 through 9.

At 1715, the UE may determine an interleaving configuration for the communications in the first transmission direction based on the indication of the codeblock mapping configuration. The operations of 1715 may be performed according to the methods described herein. In some examples, aspects of the operations of 1715 may be performed by an interleaver determination component as described with reference to FIGS. 6 through 9.

At 1720, the UE may determine one or more transmission characteristics for the communications in the first transmission direction, where the interleaving configuration is determined based on the one or more transmission characteristics. The operations of 1720 may be performed according to the methods described herein. In some examples, aspects of the operations of 1720 may be performed by an interleaving characteristics component as described with reference to FIGS. 6 through 9.

At 1725, the UE may communicate with the device based on the interleaving configuration. The operations of 1725 may be performed according to the methods described herein. In some examples, aspects of the operations of 1725 may be performed by an interleaving communication component as described with reference to FIGS. 6 through 9.

Figure 18:
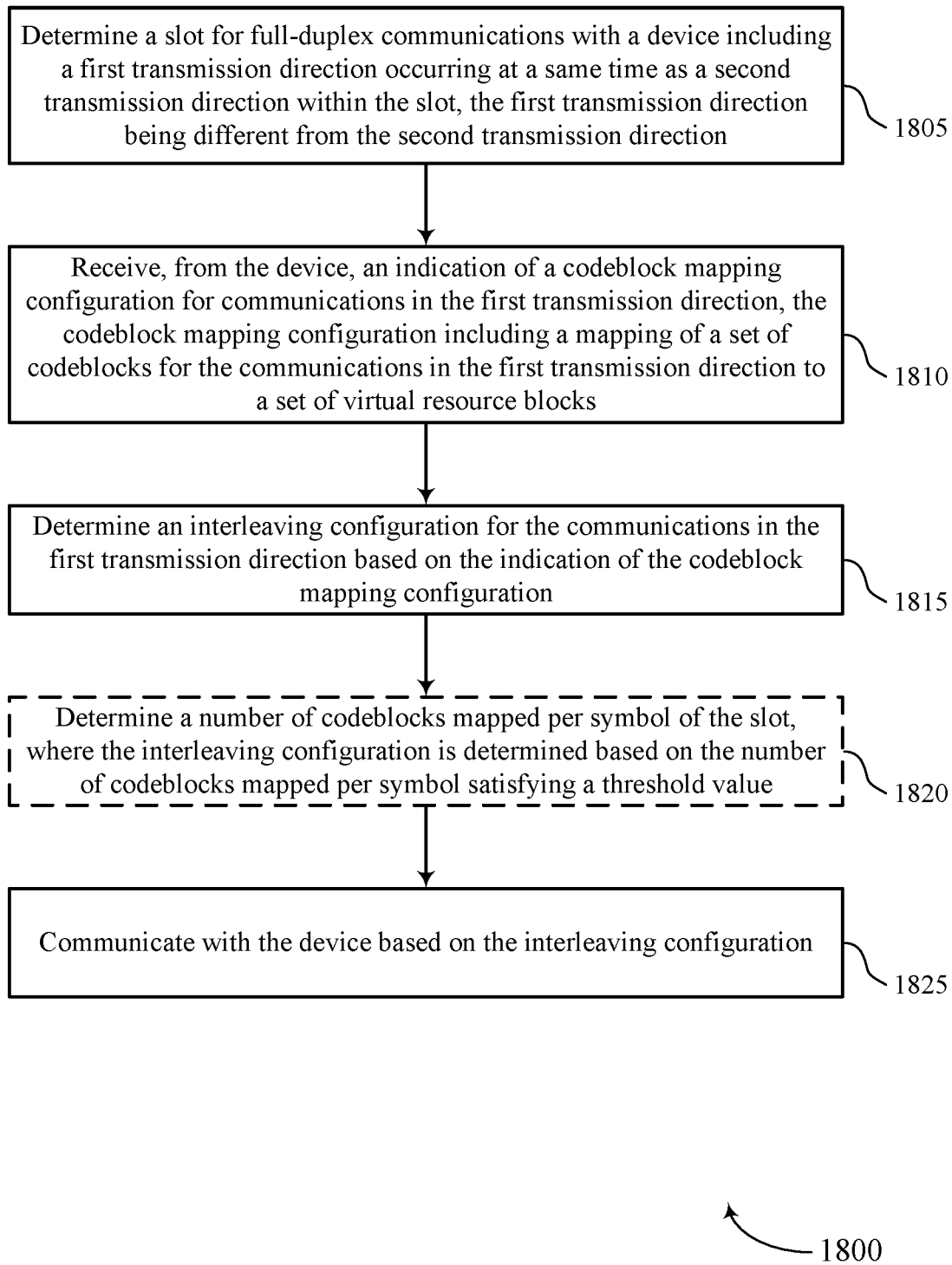

FIG. 18 shows a flowchart illustrating a method 1800 that supports techniques for interleaving in full-duplex slots in accordance with one or more aspects of the present disclosure. The operations of method 1800 may be implemented by a UE 115 or its components as described herein. For example, the operations of method 1800 may be performed by a UE communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1805, the UE may determine a slot for full-duplex communications with a device including a first transmission direction occurring at a same time as a second transmission direction within the slot, the first transmission direction being different from the second transmission direction. The operations of 1805 may be performed according to the methods described herein. In some examples, aspects of the operations of 1805 may be performed by a full-duplex determination component as described with reference to FIGS. 6 through 9.

At 1810, the UE may receive, from the device, an indication of a codeblock mapping configuration for communications in the first transmission direction, the codeblock mapping configuration including a mapping of a set of codeblocks for the communications in the first transmission direction to a set of virtual resource blocks. The operations of 1810 may be performed according to the methods described herein. In some examples, aspects of the operations of 1810 may be performed by a codeblock mapping component as described with reference to FIGS. 6 through 9.

At 1815, the UE may determine an interleaving configuration for the communications in the first transmission direction based on the indication of the codeblock mapping configuration. The operations of 1815 may be performed according to the methods described herein. In some examples, aspects of the operations of 1815 may be performed by an interleaver determination component as described with reference to FIGS. 6 through 9.

At 1820, the UE may determine a number of codeblocks mapped per symbol of the slot, where the interleaving configuration is determined based on the number of codeblocks mapped per symbol satisfying a threshold value. The operations of 1820 may be performed according to the methods described herein. In some examples, aspects of the operations of 1820 may be performed by an interleaving characteristics component as described with reference to FIGS. 6 through 9.

At 1825, the UE may communicate with the device based on the interleaving configuration. The operations of 1825 may be performed according to the methods described herein. In some examples, aspects of the operations of 1825 may be performed by an interleaving communication component as described with reference to FIGS. 6 through 9.

Figure 19:
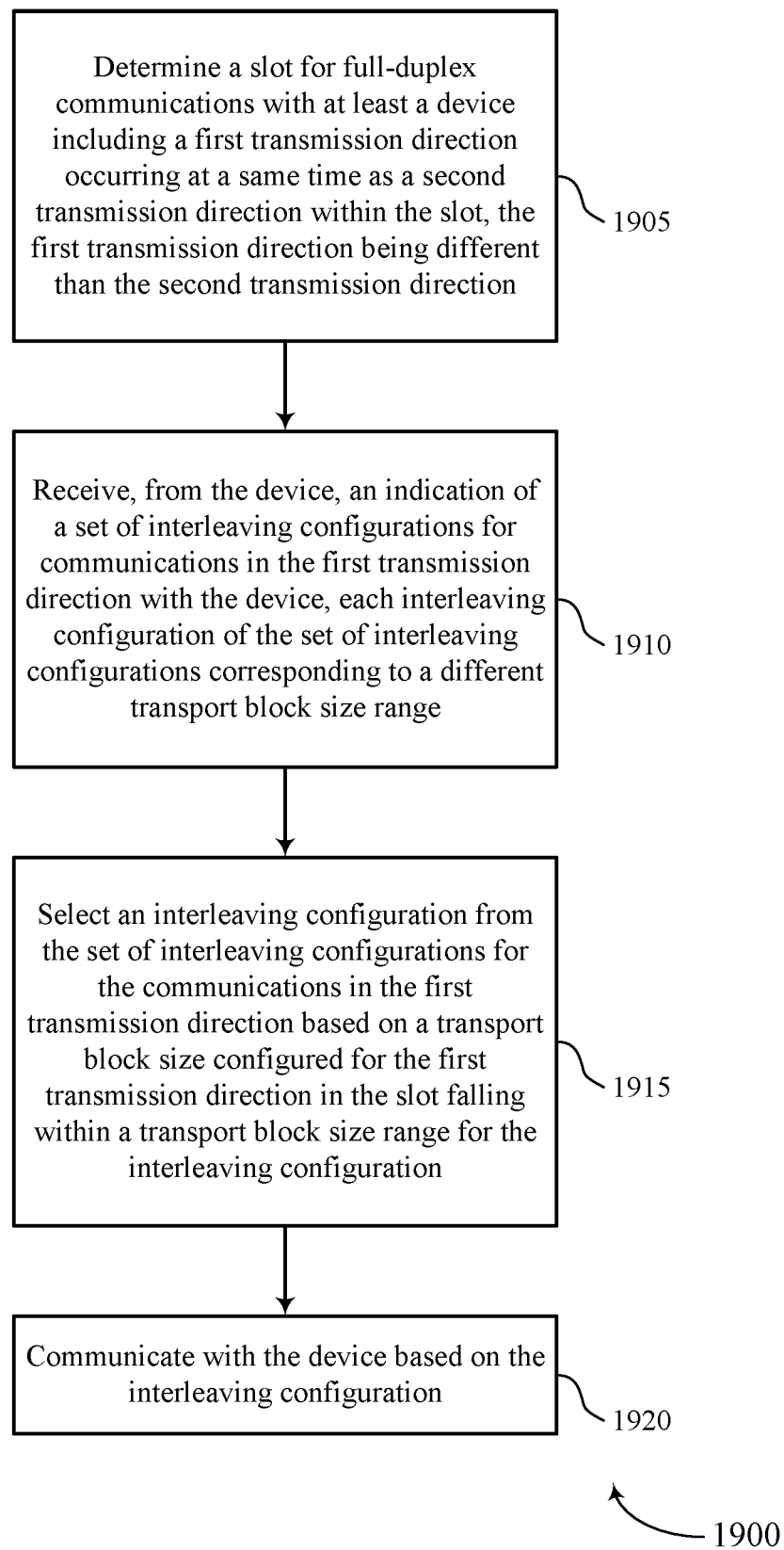

FIG. 19 shows a flowchart illustrating a method 1900 that supports techniques for interleaving in full-duplex slots in accordance with one or more aspects of the present disclosure. The operations of method 1900 may be implemented by a UE 115 or its components as described herein. For example, the operations of method 1900 may be performed by a UE communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1905, the UE may determine a slot for full-duplex communications with at least a device including a first transmission direction occurring at a same time as a second transmission direction within the slot, the first transmission direction being different than the second transmission direction. The operations of 1905 may be performed according to the methods described herein. In some examples, aspects of the operations of 1905 may be performed by a full-duplex determination component as described with reference to FIGS. 6 through 9.

At 1910, the UE may receive, from the device, an indication of a set of interleaving configurations for communications in the first transmission direction with the device, each interleaving configuration of the set of interleaving configurations corresponding to a different transport block size range. The operations of 1910 may be performed according to the methods described herein. In some examples, aspects of the operations of 1910 may be performed by a transport block size interleaver component as described with reference to FIGS. 6 through 9.

At 1915, the UE may select an interleaving configuration from the set of interleaving configurations for the communications in the first transmission direction based on a transport block size configured for the first transmission direction in the slot falling within a transport block size range for the interleaving configuration. The operations of 1915 may be performed according to the methods described herein. In some examples, aspects of the operations of 1915 may be performed by an interleaver determination component as described with reference to FIGS. 6 through 9.

At 1920, the UE may communicate with the device based on the interleaving configuration. The operations of 1920 may be performed according to the methods described herein. In some examples, aspects of the operations of 1920 may be performed by an interleaving communication component as described with reference to FIGS. 6 through 9.

Figure 20:
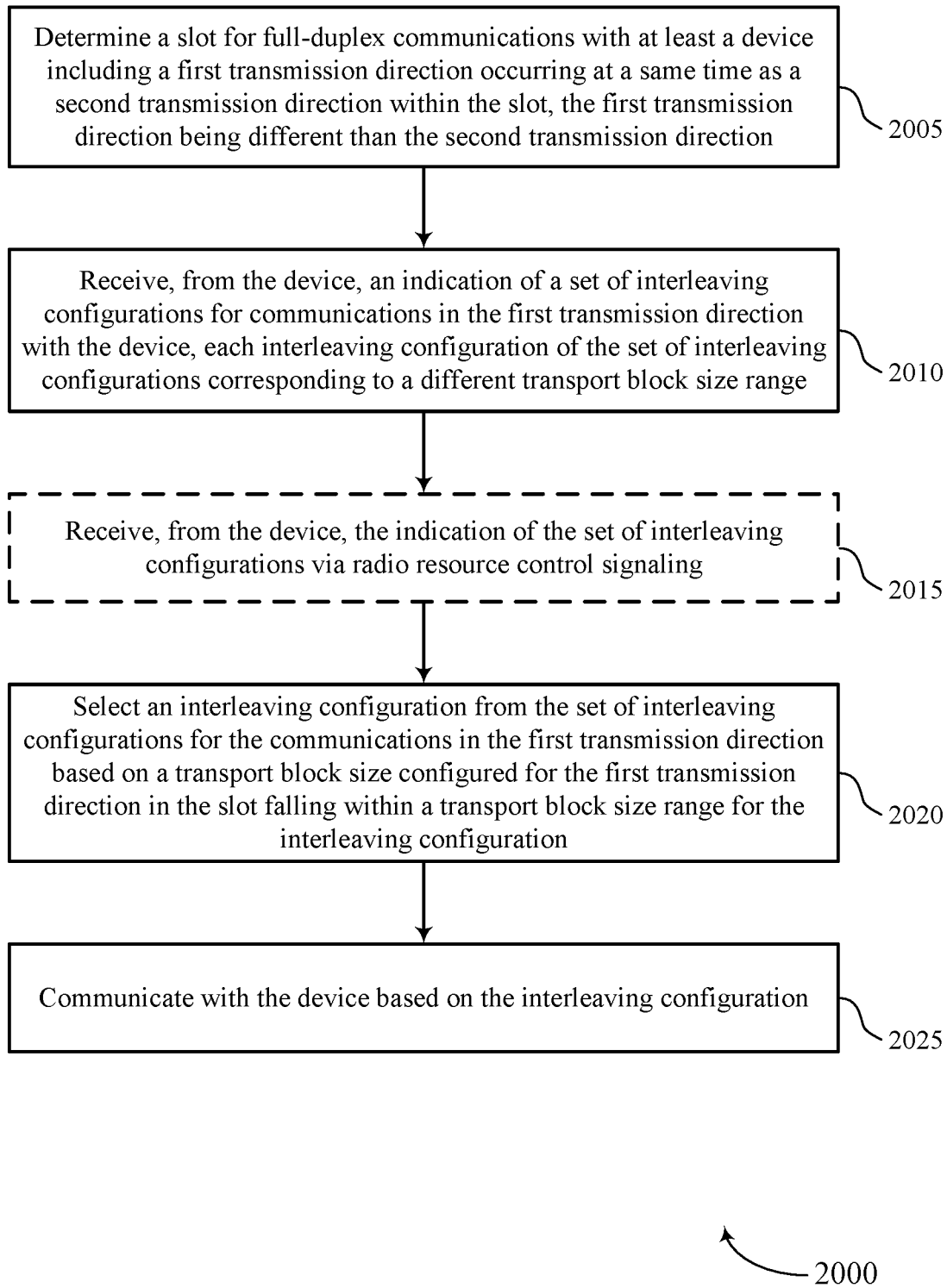

FIG. 20 shows a flowchart illustrating a method 2000 that supports techniques for interleaving in full-duplex slots in accordance with one or more aspects of the present disclosure. The operations of method 2000 may be implemented by a UE 115 or its components as described herein. For example, the operations of method 2000 may be performed by a UE communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 2005, the UE may determine a slot for full-duplex communications with at least a device including a first transmission direction occurring at a same time as a second transmission direction within the slot, the first transmission direction being different than the second transmission direction. The operations of 2005 may be performed according to the methods described herein. In some examples, aspects of the operations of 2005 may be performed by a full-duplex determination component as described with reference to FIGS. 6 through 9.

At 2010, the UE may receive, from the device, an indication of a set of interleaving configurations for communications in the first transmission direction with the device, each interleaving configuration of the set of interleaving configurations corresponding to a different transport block size range. The operations of 2010 may be performed according to the methods described herein. In some examples, aspects of the operations of 2010 may be performed by a transport block size interleaver component as described with reference to FIGS. 6 through 9.

At 2015, the UE may receive, from the device, the indication of the set of interleaving configurations via radio resource control signaling. The operations of 2015 may be performed according to the methods described herein. In some examples, aspects of the operations of 2015 may be performed by a transport block size interleaver component as described with reference to FIGS. 6 through 9.

At 2020, the UE may select an interleaving configuration from the set of interleaving configurations for the communications in the first transmission direction based on a transport block size configured for the first transmission direction in the slot falling within a transport block size range for the interleaving configuration. The operations of 2020 may be performed according to the methods described herein. In some examples, aspects of the operations of 2020 may be performed by an interleaver determination component as described with reference to FIGS. 6 through 9.

At 2025, the UE may communicate with the device based on the interleaving configuration. The operations of 2025 may be performed according to the methods described herein. In some examples, aspects of the operations of 2025 may be performed by an interleaving communication component as described with reference to FIGS. 6 through 9.

Figure 21:
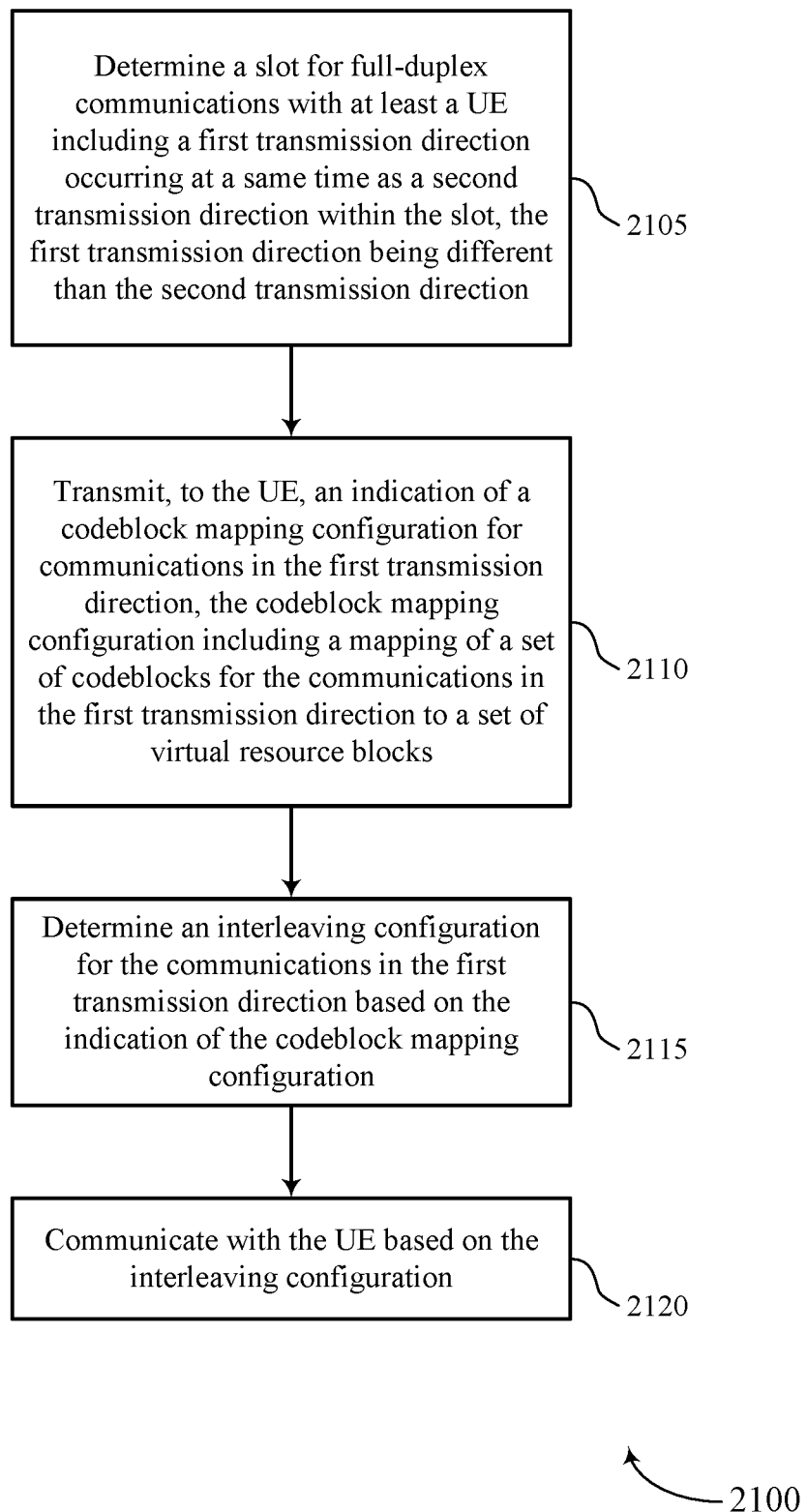

FIG. 21 shows a flowchart illustrating a method 2100 that supports techniques for interleaving in full-duplex slots in accordance with one or more aspects of the present disclosure. The operations of method 2100 may be implemented by a UE 115 or base station 105 or its components as described herein. For example, the operations of method 2100 may be performed by a communications manager as described with reference to FIGS. 10 through 14. In some examples, a UE or base station may execute a set of instructions to control the functional elements of the UE or base station to perform the functions described below. Additionally or alternatively, a UE or base station may perform aspects of the functions described below using special-purpose hardware.

At 2105, the UE or base station may determine a slot for full-duplex communications with at least a UE including a first transmission direction occurring at a same time as a second transmission direction within the slot, the first transmission direction being different than the second transmission direction. The operations of 2105 may be performed according to the methods described herein. In some examples, aspects of the operations of 2105 may be performed by a full-duplex component as described with reference to FIGS. 10 through 14.

At 2110, the UE or base station may transmit, to the UE, an indication of a codeblock mapping configuration for communications in the first transmission direction, the codeblock mapping configuration including a mapping of a set of codeblocks for the communications in the first transmission direction to a set of virtual resource blocks. The operations of 2110 may be performed according to the methods described herein. In some examples, aspects of the operations of 2110 may be performed by a codeblock mapping indicator as described with reference to FIGS. 10 through 14.

At 2115, the UE or base station may determine an interleaving configuration for the communications in the first transmission direction based on the indication of the codeblock mapping configuration. The operations of 2115 may be performed according to the methods described herein. In some examples, aspects of the operations of 2115 may be performed by an interleaver configuration component as described with reference to FIGS. 10 through 14.

At 2120, the UE or base station may communicate with the UE based on the interleaving configuration. The operations of 2120 may be performed according to the methods described herein. In some examples, aspects of the operations of 2120 may be performed by an interleaver communications component as described with reference to FIGS. 10 through 14.

Figure 22:
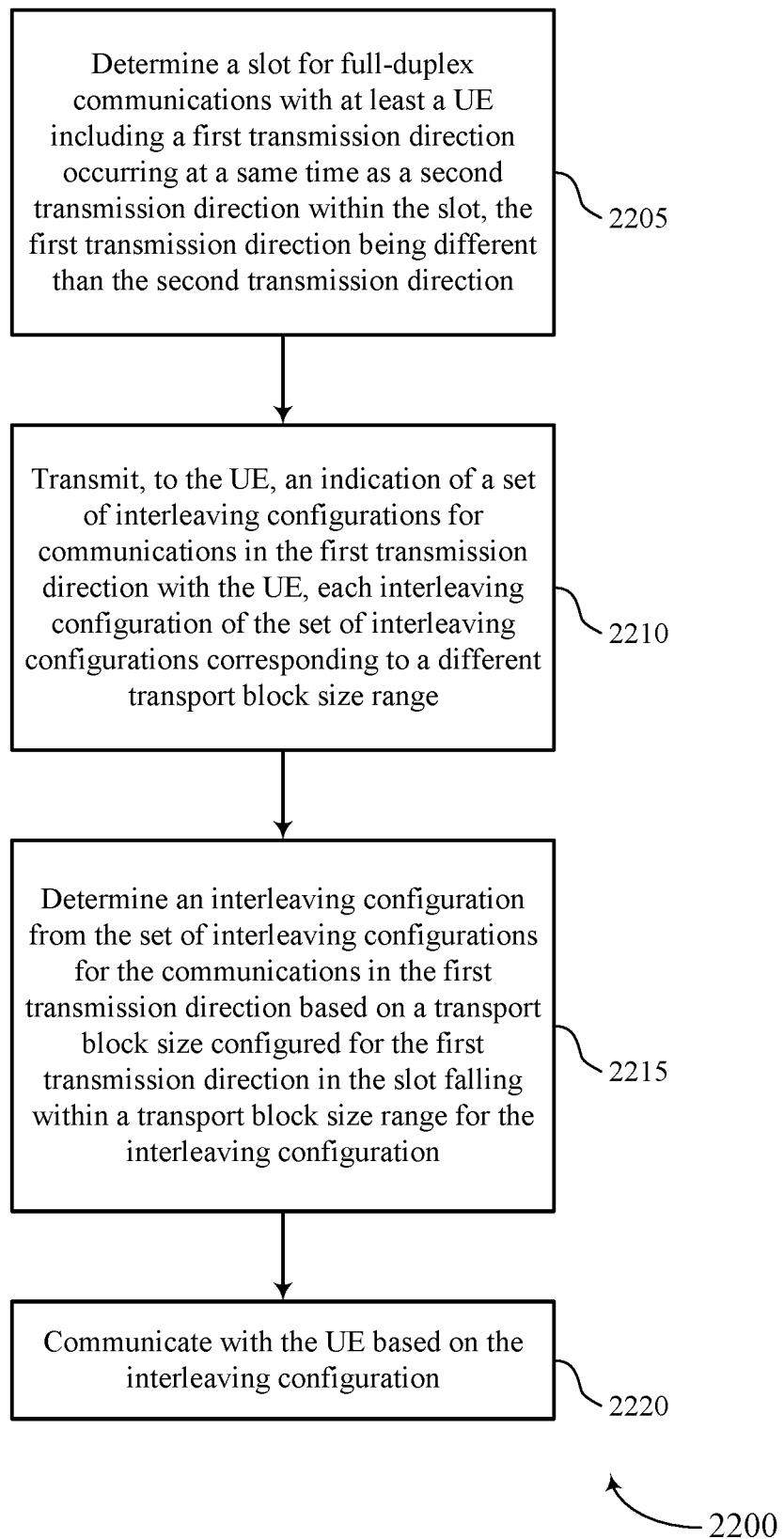

FIG. 22 shows a flowchart illustrating a method 2200 that supports techniques for interleaving in full-duplex slots in accordance with one or more aspects of the present disclosure. The operations of method 2200 may be implemented by a UE 115 or base station 105 or its components as described herein. For example, the operations of method 2200 may be performed by a communications manager as described with reference to FIGS. 10 through 14. In some examples, a UE or base station may execute a set of instructions to control the functional elements of the UE or base station to perform the functions described below. Additionally or alternatively, a UE or base station may perform aspects of the functions described below using special-purpose hardware.

At 2205, the UE or base station may determine a slot for full-duplex communications with at least a UE including a first transmission direction occurring at a same time as a second transmission direction within the slot, the first transmission direction being different than the second transmission direction. The operations of 2205 may be performed according to the methods described herein. In some examples, aspects of the operations of 2205 may be performed by a full-duplex component as described with reference to FIGS. 10 through 14.

At 2210, the UE or base station may transmit, to the UE, an indication of a set of interleaving configurations for communications in the first transmission direction with the UE, each interleaving configuration of the set of interleaving configurations corresponding to a different transport block size range. The operations of 2210 may be performed according to the methods described herein. In some examples, aspects of the operations of 2210 may be performed by an interleaver configuration indicator as described with reference to FIGS. 10 through 14.

At 2215, the UE or base station may determine an interleaving configuration from the set of interleaving configurations for the communications in the first transmission direction based on a transport block size configured for the first transmission direction in the slot falling within a transport block size range for the interleaving configuration. The operations of 2215 may be performed according to the methods described herein. In some examples, aspects of the operations of 2215 may be performed by an interleaver configuration component as described with reference to FIGS. 10 through 14.

At 2220, the UE or base station may communicate with the UE based on the interleaving configuration. The operations of 2220 may be performed according to the methods described herein. In some examples, aspects of the operations of 2220 may be performed by an interleaver communications component as described with reference to FIGS. 10 through 14.

Figure 23:
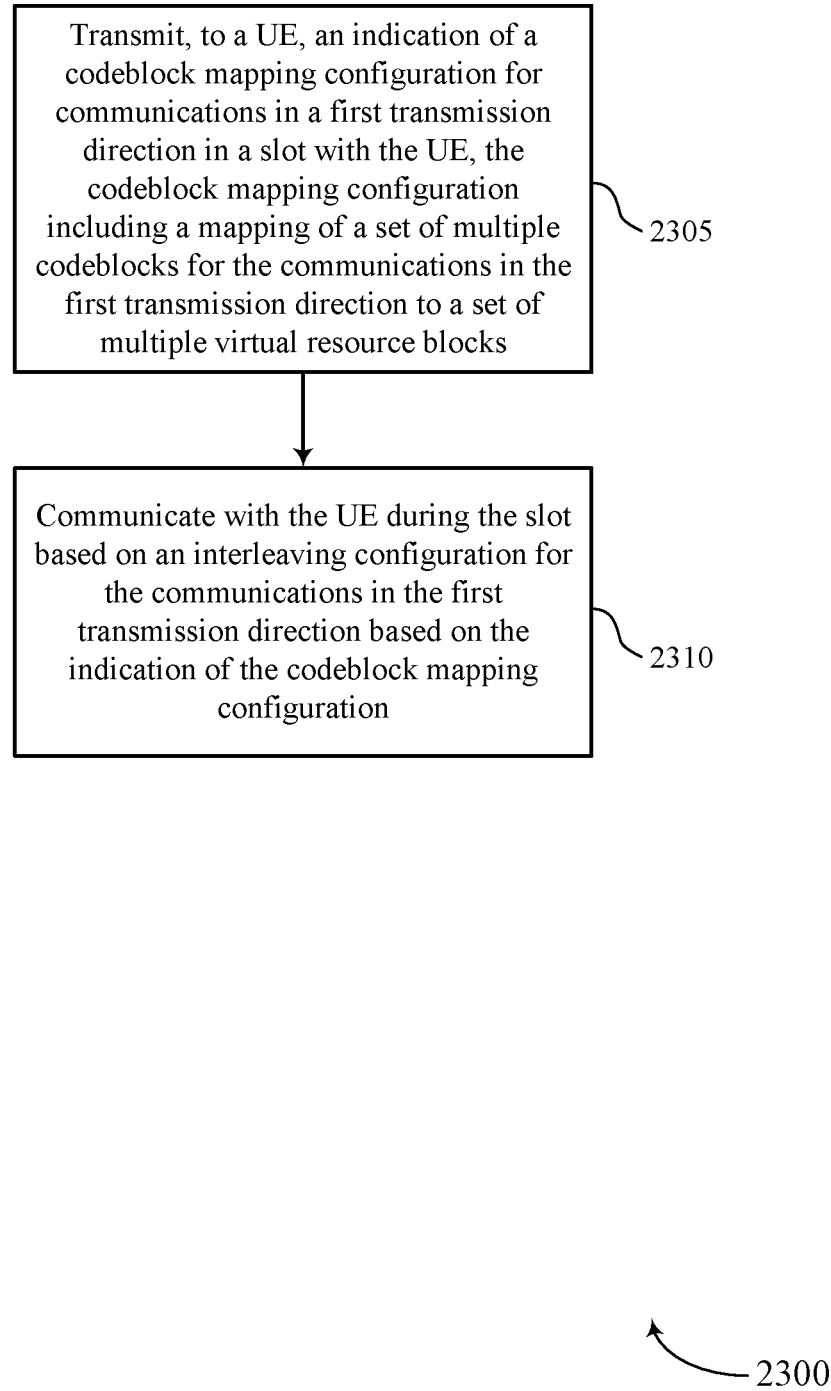

FIG. 23 shows a flowchart illustrating a method 2300 that supports techniques for interleaving in full-duplex slots in accordance with one or more aspects of the present disclosure. The operations of method 2300 may be implemented by a UE 115 or base station 105 or its components as described herein. For example, the operations of method 2300 may be performed by a communications manager as described with reference to FIGS. 10 through 14. In some examples, a UE or base station may execute a set of instructions to control the functional elements of the UE or base station to perform the functions described below. Additionally or alternatively, a UE or base station may perform aspects of the functions described below using special-purpose hardware.

At 2305, the UE or base station may transmit, to a UE, an indication of a codeblock mapping configuration for communications in a first transmission direction in a slot with the UE, the codeblock mapping configuration including a mapping of a set of multiple codeblocks for the communications in the first transmission direction to a set of multiple virtual resource blocks. The operations of 2305 may be performed according to the methods described herein. In some examples, aspects of the operations of 2305 may be performed by a codeblock mapping indicator as described with reference to FIGS. 10 through 14.

At 2310, the UE or base station may communicate with the UE during the slot based on an interleaving configuration for the communications in the first transmission direction based on the indication of the codeblock mapping configuration. The operations of 2310 may be performed according to the methods described herein. In some examples, aspects of the operations of 2310 may be performed by an interleaver communications component as described with reference to FIGS. 10 through 14.

Figure 24:
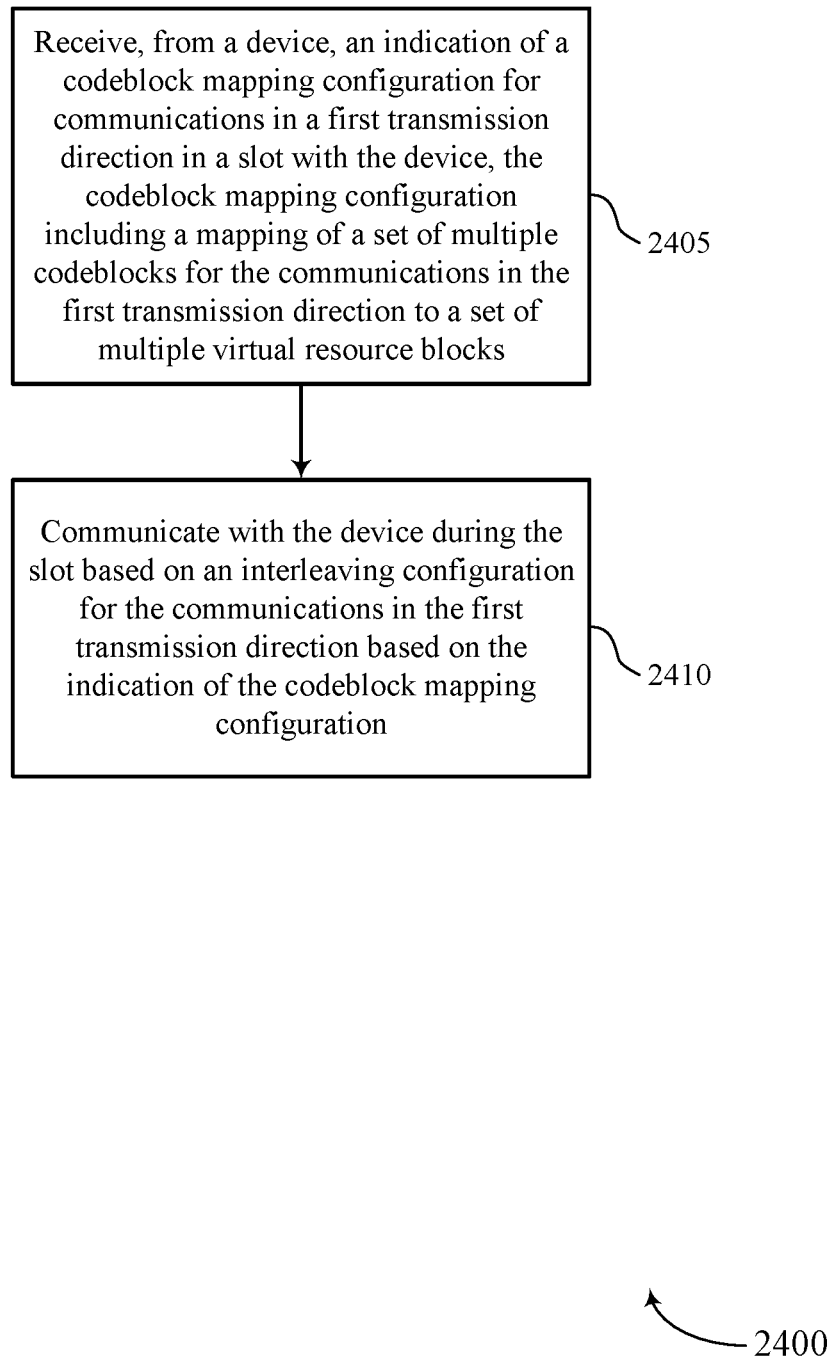

FIG. 24 shows a flowchart illustrating a method 2400 that supports techniques for interleaving in full-duplex slots in accordance with one or more aspects of the present disclosure. The operations of method 2400 may be implemented by a UE 115 or its components as described herein. For example, the operations of method 2400 may be performed by a UE communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 2405, the UE may receive, from a device, an indication of a codeblock mapping configuration for communications in a first transmission direction in a slot with the device, the codeblock mapping configuration including a mapping of a set of multiple codeblocks for the communications in the first transmission direction to a set of multiple virtual resource blocks. The operations of 2405 may be performed according to the methods described herein. In some examples, aspects of the operations of 2405 may be performed by a codeblock mapping component as described with reference to FIGS. 6 through 9.

At 2410, the UE may communicate with the device during the slot based on an interleaving configuration for the communications in the first transmission direction based on the indication of the codeblock mapping configuration. The operations of 2410 may be performed according to the methods described herein. In some examples, aspects of the operations of 2410 may be performed by an interleaving communication component as described with reference to FIGS. 6 through 9.

Figure 25:
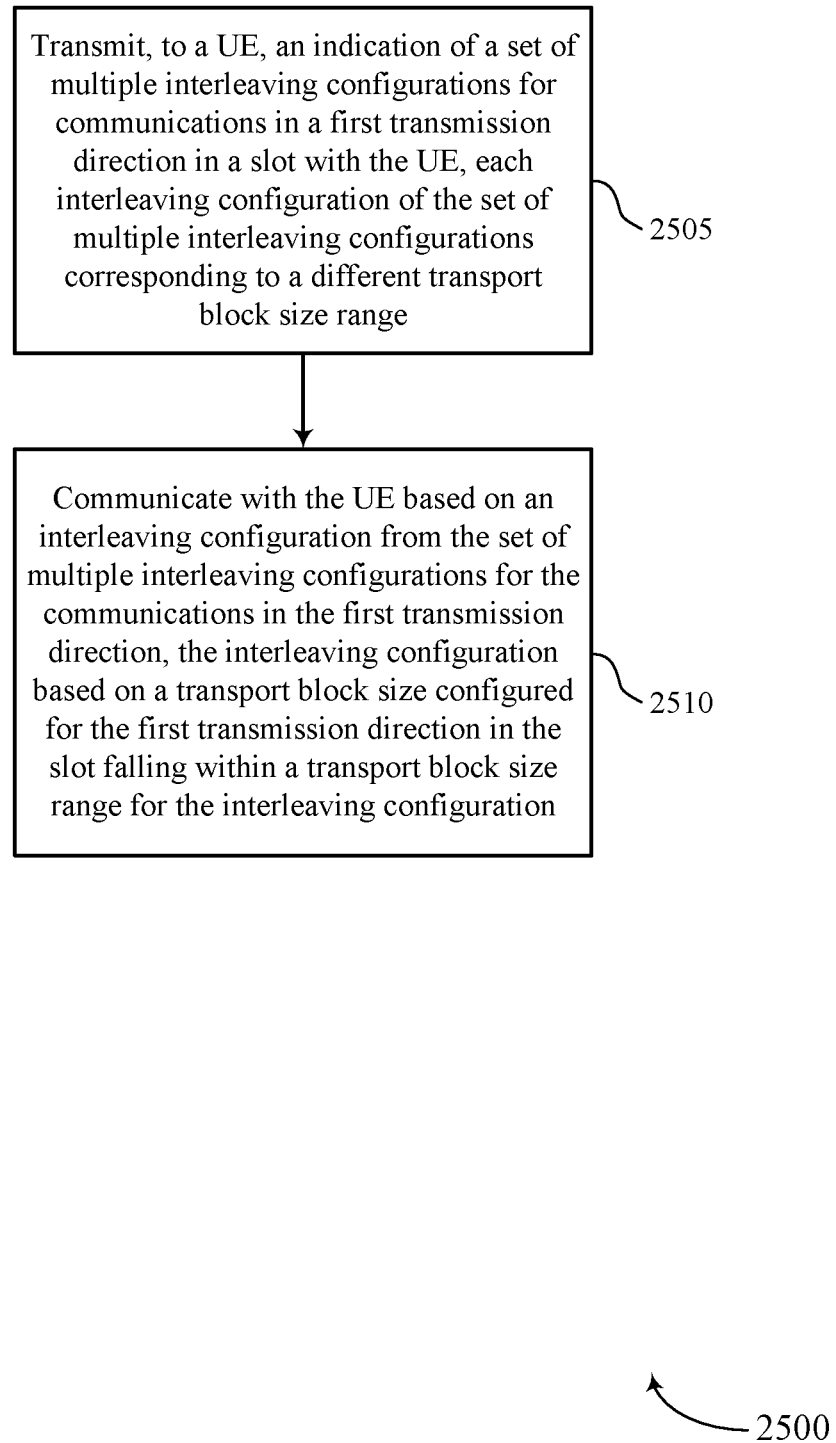

FIG. 25 shows a flowchart illustrating a method 2500 that supports techniques for interleaving in full-duplex slots in accordance with one or more aspects of the present disclosure. The operations of method 2500 may be implemented by a UE 115 or base station 105 or its components as described herein. For example, the operations of method 2500 may be performed by a communications manager as described with reference to FIGS. 10 through 14. In some examples, a UE or base station may execute a set of instructions to control the functional elements of the UE or base station to perform the functions described below.

Additionally or alternatively, a UE or base station may perform aspects of the functions described below using special-purpose hardware.

At 2505, the UE or base station may transmit, to a UE, an indication of a set of multiple interleaving configurations for communications in a first transmission direction in a slot with the UE, each interleaving configuration of the set of multiple interleaving configurations corresponding to a different transport block size range. The operations of 2505 may be performed according to the methods described herein. In some examples, aspects of the operations of 2505 may be performed by an interleaver configuration indicator as described with reference to FIGS. 10 through 14.

At 2510, the UE or base station may communicate with the UE based on an interleaving configuration from the set of multiple interleaving configurations for the communications in the first transmission direction, the interleaving configuration based on a transport block size configured for the first transmission direction in the slot falling within a transport block size range for the interleaving configuration. The operations of 2510 may be performed according to the methods described herein. In some examples, aspects of the operations of 2510 may be performed by an interleaver communications component as described with reference to FIGS. 10 through 14.

Figure 26:
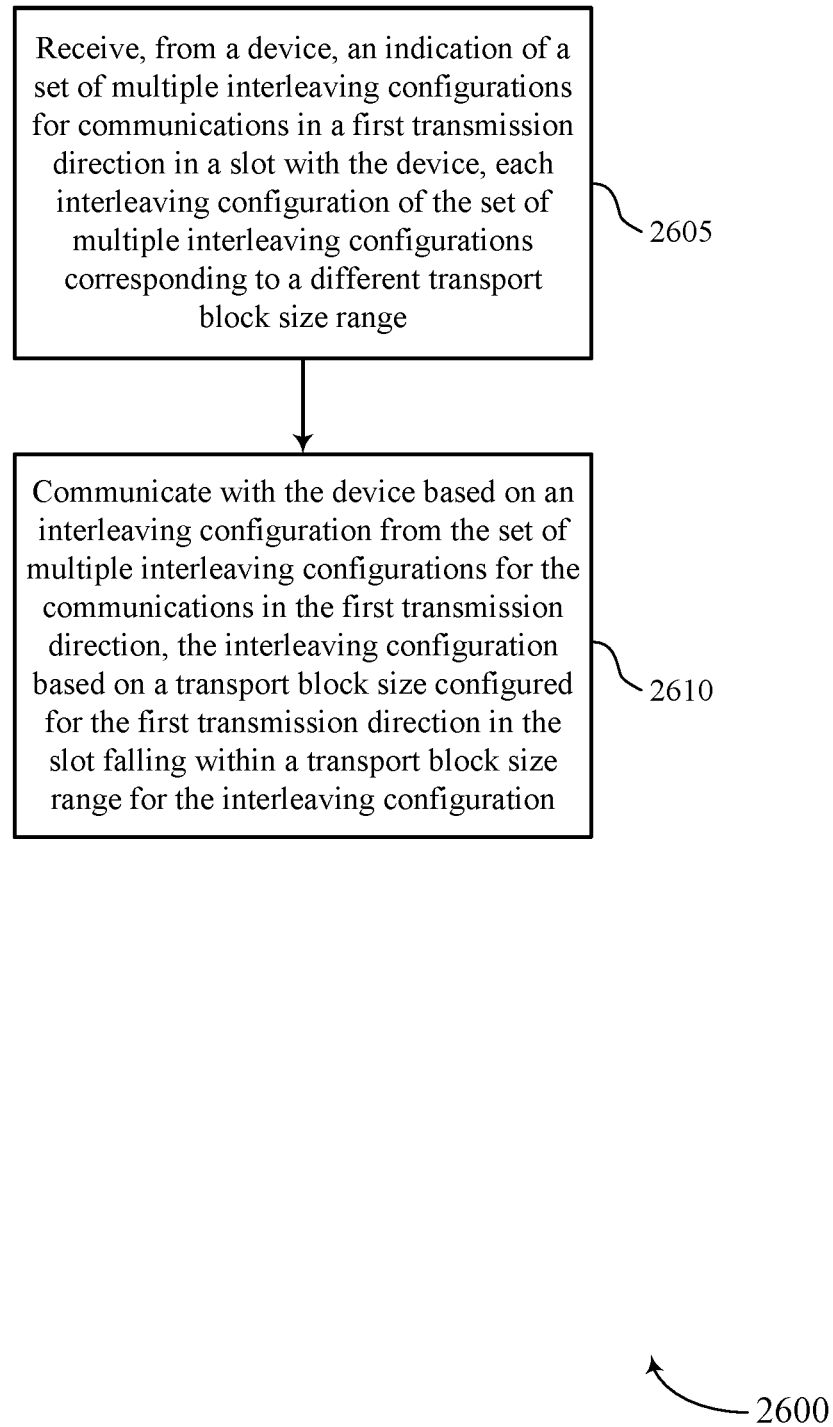

FIG. 26 shows a flowchart illustrating a method 2600 that supports techniques for interleaving in full-duplex slots in accordance with one or more aspects of the present disclosure. The operations of method 2600 may be implemented by a UE 115 or its components as described herein. For example, the operations of method 2600 may be performed by a UE communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 2605, the UE may receive, from a device, an indication of a set of multiple interleaving configurations for communications in a first transmission direction in a slot with the device, each interleaving configuration of the set of multiple interleaving configurations corresponding to a different transport block size range. The operations of 2605 may be performed according to the methods described herein. In some examples, aspects of the operations of 2605 may be performed by a transport block size interleaver component as described with reference to FIGS. 6 through 9.

At 2610, the UE may communicate with the device based on an interleaving configuration from the set of multiple interleaving configurations for the communications in the first transmission direction, the interleaving configuration based on a transport block size configured for the first transmission direction in the slot falling within a transport block size range for the interleaving configuration. The operations of 2610 may be performed according to the methods described herein. In some examples, aspects of the operations of 2610 may be performed by an interleaving communication component as described with reference to FIGS. 6 through 9.

It should be noted that the methods described herein describe possible implementations, and that the operations and the steps may be rearranged or otherwise modified and that other implementations are possible. Further, aspects from two or more of the methods may be combined.

The following provides an overview of further aspects of the present invention:

Aspect 1: A method for wireless communication at a user equipment (UE), comprising determining a slot for full-duplex communications with a device comprising a first transmission direction occurring at a same time as a second transmission direction within the slot, the first transmission direction being different from the second transmission direction; receiving, from the device, an indication of a codeblock mapping configuration for communications in the first transmission direction, the codeblock mapping configuration comprising a mapping of a plurality of codeblocks for the communications in the first transmission direction to a plurality of virtual resource blocks; determining an interleaving configuration for the communications in the first transmission direction based at least in part on the indication of the codeblock mapping configuration; and communicating with the device based at least in part on the interleaving configuration.

Aspect 2: The method of aspect 1, wherein determining the interleaving configuration further comprises: receiving, from the device, an indication of a plurality of interleaving configurations for the communications in the first transmission direction with the device, each interleaving configuration of the plurality of interleaving configurations corresponding to a different transport block size range; and selecting the interleaving configuration from the plurality of interleaving configurations for the communications in the first transmission direction based at least in part on a transport block size configured for the first transmission direction in the slot falling within a transport block size range for the interleaving configuration, wherein the interleaving configuration is determined based at least in part on the transport block size configured for the first transmission direction and the indication of the codeblock mapping configuration.

Aspect 3: The method of aspect 2, wherein receiving the indication of the plurality of interleaving configurations comprises: receiving, from the device, the indication of the plurality of interleaving configurations via radio resource control signaling.

Aspect 4: The method of any one of aspects 1 through 3, wherein determining the interleaving configuration further comprises: measuring a plurality of levels of self-interference for the plurality of codeblocks for communications in the first transmission direction, the self-interference for the communications in the first transmission direction caused by communications in the second transmission direction; and determining the interleaving configuration for the communications in the first transmission direction based at least in part on a difference between a first level of the plurality of levels of self-interference and a second level of the plurality of levels of self-interference satisfying a threshold value.

Aspect 5: The method of aspect 4, wherein the first level of the plurality of levels of self-interference is different than the second level of the plurality of levels of self-interference based at least in part on the codeblock mapping configuration.

Aspect 6: The method of any one of aspects 1 through 5, wherein determining the interleaving configuration further comprises: determining one or more transmission characteristics for the communications in the first transmission direction, wherein the interleaving configuration is determined based at least in part on the one or more transmission characteristics.

Aspect 7: The method of aspect 6, wherein the one or more transmission characteristics comprise a presence of communications in the second transmission direction causing self-interference on the communications in the first transmission direction, a frequency and time domain allocation for the communications in the first transmission direction, a codeblock size for the plurality of the codeblocks, a codeblock length for the plurality of the codeblocks, or any combination thereof.

Aspect 8: The method of any one of aspects 1 through 7, wherein determining the interleaving configuration further comprises: determining a number of codeblocks mapped per symbol of the slot, wherein the interleaving configuration is determined based at least in part on the number of codeblocks mapped per symbol satisfying a threshold value.

Aspect 9: The method of any one of aspects 1 through 8, wherein the interleaving configuration comprises a frequency domain interleaving configuration, a virtual resource block-to-physical resource block mapping configuration, or a combination thereof for the communications in the first transmission direction.

Aspect 10: The method of any one of aspects 1 through 9, wherein the first transmission direction comprises uplink communications, downlink communications, or sidelink communications, and the second transmission direction comprises uplink communications, downlink communications, or sidelink communications that is different than the first transmission direction.

Aspect 11: The method of any one of aspects 1 through 10, wherein the device comprises a UE, a base station, or an additional wireless device, or a combination thereof.

Aspect 12: A method for wireless communication at a user equipment (UE), comprising determining a slot for full-duplex communications with at least a device comprising a first transmission direction occurring at a same time as a second transmission direction within the slot, the first transmission direction being different than the second transmission direction; receiving, from the device, an indication of a plurality of interleaving configurations for communications in the first transmission direction with the device, each interleaving configuration of the plurality of interleaving configurations corresponding to a different transport block size range; selecting an interleaving configuration from the plurality of interleaving configurations for the communications in the first transmission direction based at least in part on a transport block size configured for the first transmission direction in the slot falling within a transport block size range for the interleaving configuration; and communicating with the device based at least in part on the interleaving configuration.

Aspect 13: The method of aspect 12, further comprising receiving, from the device, an indication of a codeblock mapping configuration for the communications in the first transmission direction, the codeblock mapping configuration comprising a mapping of a plurality of codeblocks for the communications in the first transmission direction to a plurality of virtual resource blocks; and determining the interleaving configuration for the communications in the first transmission direction based at least in part on the indication of the codeblock mapping configuration and the transport block size configured for the first transmission direction.

Aspect 14: The method of aspect 13, wherein determining the interleaving configuration further comprises: measuring a plurality of levels of self-interference for a plurality of codeblocks for communications in the first transmission direction, the self-interference for the communications in the first transmission direction caused by communications in the second transmission direction; and determining the interleaving configuration for the communications in the first transmission direction based at least in part on a difference between a first level of the plurality of levels of self-interference and a second level of the plurality of levels of self-interference satisfying a threshold value.

Aspect 15: The method of aspect 14, wherein the first level of the plurality of levels of self-interference is different than the second level of the plurality of levels of self-interference based at least in part on the codeblock mapping configuration.

Aspect 16: The method of any one of aspects 13 through 15, wherein determining the interleaving configuration further comprises: determining one or more transmission characteristics for the communications in the first transmission direction, wherein the interleaving configuration is determined based at least in part on the one or more transmission characteristics.

Aspect 17: The method of aspect 16, wherein the one or more transmission characteristics comprise a presence of communications in the second transmission direction causing self-interference on the communications in the first transmission direction, a frequency and time domain allocation for the communications in the first transmission direction, a codeblock size for the plurality of the codeblocks, a codeblock length for the plurality of the codeblocks, or any combination thereof.

Aspect 18: The method of any one of aspects 13 through 17, wherein determining the interleaving configuration further comprises: determining a number of codeblocks mapped per symbol of the slot, wherein the interleaving configuration is determined based at least in part on the number of codeblocks mapped per symbol satisfying a threshold value.

Aspect 19: The method of any one of aspects 12 through 18, wherein receiving the indication of the plurality of interleaving configurations comprises: receiving, from the device, the indication of the plurality of interleaving configurations via radio resource control signaling.

Aspect 20: The method of any one of aspects 12 through 19, wherein the interleaving configuration comprises a frequency domain interleaving configuration, a virtual resource block-to-physical resource block mapping configuration, or a combination thereof for the communications in the first transmission direction.

Aspect 21: The method of any one of aspects 12 through 20, wherein the first transmission direction comprises uplink communications, downlink communications, or sidelink communications, and the second transmission direction comprises uplink communications, downlink communications, or sidelink communications that is different than the first transmission direction.

Aspect 22: The method of any one of aspects 12 through 21, wherein the device comprises a UE, a base station, or an additional wireless device, or a combination thereof.

Aspect 23: A method for wireless communications at a device, comprising determining a slot for full-duplex communications with at least a user equipment (UE) comprising a first transmission direction occurring at a same time as a second transmission direction within the slot, the first transmission direction being different than the second transmission direction; transmitting, to the UE, an indication of a codeblock mapping configuration for communications in the first transmission direction, the codeblock mapping configuration comprising a mapping of a plurality of codeblocks for the communications in the first transmission direction to a plurality of virtual resource blocks; determining an interleaving configuration for the communications in the first transmission direction based at least in part on the indication of the codeblock mapping configuration; and communicating with the UE based at least in part on the interleaving configuration.

Aspect 24: The method of aspect 23, wherein determining the interleaving configuration further comprises: transmitting, to the UE, an indication of a plurality of interleaving configurations for the communications in the first transmission direction with the UE, each interleaving configuration of the plurality of interleaving configurations corresponding to a different transport block size range; and determining the interleaving configuration from the plurality of interleaving configurations for the communications in the first transmission direction based at least in part on a transport block size configured for the first transmission direction in the slot falling within a transport block size range for the interleaving configuration, wherein the interleaving configuration is determined based at least in part on the transport block size configured for the first transmission direction and the indication of the codeblock mapping configuration.

Aspect 25: The method of aspect 24, wherein transmitting the indication of the plurality of interleaving configurations comprises: transmitting, to the UE, the indication of the plurality of interleaving configurations via radio resource control signaling.

Aspect 26: The method of any one of aspects 23 through 25, wherein determining the interleaving configuration further comprises: measuring a plurality of levels of self-interference for the plurality of codeblocks for communications in the first transmission direction, the self-interference for the communications in the first transmission direction caused by communications in the second transmission direction; and determining the interleaving configuration for the communications in the first transmission direction based at least in part on a difference between a first level of the plurality of levels of self-interference and a second level of the plurality of levels of self-interference satisfying a threshold value.

Aspect 27: The method of aspect 26, wherein the first level of the plurality of levels of self-interference is different than the second level of the plurality of levels of self-interference based at least in part on the codeblock mapping configuration.

Aspect 28: The method of any one of aspects 23 through 27, wherein determining the interleaving configuration further comprises: determining one or more transmission characteristics for the communications in the first transmission direction, wherein the interleaving configuration is determined based at least in part on the one or more transmission characteristics.

Aspect 29: The method of aspect 28, wherein the one or more transmission characteristics comprise a presence of communications in the second transmission direction causing self-interference on the communications in the first transmission direction, a frequency and time domain allocation for the communications in the first transmission direction, a codeblock size for the plurality of the codeblocks, a codeblock length for the plurality of the codeblocks, or any combination thereof.

Aspect 30: The method of any one of aspects 23 through 29, wherein determining the interleaving configuration further comprises: determining a number of codeblocks mapped per symbol of the slot, wherein the interleaving configuration is determined based at least in part on the number of codeblocks mapped per symbol satisfying a threshold value.

Aspect 31: The method of any one of aspects 23 through 30, wherein the interleaving configuration comprises a frequency domain interleaving configuration, a virtual resource block-to-physical resource block mapping configuration, or a combination thereof for the communications in the first transmission direction.

Aspect 32: The method of any one of aspects 23 through 31, wherein the first transmission direction comprises uplink communications, downlink communications, or sidelink communications, and the second transmission direction comprises uplink communications, downlink communications, or sidelink communications that is different than the first transmission direction.

Aspect 33: The method of any one of aspects 23 through 32, wherein the device comprises a UE, a base station, or an additional wireless device, or a combination thereof.

Aspect 34: A method for wireless communications at a device, comprising determining a slot for full-duplex communications with at least a user equipment (UE) comprising a first transmission direction occurring at a same time as a second transmission direction within the slot, the first transmission direction being different than the second transmission direction; transmitting, to the UE, an indication of a plurality of interleaving configurations for communications in the first transmission direction with the UE, each interleaving configuration of the plurality of interleaving configurations corresponding to a different transport block size range; determining an interleaving configuration from the plurality of interleaving configurations for the communications in the first transmission direction based at least in part on a transport block size configured for the first transmission direction in the slot falling within a transport block size range for the interleaving configuration; and communicating with the UE based at least in part on the interleaving configuration.

Aspect 35: The method of aspect 34, further comprising transmitting, to the UE, an indication of a codeblock mapping configuration for the communications in the first transmission direction, the codeblock mapping configuration comprising a mapping of a plurality of codeblocks for the communications in the first transmission direction to a plurality of virtual resource blocks; and determining the interleaving configuration for the communications in the first transmission direction based at least in part on the indication of the codeblock mapping configuration and the transport block size configured for the first transmission direction.

Aspect 36: The method of aspect 35, wherein determining the interleaving configuration further comprises: measuring a plurality of levels of self-interference for a plurality of codeblocks for communications in the first transmission direction, the self-interference for the communications in the first transmission direction caused by communications in the second transmission direction; and determining the interleaving configuration for the communications in the first transmission direction based at least in part on a difference between a first level of the plurality of levels of self-interference and a second level of the plurality of levels of self-interference satisfying a threshold value.

Aspect 37: The method of aspect 36, wherein the first level of the plurality of levels of self-interference is different than the second level of the plurality of levels of self-interference based at least in part on the codeblock mapping configuration.

Aspect 38: The method of any one of aspects 35 through 37, wherein determining the interleaving configuration further comprises: determining one or more transmission characteristics for the communications in the first transmission direction, wherein the interleaving configuration is determined based at least in part on the one or more transmission characteristics.

Aspect 39: The method of aspect 38, wherein the one or more transmission characteristics comprise a presence of communications in the second transmission direction causing self-interference on the communications in the first transmission direction, a frequency and time domain allocation for the communications in the first transmission direction, a codeblock size for the plurality of the codeblocks, a codeblock length for the plurality of the codeblocks, or any combination thereof.

Aspect 40: The method of any one of aspects 35 through 39, wherein determining the interleaving configuration further comprises: determining a number of codeblocks mapped per symbol of the slot, wherein the interleaving configuration is determined based at least in part on the number of codeblocks mapped per symbol satisfying a threshold value.

Aspect 41: The method of any one of aspects 34 through 40, wherein transmitting the indication of the plurality of interleaving configurations comprises: transmitting, to the UE, the indication of the plurality of interleaving configurations via radio resource control signaling.

Aspect 42: The method of any one of aspects 34 through 41, wherein the interleaving configuration comprises a frequency domain interleaving configuration, a virtual resource block-to-physical resource block mapping configuration, or a combination thereof for the communications in the first transmission direction.

Aspect 43: The method of any one of aspects 34 through 42, wherein the first transmission direction comprises uplink communications, downlink communications, or sidelink communications, and the second transmission direction comprises uplink communications, downlink communications, or sidelink communications that is different than the first transmission direction.

Aspect 44: The method of any one of aspects 34 through 43, wherein the device comprises a UE, a base station, or an additional wireless device, or a combination thereof.

Aspect 45: An apparatus for wireless communications at a device comprising at least one means for performing a method of any one of aspects 1 through 11.

Aspect 46: An apparatus for wireless communications at a device comprising a processor and memory coupled to the processor, the processor and memory configured to perform a method of any one of aspects 1 through 11.

Aspect 47: A non-transitory computer-readable medium storing code for wireless communications at a device comprising a processor, memory in electronic communication with the processor, and instructions stored in the memory and executable by the processor to cause the apparatus to perform a method of any one of aspects 1 through 11.

Aspect 48: An apparatus for wireless communications at a device comprising at least one means for performing a method of any one of aspects 12 through 22.

Aspect 49: An apparatus for wireless communications at a device comprising a processor and memory coupled to the processor, the processor and memory configured to perform a method of any one of aspects 12 through 22.

Aspect 50: A non-transitory computer-readable medium storing code for wireless communications at a device comprising a processor, memory in electronic communication with the processor, and instructions stored in the memory and executable by the processor to cause the apparatus to perform a method of any one of aspects 12 through 22.

Aspect 51: An apparatus for wireless communications at a device comprising at least one means for performing a method of any one of aspects 23 through 33.

Aspect 52: An apparatus for wireless communications at a device comprising a processor and memory coupled to the processor, the processor and memory configured to perform a method of any one of aspects 23 through 33.

Aspect 53: A non-transitory computer-readable medium storing code for wireless communications at a device comprising a processor, memory in electronic communication with the processor, and instructions stored in the memory and executable by the processor to cause the apparatus to perform a method of any one of aspects 23 through 33.

Aspect 54: An apparatus for wireless communications at a device comprising at least one means for performing a method of any one of aspects 34 through 44.

Aspect 55: An apparatus for wireless communications at a device comprising a processor and memory coupled to the processor, the processor and memory configured to cause the apparatus to perform a method of any one of aspects 34 through 44.

Aspect 56: A non-transitory computer-readable medium storing code for wireless communications at a device comprising a processor, memory in electronic communication with the processor, and instructions stored in the memory and executable by the processor to cause the apparatus to perform a method of any one of aspects 34 through 44.

Aspect 57: A method for wireless communications at a device, comprising: transmitting, to a UE, an indication of a codeblock mapping configuration for communications in a first transmission direction in a slot with the UE, the codeblock mapping configuration comprising a mapping of a plurality of codeblocks for the communications in the first transmission direction to a plurality of virtual resource blocks; and communicating with the UE during the slot based at least in part on an interleaving configuration for the communications in the first transmission direction based at least in part on the indication of the codeblock mapping configuration.

Aspect 58: The method of aspect 57, wherein transmitting the indication of the codeblock mapping configuration comprises: transmitting the indication of the codeblock mapping configuration for full-duplex communications during the slot in the first transmission direction, the first transmission direction occurring within the slot at a same time as a second transmission direction within the slot, the first transmission direction being different from the second transmission direction.

Aspect 59: The method of aspect 58, wherein the first transmission direction comprises uplink communications, downlink communications, or sidelink communications, and the second transmission direction comprises uplink communications, downlink communications, or sidelink communications that is different than the first transmission direction.

Aspect 60: The method of any of aspects 57 through 59, further comprising: transmitting, to the UE, an indication of a plurality of interleaving configurations for the communications in the first transmission direction with the UE, each interleaving configuration of the plurality of interleaving configurations corresponding to a different transport block size range; and determining the interleaving configuration from the plurality of interleaving configurations for the communications in the first transmission direction based at least in part on a transport block size configured for the first transmission direction in the slot falling within a transport block size range for the interleaving configuration, wherein the interleaving configuration is determined based at least in part on the transport block size configured for the first transmission direction and the indication of the codeblock mapping configuration.

Aspect 61: The method of aspect 60, wherein transmitting the indication of the plurality of interleaving configurations comprises: transmitting, to the UE, the indication of the plurality of interleaving configurations via radio resource control signaling.

Aspect 62: The method of any of aspects 57 through 61, further comprising: measuring a plurality of levels of self-interference for the plurality of codeblocks for the communications in the first transmission direction, the self-interference for the communications in the first transmission direction caused by communications in a second transmission direction occurring at a same time as the communications in the first transmission direction; and determining the interleaving configuration for the communications in the first transmission direction based at least in part on a difference between a first level of the plurality of levels of self-interference and a second level of the plurality of levels of self-interference satisfying a threshold value.

Aspect 63: The method of aspect 62, wherein the first level of the plurality of levels of self-interference is different than the second level of the plurality of levels of self-interference based at least in part on the codeblock mapping configuration.

Aspect 64: The method of any of aspects 57 through 63, further comprising: determining one or more transmission characteristics for the communications in the first transmission direction, wherein the interleaving configuration is determined based at least in part on the one or more transmission characteristics.

Aspect 65: The method of aspect 64, wherein the one or more transmission characteristics comprise a presence of communications in a second transmission direction causing self-interference on the communications in the first transmission direction, a frequency and time domain allocation for the communications in the first transmission direction, a codeblock size for the plurality of codeblocks, a codeblock length for the plurality of codeblocks, or any combination thereof.

Aspect 66: The method of any of aspects 57 through 65, further comprising: determining a number of codeblocks mapped per symbol of the slot, wherein the interleaving configuration is determined based at least in part on the number of codeblocks mapped per symbol satisfying a threshold value.

Aspect 67: The method of any of aspects 57 through 66, wherein the interleaving configuration comprises a frequency domain interleaving configuration, a virtual resource block-to-physical resource block mapping configuration, or a combination thereof for the communications in the first transmission direction.

Aspect 68: The method of any of aspects 57 through 67, wherein the device comprises a UE, a base station, or an additional wireless device, or a combination thereof.

Aspect 69: A method for wireless communication at a UE, comprising: receiving, from a device, an indication of a codeblock mapping configuration for communications in a first transmission direction in a slot with the device, the codeblock mapping configuration comprising a mapping of a plurality of codeblocks for the communications in the first transmission direction to a plurality of virtual resource blocks; and communicating with the device during the slot based at least in part on an interleaving configuration for the communications in the first transmission direction based at least in part on the indication of the codeblock mapping configuration.

Aspect 70: The method of aspect 69, wherein receiving the indication of the codeblock mapping configuration comprises: receiving the indication of the codeblock mapping configuration for full-duplex communications during the slot in the first transmission direction, the first transmission direction occurring within the slot at a same time as a second transmission direction within the slot, the first transmission direction being different from the second transmission direction.

Aspect 71: The method of aspect 70, wherein the first transmission direction comprises uplink communications, downlink communications, or sidelink communications, and the second transmission direction comprises uplink communications, downlink communications, or sidelink communications that is different than the first transmission direction.

Aspect 72: The method of any of aspects 69 through 71, further comprising: receiving, from the device, an indication of a plurality of interleaving configurations for the communications in the first transmission direction with the device, each interleaving configuration of the plurality of interleaving configurations corresponding to a different transport block size range; and selecting the interleaving configuration from the plurality of interleaving configurations for the communications in the first transmission direction based at least in part on a transport block size configured for the first transmission direction in the slot falling within a transport block size range for the interleaving configuration, wherein the interleaving configuration is determined based at least in part on the transport block size configured for the first transmission direction and the indication of the codeblock mapping configuration.

Aspect 73: The method of aspect 72, wherein receiving the indication of the plurality of interleaving configurations comprises: receiving, from the device, the indication of the plurality of interleaving configurations via radio resource control signaling.

Aspect 74: The method of any of aspects 69 through 73, further comprising: measuring a plurality of levels of self-interference for the plurality of codeblocks for the communications in the first transmission direction, the self-interference for the communications in the first transmission direction caused by communications in a second transmission direction occurring at a same time as the communications in the first transmission direction; and determining the interleaving configuration for the communications in the first transmission direction based at least in part on a difference between a first level of the plurality of levels of self-interference and a second level of the plurality of levels of self-interference satisfying a threshold value.

Aspect 75: The method of aspect 74, wherein the first level of the plurality of levels of self-interference is different than the second level of the plurality of levels of self-interference based at least in part on the codeblock mapping configuration.

Aspect 76: The method of any of aspects 69 through 75, further comprising: determining one or more transmission characteristics for the communications in the first transmission direction, wherein the interleaving configuration is determined based at least in part on the one or more transmission characteristics.

Aspect 77: The method of aspect 76, wherein the one or more transmission characteristics comprise a presence of communications in a second transmission direction causing self-interference on the communications in the first transmission direction, a frequency and time domain allocation for the communications in the first transmission direction, a codeblock size for the plurality of codeblocks, a codeblock length for the plurality of codeblocks, or any combination thereof.

Aspect 78: The method of any of aspects 69 through 77, further comprising: determining a number of codeblocks mapped per symbol of the slot, wherein the interleaving configuration is determined based at least in part on the number of codeblocks mapped per symbol satisfying a threshold value.

Aspect 79: A method for wireless communications at a device, comprising: transmitting, to a UE, an indication of a plurality of interleaving configurations for communications in a first transmission direction in a slot with the UE, each interleaving configuration of the plurality of interleaving configurations corresponding to a different transport block size range; and communicating with the UE based at least in part on an interleaving configuration from the plurality of interleaving configurations for the communications in the first transmission direction, the interleaving configuration based at least in part on a transport block size configured for the first transmission direction in the slot falling within a transport block size range for the interleaving configuration.

Aspect 80: The method of aspect 79, wherein transmitting the indication of the plurality of interleaving configurations comprises: transmitting the indication of the plurality of interleaving configurations for full-duplex communications during the slot in the first transmission direction, the first transmission direction occurring within the slot at a same time as a second transmission direction within the slot, the first transmission direction being different from the second transmission direction.

Aspect 81: The method of any of aspects 79 through 80, further comprising: transmitting, to the UE, an indication of a codeblock mapping configuration for the communications in the first transmission direction, the codeblock mapping configuration comprising a mapping of a plurality of codeblocks for the communications in the first transmission direction to a plurality of virtual resource blocks; and determining the interleaving configuration for the communications in the first transmission direction based at least in part on the indication of the codeblock mapping configuration and the transport block size configured for the first transmission direction.

Aspect 82: The method of any of aspects 79 through 81, further comprising: measuring a plurality of levels of self-interference for a plurality of codeblocks for communications in the first transmission direction, the self-interference for the communications in the first transmission direction caused by communications in a second transmission direction occurring at a same time as the communications in the first transmission direction; and determining the interleaving configuration for the communications in the first transmission direction based at least in part on a difference between a first level of the plurality of levels of self-interference and a second level of the plurality of levels of self-interference satisfying a threshold value.

Aspect 83: The method of any of aspects 79 through 82, further comprising: determining one or more transmission characteristics for the communications in the first transmission direction, wherein the interleaving configuration is determined based at least in part on the one or more transmission characteristics.

Aspect 84: The method of any of aspects 79 through 83, further comprising: determining a number of codeblocks mapped per symbol of the slot, wherein the interleaving configuration is determined based at least in part on the number of codeblocks mapped per symbol satisfying a threshold value.

Aspect 85: The method of any of aspects 79 through 84, wherein transmitting the indication of the plurality of interleaving configurations comprises: transmitting, to the UE, the indication of the plurality of interleaving configurations via radio resource control signaling.

Aspect 86: A method for wireless communication at a UE, comprising: receiving, from a device, an indication of a plurality of interleaving configurations for communications in a first transmission direction in a slot with the device, each interleaving configuration of the plurality of interleaving configurations corresponding to a different transport block size range; and communicating with the device based at least in part on an interleaving configuration from the plurality of interleaving configurations for the communications in the first transmission direction, the interleaving configuration based at least in part on a transport block size configured for the first transmission direction in the slot falling within a transport block size range for the interleaving configuration.

Aspect 87: An apparatus for wireless communications at a device, comprising a processor; memory coupled to the processor, the processor and memory configured to perform a method of any of aspects 57 through 68.

Aspect 88: An apparatus for wireless communications at a device, comprising at least one means for performing a method of any of aspects 57 through 68.

Aspect 89: A non-transitory computer-readable medium storing code for wireless communications at a device, the code comprising instructions executable by a processor to perform a method of any of aspects 57 through 68.

Aspect 90: An apparatus for wireless communication at a UE, comprising a processor; memory coupled to the processor, the processor and memory configured to perform a method of any of aspects 69 through 78.

Aspect 91: An apparatus for wireless communication at a UE, comprising at least one means for performing a method of any of aspects 69 through 78.

Aspect 92: A non-transitory computer-readable medium storing code for wireless communication at a UE, the code comprising instructions executable by a processor to perform a method of any of aspects 69 through 78.

Aspect 93: An apparatus for wireless communications at a device, comprising a processor; memory coupled to the processor, the processor and memory configured to perform a method of any of aspects 79 through 85.

Aspect 94: An apparatus for wireless communications at a device, comprising at least one means for performing a method of any of aspects 79 through 85.

Aspect 95: A non-transitory computer-readable medium storing code for wireless communications at a device, the code comprising instructions executable by a processor to perform a method of any of aspects 79 through 85.

Aspect 96: An apparatus for wireless communication at a UE, comprising a processor; memory coupled to the processor, the processor and memory configured to perform a method of any of aspects 86 through 86.

Aspect 97: An apparatus for wireless communication at a UE, comprising at least one means for performing a method of any of aspects 86 through 86.

Aspect 98: A non-transitory computer-readable medium storing code for wireless communication at a UE, the code comprising instructions executable by a processor to perform a method of any of aspects 86 through 86.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a device, comprising:
   at least one memory; and
   at least one processor coupled with the at least one memory, wherein the at least one processor is configured to cause the apparatus to:
      transmit, to a user equipment (UE), an indication of a plurality of interleaving configurations for communications in a first transmission direction in a slot with the UE, each interleaving configuration of the plurality of interleaving configurations corresponding to a different transport block size range; and determine an interleaving configuration from the plurality of interleaving configurations for the communications in the first transmission direction based at least in part on a transport block size configured for the first transmission direction in the slot falling within a transport block size range for the interleaving configuration, wherein the interleaving configuration is determined based at least in part on the transport block size configured for the first transmission direction.

2. The apparatus of claim 1, wherein, to transmit the indication of the plurality of interleaving configurations, the at least one processor is configured to cause the apparatus to:
transmit, to the UE, the indication of the plurality of interleaving configurations via radio resource control signaling.

3. The apparatus of claim 1, wherein the at least one processor is further configured to cause the apparatus to:
measure a plurality of levels of self-interference for a plurality of codeblocks for the communications in the first transmission direction, the self-interference for the communications in the first transmission direction caused by communications in a second transmission direction occurring at a same time as the communications in the first transmission direction; and
determine the interleaving configuration for the communications in the first transmission direction based at least in part on a difference between a first level of the plurality of levels of self-interference and a second level of the plurality of levels of self-interference satisfying a threshold value.

4. The apparatus of claim 3, wherein the first level of the plurality of levels of self-interference is different than the second level of the plurality of levels of self-interference.

5. The apparatus of claim 4, wherein the at least one processor is further configured to cause the apparatus to:
determine one or more transmission characteristics for the communications in the first transmission direction, wherein the interleaving configuration is determined based at least in part on the one or more transmission characteristics.

6. The apparatus of claim 5, wherein the one or more transmission characteristics comprise a presence of communications in a second transmission direction causing self-interference on the communications in the first transmission direction, a frequency and time domain allocation for the communications in the first transmission direction, a codeblock size for a plurality of codeblocks, a codeblock length for the plurality of codeblocks, or any combination thereof.

7. The apparatus of claim 1, wherein the at least one processor is further configured to cause the apparatus to:
determine a number of codeblocks mapped per symbol of the slot, wherein the interleaving configuration is determined based at least in part on the number of codeblocks mapped per symbol satisfying a threshold value.

8. The apparatus of claim 1, wherein the interleaving configuration comprises a frequency domain interleaving configuration, a virtual resource block-to-physical resource block mapping configuration, or a combination thereof for the communications in the first transmission direction.

9. An apparatus for wireless communications at a user equipment (UE), comprising:
at least one memory; and
at least one processor coupled with the at least one memory, wherein the at least one processor is configured to cause the apparatus to:
receive, from a device, an indication of a plurality of interleaving configurations for communications in a first transmission direction in a slot with the device, each interleaving configuration of the plurality of interleaving configurations corresponding to a different transport block size range; and
select an interleaving configuration from the plurality of interleaving configurations for the communications in the first transmission direction based at least in part on a transport block size configured for the first transmission direction in the slot falling within a transport block size range for the interleaving configuration, wherein the interleaving configuration is determined based at least in part on the transport block size configured for the first transmission direction.

10. The apparatus of claim 9, wherein, to receive the indication of the plurality of interleaving configurations, the at least one processor is configured to cause the apparatus to:
receive, from the device, the indication of the plurality of interleaving configurations via radio resource control signaling.

11. The apparatus of claim 9, wherein the at least one processor is further configured to cause the apparatus to:
measure a plurality of levels of self-interference for a plurality of codeblocks for the communications in the first transmission direction, the self-interference for the communications in the first transmission direction caused by communications in a second transmission direction occurring at a same time as the communications in the first transmission direction; and
determine the interleaving configuration for the communications in the first transmission direction based at least in part on a difference between a first level of the plurality of levels of self-interference and a second level of the plurality of levels of self-interference satisfying a threshold value.

12. The apparatus of claim 11, wherein the first level of the plurality of levels of self-interference is different than the second level of the plurality of levels of self-interference.

13. The apparatus of claim 9, wherein the at least one processor is further configured to cause the apparatus to:
determine one or more transmission characteristics for the communications in the first transmission direction, wherein the interleaving configuration is determined based at least in part on the one or more transmission characteristics.

14. The apparatus of claim 13, wherein the one or more transmission characteristics comprise a presence of communications in a second transmission direction causing self-interference on the communications in the first transmission direction, a frequency and time domain allocation for the communications in the first transmission direction, a codeblock size for a plurality of codeblocks, a codeblock length for the plurality of codeblocks, or any combination thereof.

15. The apparatus of claim 9, wherein the at least one processor is further configured to cause the apparatus to:
determine a number of codeblocks mapped per symbol of the slot, wherein the interleaving configuration is determined based at least in part on the number of codeblocks mapped per symbol satisfying a threshold value.

16. An apparatus for wireless communications at a device, comprising:
at least one memory; and
at least one processor coupled with the at least one memory, wherein the at least one processor is configured to cause the apparatus to:

transmit, to a user equipment (UE), an indication of a plurality of interleaving configurations for communications in a first transmission direction in a slot with the UE, each interleaving configuration of the plurality of interleaving configurations corresponding to a different transport block size range; and communicate with the UE based at least in part on an interleaving configuration from the plurality of interleaving configurations for the communications in the first transmission direction, the interleaving configuration based at least in part on a transport block size configured for the first transmission direction in the slot falling within a transport block size range for the interleaving configuration.

17. The apparatus of claim 16, wherein, to transmit the indication of the plurality of interleaving configurations, the at least one processor is configured to cause the apparatus to:

transmit the indication of the plurality of interleaving configurations for full-duplex communications during the slot in the first transmission direction, the first transmission direction occurring within the slot at a same time as a second transmission direction within the slot, the first transmission direction being different from the second transmission direction.

18. The apparatus of claim 16, wherein the at least one processor is further configured to cause the apparatus to:

transmit, to the UE, an indication of a codeblock mapping configuration for the communications in the first transmission direction, the codeblock mapping configuration comprising a mapping of a plurality of codeblocks for the communications in the first transmission direction to a plurality of virtual resource blocks; and determine the interleaving configuration for the communications in the first transmission direction based at least in part on the indication of the codeblock mapping configuration and the transport block size configured for the first transmission direction.

19. The apparatus of claim 16, wherein the at least one processor is further configured to cause the apparatus to:

measure a plurality of levels of self-interference for a plurality of codeblocks for communications in the first transmission direction, the self-interference for the communications in the first transmission direction caused by communications in a second transmission direction occurring at a same time as the communications in the first transmission direction; and determine the interleaving configuration for the communications in the first transmission direction based at least in part on a difference between a first level of the plurality of levels of self-interference and a second level of the plurality of levels of self-interference satisfying a threshold value.

20. The apparatus of claim 16, wherein the at least one processor is further configured to cause the apparatus to:

determine one or more transmission characteristics for the communications in the first transmission direction, wherein the interleaving configuration is determined based at least in part on the one or more transmission characteristics.

21. The apparatus of claim 16, wherein the at least one processor is further configured to cause the apparatus to:

determine a number of codeblocks mapped per symbol of the slot, wherein the interleaving configuration is determined based at least in part on the number of codeblocks mapped per symbol satisfying a threshold value.

22. The apparatus of claim 16, wherein, to transmit the indication of the plurality of interleaving configurations, the at least one processor is configured to cause the apparatus to:

transmit, to the UE, the indication of the plurality of interleaving configurations via radio resource control signaling.

23. An apparatus for wireless communication at a user equipment (UE), comprising:

at least one memory; and at least one memory processor coupled with the at least one memory, wherein the at least one processor is configured to cause the apparatus to:

receive, from a device, an indication of a plurality of interleaving configurations for communications in a first transmission direction in a slot with the device, each interleaving configuration of the plurality of interleaving configurations corresponding to a different transport block size range; and communicate with the device based at least in part on an interleaving configuration from the plurality of interleaving configurations for the communications in the first transmission direction, the interleaving configuration based at least in part on a transport block size configured for the first transmission direction in the slot falling within a transport block size range for the interleaving configuration.

* * * * *